(12) United States Patent
Taniguchi et al.

(10) Patent No.: US 7,239,374 B2
(45) Date of Patent: Jul. 3, 2007

(54) LIGHT APPLICATION APPARATUS, CRYSTALLIZATION APPARATUS AND OPTICAL MODULATION ELEMENT ASSEMBLY

(75) Inventors: Yukio Taniguchi, Yokohama (JP); Masakiyo Matsumura, Yokohama (JP)

(73) Assignee: Advanced LCD Technologies Development Center Co. Ltd., Yokohama (JP)

( * ) Notice: Subject to any disclaimer, the term of this patent is extended or adjusted under 35 U.S.C. 154(b) by 215 days.

(21) Appl. No.: 11/041,832

(22) Filed: Jan. 25, 2005

(65) Prior Publication Data

US 2005/0162632 A1    Jul. 28, 2005

(30) Foreign Application Priority Data

Jan. 27, 2004   (JP)  ............................. 2004-017945
Jan. 27, 2004   (JP)  ............................. 2004-017947

(51) Int. Cl.
  *G03B 27/72*   (2006.01)
  *G03B 27/54*   (2006.01)

(52) U.S. Cl. ........................................ 355/69; 355/67

(58) Field of Classification Search ................. 355/52, 355/53, 55, 67–77; 250/548, 492.2; 356/399–401; 117/79, 92; 430/5, 311
See application file for complete search history.

(56) References Cited

U.S. PATENT DOCUMENTS 5,682,226 A * 10/1997 Anzai et al. ................... 355/53
6,285,442 B1 * 9/2001 Sato ............................. 355/67
6,829,041 B2 * 12/2004 Unno ........................... 355/67
7,101,436 B2 * 9/2006 Taniguchi et al. .......... 117/200

OTHER PUBLICATIONS

Masakiyo Matsumura, "Preparation of Ultra-Large Grain Silicon Thin-Films by Excimer-Laser", Journal of the Surface Science Society of Japan, vol. 21, No. 5, 2000, pp. 278-287.
M. Nakata, et al., "Two-Dimensionally Position-Controlled Ultra-Large Grain Growth Based on Phase-Modulated Excimer-Laser Annealing Method", Electrochemical Society Proceedings, vol. 2000-31, pp. 148-154.

(Continued)

*Primary Examiner*—Henry Hung Nguyen
(74) *Attorney, Agent, or Firm*—Oblon, Spivak, McClelland, Maier & Neustadt, P.C.

(57) ABSTRACT

A light application apparatus includes an optical modulation element provided with a plurality of phase steps, a light beam which is entered into the optical modulation element being phase-modulated by the phase steps and exits from the optical modulation element as a light beam having a first light intensity distribution. An optical system is arranged between the optical modulation element and a predetermined plane. The optical system divides the phase-modulated light beam into at least two light fluxes having second and third light intensity distributions and different optical characteristics from each other, and projects a light beam including the divided two light fluxes, the light intensity distributions of the projected light fluxes being combined with each other, so that the projected light beam has a fourth light intensity distribution with an inverse peak shape on the predetermined plane and enters the predetermined plane. The first to fourth light intensity distributions are different from each other on the predetermined plane.

16 Claims, 37 Drawing Sheets

OTHER PUBLICATIONS

Kohki Inoue, et al., "Amplitude and Phase Modulated Excimer-Laser Melt-Regrowth Method of Silicon Thin-Films . . . A New Growth Method of 2-D Position-Controlled Large-Grains . . . ", The Institute of Electronics, Information and Communication Engineers Transaction, The Institute of Electronics, Information and Communication Engineers, vol. J85-C No. 8, Aug. 2002, pp. 624-629.

* cited by examiner

+

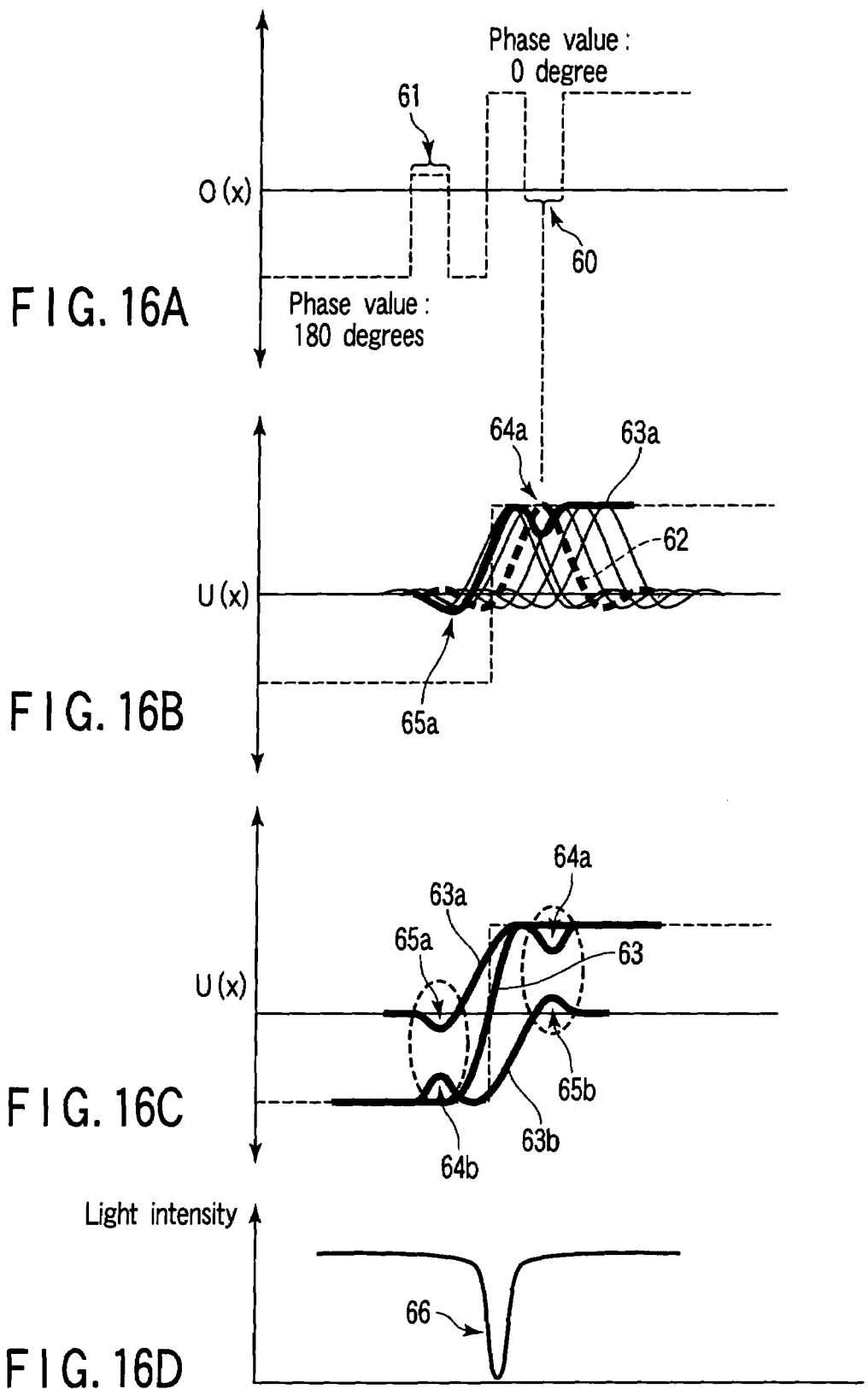

Light intensity distribution along cross section A-A

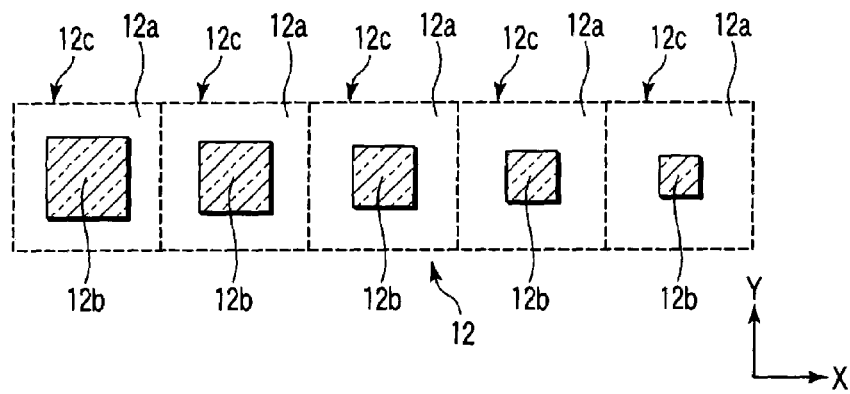
F I G. 42A
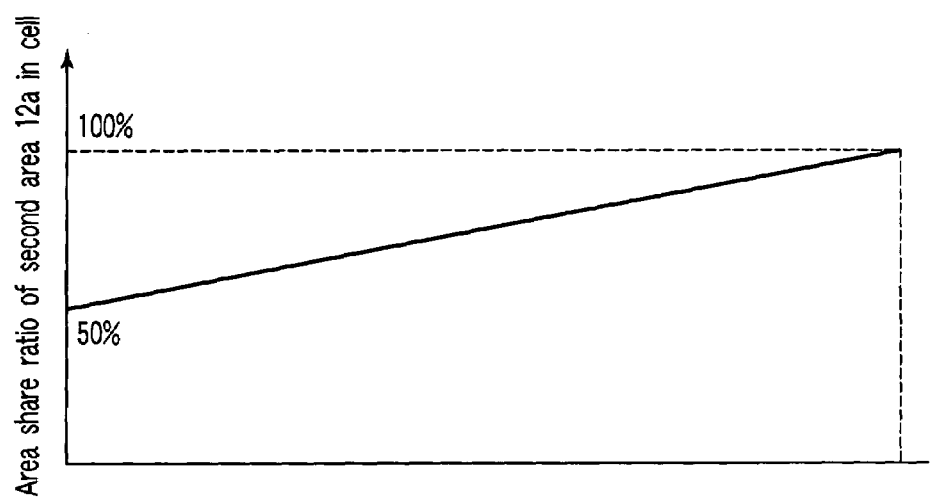
F I G. 42B

LIGHT APPLICATION APPARATUS, CRYSTALLIZATION APPARATUS AND OPTICAL MODULATION ELEMENT ASSEMBLY

CROSS-REFERENCE TO RELATED APPLICATIONS

This application is based upon and claims the benefit of priority from prior Japanese Patent Applications No. 2004-017945, filed Jan. 27, 2004; and No. 2004-017947, filed Jan. 27, 2004, the entire contents of both of which are incorporated herein by reference.

BACKGROUND OF THE INVENTION

1. Field of the Invention

The present invention relates to a light application apparatus, a crystallization apparatus and an optical modulation element assembly, and to, e.g., a technique which generates a crystallized semiconductor film by applying a laser light having a predetermined light intensity distribution to a non-single-crystal semiconductor film or layer such as a polycrystal semiconductor film or an amorphous semiconductor film.

2. Description of the Related Art

A thin film transistor (TFT) which is used for a switching element or the like which selects a display pixel in, e.g., a liquid crystal display (LCD) has been conventionally formed in an amorphous silicon layer or a polysilicon layer.

The polysilicon layer has a higher mobility of electrons or electron holes than the amorphous silicon layer. Therefore, when a transistor is formed in a polysilicon layer, a switching speed is increased and a display response speed is thus increased as compared with a case where a transistor is formed in an amorphous silicon layer. Further, a peripheral LSI can be formed of a thin film transistor. Furthermore, there is an advantage that a design margin of any other component can be reduced. Moreover, peripheral circuits such as a driver circuit or a DAC can be operated at a higher speed when these peripheral circuits are incorporated in a display.

Since polysilicon is formed of an aggregation of crystal grains, when, e.g., a TFT transistor is formed, a crystal grain boundary exists in a channel area of this transistor, and this crystal grain boundary becomes an obstacle and lowers the mobility of electrons or electron holes as compared with single-crystal silicon. Additionally, in case of many thin film transistors formed to polysilicon, the number of crystal grain boundaries formed in channel portions differs between the respective thin film transistors, this becomes unevenness and leads to a problem of display irregularities in case of a liquid crystal display. Thus, in recent years, in order to improve the mobility of electrons and electron holes and reduce irregularities in the number of crystal grain boundaries in channel portions, there has been proposed a crystallization method which generates crystallized silicon having crystal grains with a particle size which is as large as at least one channel area can be formed from non-single-crystal silicon.

As this type of crystallization method, there has been conventionally known a "phase control ELA (excimer laser annealing) method" which generates a crystallized semiconductor film by applying an excimer laser light to a phase shifter which is closely arranged in parallel to a polycrystal semiconductor film or an amorphous semiconductor film.

The detail of the phase control ELA method is described in, e.g., Journal of the Surface Science Society of Japan Vol. 21, No. 5, pp. 278-287, 2000.

In the phase control ELA method, a light intensity distribution having an inverse peak pattern (a pattern in which a light intensity is minimum at the center and the light intensity is suddenly increased toward the periphery) in which the light intensity is lower than that at the periphery is generated at a point or a line corresponding to a phase shift portion of a phase shifter, and a laser light ray having this inverse-peak-shaped light intensity distribution is applied to a non-single-crystal semiconductor film (a polycrystal semiconductor film or an amorphous semiconductor film). As a result, a fusing area having a temperature gradient according to the light intensity distribution is generated in an irradiation target area, a crystal nucleus is formed at a part which is solidified first or not solidified in accordance with a point where the light intensity is minimum, and a crystal grows in a lateral direction from this crystal nucleus toward the periphery (which will be referred to as a "lateral growth" or a "growth in a lateral direction" hereinafter), thereby generating a crystal grain with a large particle size.

Further, there has been conventionally a crystallization method for a large particle size described in M. NAKATA and M. MATSUMURA, "Two-Dimensionally Position-Controlled Ultra-Large Grain Growth Based on Phase-Modulated Excimer-Laser Annealing Method", Electrochemical Society Proceeding Volume 200-31, page 148-154. In this method, an element having a pattern which forms, e.g., a V-shaped light intensity gradient distribution and an element having a pattern which forms an inverse-peak-shaped light intensity minimum distribution are both realized by providing a phase step on an $SiO_2$ substrate. Furthermore, an excimer laser light is applied in a state where a processed substrate is in close proximity to the two laminated elements, thereby generating a crystallized semiconductor film on the processed substrate.

Moreover, there is a crystallization method for a large particle size described in "Silicon thin film amplitude/phase-controlled excimer laser fusing/re-crystallization method—new two-dimensional position-controlled large grain formation method" by Inoue, Nakata and Matsumura, The institute of Electronics, information and Communication Engineers Transaction, The institute of Electronics, information and Communication Engineers, August 2002, Vol. J85-C, No. 8, p. 624-629. In this method, an element having a pattern which forms, e.g., a V-shaped light intensity gradient distribution is realized by a thickness distribution of SiONx which is a light absorption material, and an element having a pattern which forms an inverse-peak-shaped light intensity minimum distribution is realized by a phase step of $SiO_2$. These two elements are laminated and formed on one substrate. Additionally, an excimer laser light is applied in a state where a processed substrate is in close proximity to this one element substrate, thereby generating a crystallized semiconductor film on the processed substrate.

In the conventional technique, when a phase shifter having a phase step of 180 degrees is used, there is a disadvantage as described below with reference to FIGS. 44A and 45.

A crystallization apparatus in which an image formation optical system is provided between a phase shifter 191 shown in FIG. 44A and a processed substrate and an image of the phase shifter 191 is formed on a predetermined surface of the processed substrate by the image formation optical system, as shown in FIG. 44B, a minimum light intensity (a light intensity at an inverse peak point) 192 in a light intensity distribution having an inverse peak shape formed on the processed substrate through the image formation optical system is dependent on a phase difference obtained by a step 193 of the phase shifter 191. As shown in FIG. 44C, when a phase shifter having a phase difference of 180 degrees obtained by a step 193 is used, a light intensity distribution with an inverse peak shape formed at a focus position (an image formation surface) of the image formation optical system is symmetrical, and its minimum light intensity is substantially zero.

Further, an inverse-peak-shaped light intensity distribution to be formed is likewise symmetrical at a defocus position slightly moved in the vertical direction from the focus position of the image formation optical system as shown in FIG. 44D, and its minimum light intensity becomes slightly stronger but it is a very small light intensity. When a phase shifter having a phase difference of 180 degrees is used in this manner, since the symmetry of the light intensity distribution is maintained without being dependent on a defocus direction, a deep focal depth can be realized. Since the minimum light intensity is very weak at the inverse peak point, however, there is a disadvantage that an irradiation target area with the minimum light intensity is not fused, an uncrystallized area (an area having a smaller light intensity than that at a crystal growth start point) becomes large to some extent and a filling rate of a crystal grain cannot be increased. That is, almost all of an irradiation target surface can be fused by selecting a minimum light intensity in such a manner that a temperature of the irradiation target area generated when irradiated with the minimum light intensity becomes a temperature in the vicinity of a fusing point, and a crystallized area can be widened.

A step which is used to form the phase shifter 191 having a desired phase difference is obtained from an expression $\lambda/(\theta/360)/(n-1)$, wherein $\lambda$ is a wavelength of a laser light, $\theta$ is a value which represents a desired phase difference by degree, and n is a refraction factor of a transparent quartz base material of the phase shifter. When a refraction factor of the quartz base material is 1.46 and a wavelength of an XeCl excimer laser light is 308 nm, a step of 334.8 nm must be formed to the quartz substrate by a method such as etching in order to provide a phase difference of 180 degrees. When a phase shifter in which a step 193 is selected to obtain a phase difference of 60 degrees is used as shown in FIG. 45A, a light intensity distribution with an inverse peak shape formed at a focus position of the image formation optical system is symmetrical (symmetrical in the lateral direction) as shown in FIG. 45C, and its minimum light intensity is strong to some extent. On the contrary, at defocus positions slightly moved upwards and downwards from the focus position of the image formation optical system, the symmetry of the light intensity distribution with the inverse peak shape to be formed largely collapses, and a position of its minimum light intensity (an inverse peak point) moves in the lateral direction. Here, a board thickness deviation which can be a factor of defocusing unavoidably exists in the processed substrate.

As described above, the phase shifter 191 having a phase difference of 60 degrees (FIG. 45A) has a slightly stronger minimum light intensity at an inverse peak point than the phase shifter (FIG. 44A) having a phase difference of 180 degrees, and hence a crystallized area can be widened. However, the symmetry in the lateral direction greatly collapses in the light intensity distributions at defocus positions moved upwards and downwards from the focus position, and the symmetry collapsing directions in the light intensity distributions shown in FIGS. 45B and 45D are opposite in dependence on the defocus direction, and the focal depth thereby becomes shallow (narrow). Furthermore, since a position of the inverse peak point moves in a surface (an up-and-down direction and a right-and-left direction in the drawing) due to defocusing, a position of a crystal grain to be generated is also shifted from a desired position, which disadvantageously results in a problem when forming a circuit in a formed crystal grain. That is, if a crystal grain is not formed at a desired position, a channel portion of a transistor cannot be or is hard to be accurately formed in a crystal grain, and hence there is a problem that characteristics of the transistor are deteriorated.

Moreover, when the phase shifter having a phase difference of 180 degrees is used and when the phase shifter having a phase difference of 60 degrees is used, an unnecessary protruding peak shape is generated on both sides of the inverse peak in the light intensity distribution with the inverse peak shape in, e.g., the focus state as indicated by circles of broken lines in FIGS. 44C and 45C. That is, this unnecessary peak shape corresponds to a high light intensity part. When such a peak shape exists on both sides or one side of the inverse peak in the light intensity distribution with the inverse peak shape, since the light intensity becomes large at this peak shape part only, ablation occurs and the semiconductor film is disadvantageously broken. Additionally, when a crystallized semiconductor film is generated by applying a light intensity distribution with an inverse peak shape to a non-crystal semiconductor film, since crystal growth which has started in the lateral direction from a minimum intensity area at an inverse peak part stops at a descending gradient part of a peak shape part with a high intensity, there is a disadvantage that a crystal with a large particle size cannot be generated.

BRIEF SUMMARY OF THE INVENTION

It is an object of the present invention to provide a light application apparatus which can stably form a desired light intensity distribution with an inverse peak shape at a desired position of a non-crystal film, and form a crystal grain on a non-crystal film at a high filling rate when the present invention is used in a crystallization apparatus.

Here, the filling rate means a rate of a crystallized area to an irradiation target surface when a light having a light intensity distribution with an inverse peak shape is applied.

In order to solve the above-described problems, according to a first aspect of the present invention, there is provided a light application apparatus comprising:

an optical modulation element provided with a plurality of phase steps, a light beam which is entered into the optical modulation element being phase-modulated by the phase steps and exits from the optical modulation element as a light beam having a first light intensity distribution; and an optical system arranged between the optical modulation element and a predetermined plane, the optical system dividing the phase-modulated light beam into at least two light fluxes having second and third light intensity distributions and different optical characteristics from each other, and projecting a light beam including the divided two light fluxes, the light intensity distributions of the projected light fluxes being combined with each other, so that the projected light beam has a fourth light intensity distribution with an inverse peak shape on the predetermined plane and enters the predetermined plane, the first to fourth light intensity distributions being different from each other on the predetermined plane.

According to a second aspect of the present invention, there is provided a light application apparatus comprising:

an optical modulation element provided with a plurality of phase steps, a light beam which is entered into the optical modulation element being phase-modulated by the phase steps and exits from the optical modulation element as a light beam forming a first light intensity distribution on a predetermined plane; and an optical system arranged between the optical modulation element and the predetermine plane, the optical system dividing the phase-modulated light beam into at least two non-interference light fluxes forming second and third light intensity distributions on the desired plane and different optical characteristics from each other, and projecting a light beam including the divided two light fluxes, the light intensity distributions of the projected light fluxes being combined with each other, so that the projected light beam forms a fourth light intensity distribution with an inverse peak shape on the predetermined plane, the first to fourth light intensity distributions being different from each other.

In the second aspect of the present invention, a predetermined light intensity distribution corresponding to a combination of two inverse-peak-shaped light intensity distributions separated from each other is formed on a predetermined surface by a cooperative effect of the optical modulation element having a pattern in which phase differences substantially different from 180 degrees are aligned at first intervals and the light beam division element which divides an incident light beam into two light beams having polarization states. In this case, the inverse-peak-shaped light intensity distribution formed on the predetermined surface is hardly affected by defocusing. As a result, when the light application apparatus according to the present invention is applied to a crystallization apparatus, a desired light intensity distribution with an inverse peak shape can be stably formed based on a deep focal depth, and a filling rate of a crystal grain formed on a semiconductor film of a substrate can be increased.

Preferably, the first interval changes along a direction of the phase steps between a first reference interval which forms the light intensity distribution with the inverse peak shape and a first correction interval which does not form the inverse peak portion.

A gap between the two adjacent phase steps can be increased/decreased along a direction of the phase steps. It is preferable that a correction quantity C on the predetermined surface corresponding to an absolute value of a difference between the first correction interval and the first reference interval of the two adjacent phase steps satisfies the conditions of $C \leq 0.5 \times \lambda/NA$, where $\lambda$ is a wavelength of a light and NA is an image side numerical aperture of the image formation optical system.

According to the above-described aspects, the optical modulation element preferably has a light shielding area provided in the vicinity of the phase step in order to suppress a peak shape generated on both sides of the inverse peak in the light intensity distribution with the inverse peak shape. In this case, it is preferable that the light shielding area has a linear light shielding area extending in substantially parallel with the phase step. In this case, a distance D on the predetermined surface corresponding to a distance between a central line of the linear light shielding area and the phase step satisfies the conditions of $0.4 \times \lambda/NA < D < 0.7 \times \lambda/NA$, where $\lambda$ is a wavelength of a light and NA is an image side numerical aperture of the image formation optical system.

It is preferable that the light shielding area has a plurality of isolated light shielding areas aligned in substantially parallel with the phase step. In this case, preferably, a distance D on the predetermined surface corresponding to a distance between a central line connecting centers of the plurality of isolated light shielding areas and the phase step satisfies the conditions of $0.4 \times \lambda/NA < D < 0.7 \times \lambda/NA$, where $\lambda$ is a wavelength of a light and NA is an image side numerical aperture of the image formation optical system.

The optical modulation element preferably has a phase modulated area provided in the vicinity of the phase step in order to suppress a peak shape generated on both sides of the inverse peak in the light intensity distribution with the inverse peak shape. In this case, it is preferable that the phase modulation area has a linear phase modulation area extending in substantially parallel with the phase step. In this case, preferably, a distance D on the predetermined surface corresponding to a distance between a central line of the linear phase modulation area and the phase step satisfies the conditions of $0.4 \times \lambda/NA < D < 0.7 \times \lambda/NA$, where $\lambda$ is a wavelength of a light and NA is an image side numerical aperture of the image formation optical system.

It is preferable that the phase modulation area has a plurality of isolated phase modulation areas aligned in substantially parallel with the phase step. In this case, preferably, a distance D on the predetermined surface corresponding to a distance between a central line connecting centers of the plurality of isolated phase modulation areas and the phase step satisfies the conditions of $0.4 \times \lambda/NA < D < 0.7 \times \lambda/NA$, where $\lambda$ is a wavelength of a light and NA is an image side numerical aperture of the image formation optical system. Further, it is preferable that a phase modulation quantity of the phase modulation area provided on one side of the phase step and a phase modulation quantity of the phase modulation area provided on the other side of the phase step have substantially the same absolute values and different signs.

Preferably, in the optical modulation element, phase areas formed between respective two adjacent phase steps have alternately different reference phase values, in each phase area is formed a phase distribution in which an area share ratio of a first area which has a dimension optically smaller than a radius of a point spread function range of the image formation optical system and a first phase value different from the reference phase value varies depending on each position, and phase modulation quantities of the first areas in the two adjacent phase areas have substantially the same absolute values and different signs. In this case, it is preferable that the correction quantity C is minimum at a position where the area share ratio is closest to 50%.

Preferably, the light beam division element has a birefringent element, and this birefringent element is arranged in the vicinity of the optical modulation element, or at or in the vicinity of a conjugate position of the optical modulation element although the birefringent element is not restricted such arrangements. In this case, it is preferable that the birefringent element has a birefringent plane-parallel plate which is set in such a manner that a crystal optical axis forms a predetermined angle with respect to an optical axis. It is preferable that the birefringent element has a Savart plate comprising a pair of birefringent plane-parallel plates each of which is set in such a manner that the crystal optical axis forms a predetermined angle with respect to the optical axis. Alternatively, the birefringent element has a pair of birefringent plane-parallel plates each of which is set in such a manner that the crystal optical axis forms a predetermined angle with respect to the optical axis and a half wave plate provided between the pair of plane-parallel plates.

The light beam division element can have the birefringent element arranged on or in the vicinity of a pupil surface of the image formation optical system. In this case, it is preferable that the birefringent element has a Wollaston prism comprising a pair of birefringent deflection prisms each of which is set in such a manner that the crystal optical axis forms a predetermined angle with respect to the optical axis. It is preferable that the birefringent element is formed of quartz, calcite or magnesium fluoride.

Preferably, the light application apparatus further comprises a control element which controls a polarization state of a light beam entering the light beam division element in such a manner that two light beams divided by the light beam division elements have substantially the same intensities. In this case, it is preferable that the control element has a quarter wave plate arranged on the incidence side of the light beam division element.

According to a third aspect of the present invention, there is provided a crystallization apparatus which comprises the light application apparatus and generates a crystallized semiconductor film by applying a light having the predetermined light intensity to a polycrystal semiconductor film or an amorphous semiconductor film set on the predetermined surface.

As a modification of the present invention, there may be provided a crystallization method which generates a crystallized semiconductor film by applying a light having the predetermined light intensity distribution to a polycrystal semiconductor film or an amorphous semiconductor film set on the predetermined surface by using the light application apparatus.

As another modification of the present invention, there may be provided a device manufactured by using the crystallization apparatus or the crystallization method.

As still another modification of the present invention, there may be provided an optical modulation element having a pattern in which phase steps substantially different from 180 degrees are aligned in a predetermined cycle, wherein a gap between two adjacent phase steps is increased/decreased along a direction of the phase steps.

As yet another modification of the present invention, there may be provided an optical modulation element having a pattern in which phase steps substantially different from 180 degrees are aligned in a predetermined cycle, wherein phase areas formed between two adjacent phase steps have alternately different reference phase values, a phase distribution in which an area share ratio of a first area having a first phase value different from the reference phase values varies depending on each position is formed in each phase area, and phase modulation quantities of the first areas in two adjacent phase areas have substantially the same absolute values and opposite signs.

As a further modification of the present invention, there may be provided an optical modulation element having a pattern in which phase steps having phase modulation quantities substantially different from 180 degrees are aligned in a predetermined cycle, the optical modulation element having a light shielding area provided in the vicinity of the phase steps.

The light shielding area has a linear light shielding area extending in substantially parallel with the phase step. Alternatively, it is preferable that the light shielding area has a plurality of isolated light shielding areas which are aligned in substantially parallel with the phase step.

As a still further modification of the present invention, there may be provided an optical modulation element having a pattern in which phase steps having phase modulation quantities substantially different from 180 degrees are aligned in a predetermined cycle, the optical modulation element having a phase modulation area provided in the vicinity of the phase step.

It is preferable that the phase modulation area has a linear phase modulation area extending in substantially parallel with the phase step. Alternatively, it is preferable that the phase modulation area has a plurality of isolated phase modulation areas which are aligned in substantially parallel with the phase step. Further, it is preferable that a phase modulation quantity of the phase modulation area provided on one side of the phase step and a phase modulation quantity of the phase modulation area provided on the other side of the phase step have substantially equal absolute values and different signs of the absolute values.

According to the crystallization apparatus and the crystallization method, a crystal grain can be formed on a semiconductor film at a high filling rate. Furthermore, it can be understood that a crystal can be grown without generating ablation. According to the crystallization apparatus and the crystallization method of the present invention, a predetermined light intensity distribution corresponding to a combination of two inverse-peak-shaped light intensity distributions separated from each other is formed on a surface of a semiconductor film substrate by a cooperative effect of an optical modulation element having a pattern in which phase steps having phase modulation quantities different from 180 degrees and a light beam division element which divides an incident light beam into two light beams having polarization states. In this case, although a board thickness deviation which can be a factor of defocusing unavoidably exists in the semiconductor film substrate, the light intensity distribution having the inverse peak shape formed on the surface of the semiconductor film substrate is hardly affected by defocusing. As a result, the crystallization apparatus and the crystallization method according to the present invention can stably form a desired light intensity distribution with an inverse peak shape based on a deep focal depth and increase a filling rate of a crystal grain formed on the semiconductor film of the substrate.

Furthermore, according to the crystallization apparatus and the crystallization method of the present invention, a desired light intensity distribution with an inverse peak shape in which a peak shape generated on both sides of an inverse peak is suppressed can be formed on a polycrystal semiconductor film or an amorphous semiconductor film by using an optical modulation element having a light shielding area or a phase modulation area provided in the vicinity of a phase step. As a result, the semiconductor film is not destroyed by occurrence of ablation due to a peak shape. Moreover, the crystal growth which has started from the inverse peak part does not stop at the peak shape part, thereby generating a crystal with a large particle size.

According to a fourth aspect of the present invention, there is provided a light application apparatus comprising:

an optical modulation element for modulating an incident light beam;

a light flux division element which changes a light beam which has modulated by the optical modulation element into a light beam having two divided light fluxes having first and second light intensity distributions and incoherencies or polarization states; and an image formation optical system which forms on an predetermined plane a predetermined light intensity distribution corresponding to a combination of the first and second light intensity distributions with an inverse peak shape, based on the light beams which have entered through the optical modulation element and/or the light beam division element.

According to the fourth aspect of the present invention, a predetermined light intensity distribution corresponding to a combination of two inverse-peak-shaped light intensity distributions separated from each other can be formed on a predetermined surface by a cooperative effect of an optical modulation element having a pattern which forms a light intensity distribution with an inverse peak shape based on an incident light beam and a light beam division element which divides an incident light beam into two light beams having polarization states. In this case, a minimum light intensity of an inverse peak point in the light intensity distribution with the inverse peak shape formed on the predetermined surface is substantially ½ of a maximum light intensity, and the light intensity distribution with the inverse peak shape formed on the predetermined surface is hardly affected by defocusing. As a result, when the light application apparatus according to the present invention is applied to the crystallization apparatus, a desired light intensity distribution with an inverse peak shape can be stably formed based on a deep focal depth, and a filling rate of a crystal grain formed on a semiconductor film of the substrate can be increased.

The light beam division element can have a birefringent element arranged in the vicinity of the optical modulation element, or at or in the vicinity of a conjugate position of the optical modulation element. In this case, it is preferable that the birefringent element has a birefringent plane-parallel plate which is set in such a manner that a crystal optical axis forms a predetermined angle with respect to an optical axis. Alternatively, it is preferable that the birefringent element has a Savart plate comprising a pair of birefringent plane-parallel plates each of which is set in such a manner that the crystal optical axis forms a predetermined angle with respect to the optical axis. Alternatively, it is preferable that the birefringent element has a pair of birefringent plane-parallel plates each of which is set in such a manner that the crystal optical axis forms a predetermined angle of the optical axis and a half wave plate provided between the pair of plane-parallel plates.

Additionally, the light beam division element can be integrated with the optical modulation element. It is preferable that the light beam division element has a birefringent element arranged on or in the vicinity of a pupil surface of the image formation optical system. In this case, it is preferable that the birefringent element has a Wollaston prism comprising a pair of birefringent polarizing prisms each of which is set in such a manner that the crystal optical axis is vertical to the optical axis.

The optical modulation element has a phase difference of approximately 180 degrees. In this case, it is preferable that the optical modulation element has a pattern including a phase difference line of approximately 180 degrees arranged in accordance with a predetermined cycle and a distance between the two inverse-peak-shaped light intensity distributions separated from each other corresponds to odd-fold of approximately ½ of a pitch of the phase difference line. Alternatively, it is preferable that the optical modulation element has a pattern in which three or more phase difference lines of approximately 180 degrees cross each other one point and a distance between the two non-interference light beams on the predetermined surface corresponds to odd-fold of approximately ½ of a pitch of an intersecting point of the phase difference lines (odd-fold of approximately ½ of a value which is a conversion value of the first interval on the image forming plane).

The optical modulation element has a pattern in which three or more types of phase difference areas come into contact with each other at one point, and a distance between the two non-interference light beams on the predetermined surface corresponds to odd-fold of approximately ½ of a pitch of a contact point of the phase difference areas. Preferably, the optical modulation element further comprises a control element which controls a polarization state of a light beam entering the light beam division element so that intensities of two light beams divided by the light beam division element become equal to each other. In this case, it is preferable that the control element has a quarter wave plate arranged on an incidence side of the light beam division element.

The optical modulation element further has a pattern which forms a light intensity gradient distribution based on an incident light beam. In this case, it is preferable that a light beam division direction of the light beam division element is substantially orthogonal to a gradient direction of the light intensity gradient distribution. Further, as to division of a light beam by the light beam division element, it is preferable that a light beam is divided into two light beams having homogeneous light intensities. Furthermore, it is preferable that the birefringent element is formed of quartz, calcite or magnesium fluoride.

According to a modification of the fourth aspect of the present invention, there can be provided a crystallization apparatus having a support base provided therein which is used to provide a processed substrate having a non-single-crystal semiconductor film on an image formation surface of the image formation optical system of the light application apparatus according to the first to fourth aspects.

According to a further modification of the present invention, there may be provided a crystallization method which uses the light application apparatus according to the forth aspect in order to generate a crystallized semiconductor film by providing a processed substrate having a non-single-crystal semiconductor film on the predetermined surface and applying a light having the predetermined light intensity distribution to the non-single-crystal semiconductor film.

According to another modification of the fourth aspect of the present invention, there is provided a device manufactured by using the crystallization apparatus or the crystallization method according to the modification.

According to still another modification of the fourth aspect of the present invention, there can be provided a light application apparatus comprising:

optical modulating means for forming a light intensity distribution with an inverse peak shape from an incident light beam;

light beam dividing means for dividing the light beam which has entered through the optical modulating means into two light beams having incoherencies; and an image formation optical system which forms on a predetermined surface a predetermined light intensity distribution corresponding to a combination of the two inverse-peak-shaped light intensity distributions separated from each other based on the light beams which have entered through the light beam dividing means.

According to yet another modification of the fourth aspect of the present invention, there can be provided a light application apparatus comprising:

optical modulating means for forming a light intensity distribution with an inverse peak shape from an incident light beam;

light beam dividing means for dividing a light beam which has entered through the optical modulating means into two light beams having polarization states; and an image formation optical system which is provided in a transmission light path of the light beam dividing means and forms on a predetermined surface the two light beams having polarization sates.

According to the fourth aspect of the present invention, a desired light intensity distribution with an inverse peak shape can be stably formed at a desired position, and a filling rate of a crystal grain formed on a semiconductor film can be increased. In the crystallization apparatus and the crystallization method according to the present invention, a predetermined light intensity distribution corresponding to a combination of two inverse-peak-shaped light intensity distributions separated from each other is formed on a surface of a semiconductor film substrate by a cooperative effect of an optical modulation element having a pattern which forms a light intensity distribution with an inverse peak shape based on an incident light beam and a light beam division element which divides an incident light beam into two light beams having polarization states. In this case, as will be described later with reference to embodiments, a minimum light intensity of an inverse peak point in the light intensity distribution with the inverse peak shape formed on the surface of the semiconductor film substrate becomes, e.g., approximately ½ of a maximum light intensity.

Furthermore, although a board thickness deviation which can be a factor of defocusing unavoidably exists in the semiconductor film thickness, the light intensity distribution with the inverse peak shape formed on the surface of the semiconductor film substrate is hardly affected by defocusing. As a result, in the crystallization apparatus and the crystallization method according to the present invention, a desired light intensity distribution with an inverse peak shape can be stably formed based on a deep focal depth, and a filling rate of a crystal grain formed on the semiconductor film of the substrate can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 16A to 16D are views which are associated with FIGS. 14A and 14D and illustrate a first technique which suppresses a peak shape based on the present invention;

FIGS. 42A and 42B are views illustrating a basic pattern in the second optical modulation element depicted in FIG. 41A;

DETAILED DESCRIPTION OF THE INVENTION

Embodiments according to the present invention will now be described with reference to the accompanying drawings.

Figure 1:
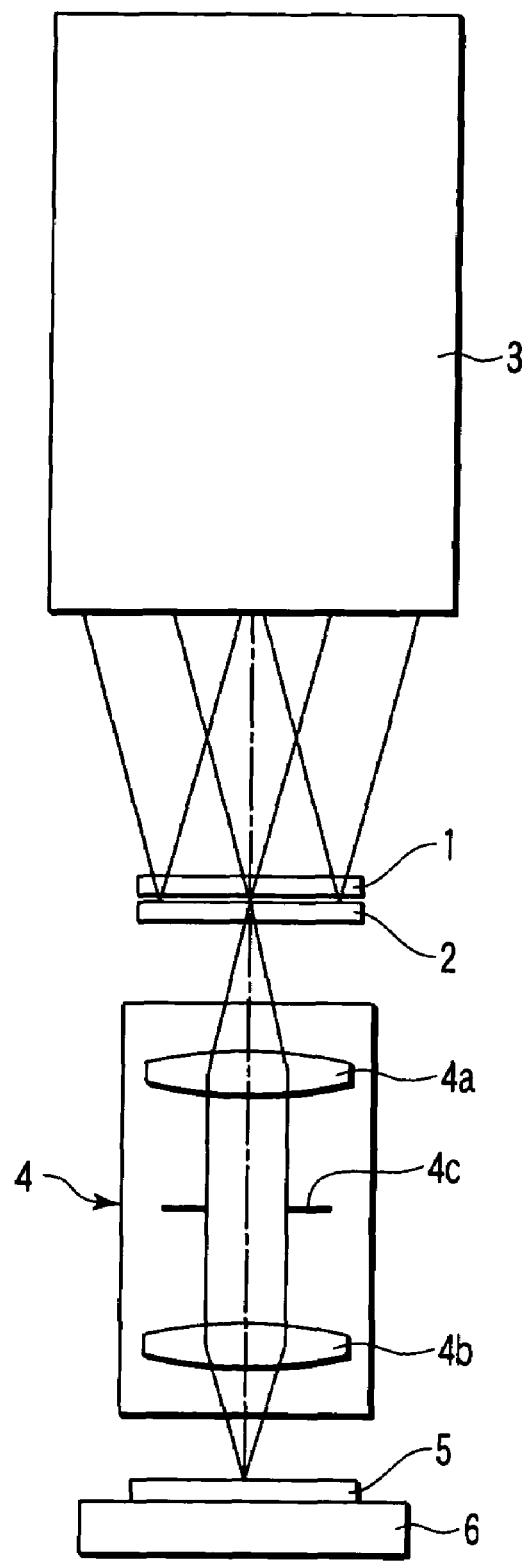
FIG. 1 is a view schematically showing a structure of a crystallization apparatus according to a first embodiment of the present invention.
Figure 2:
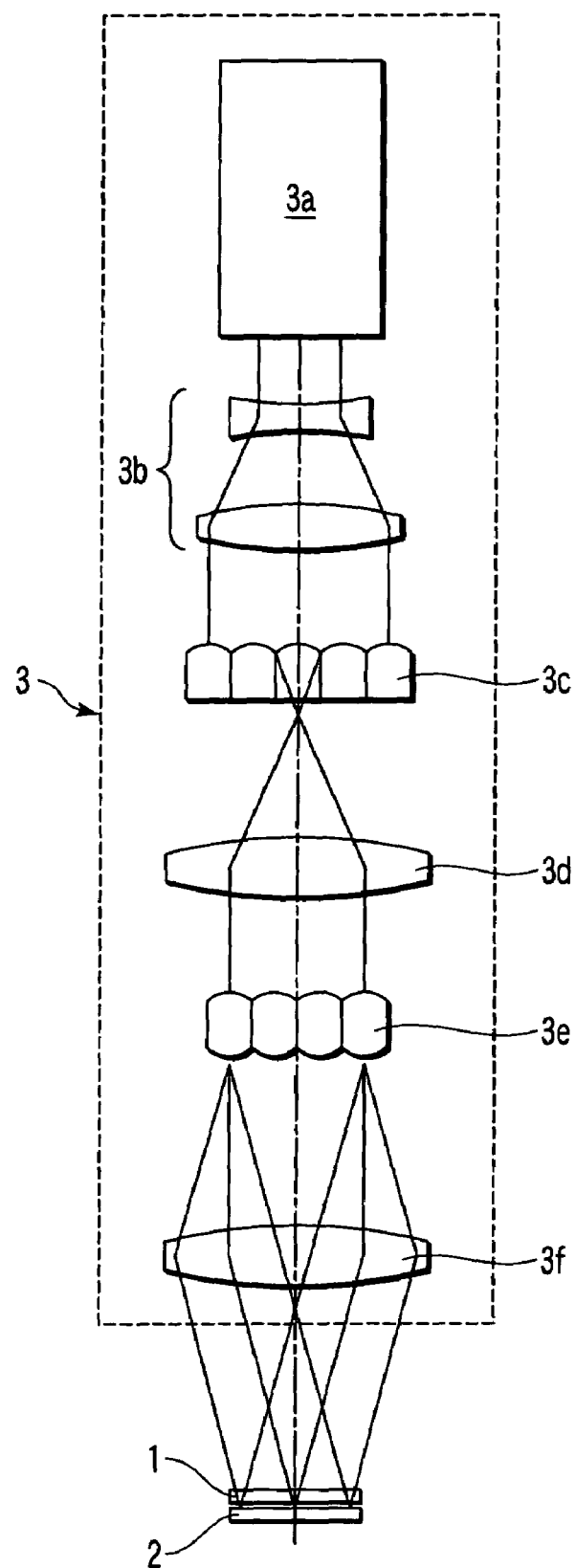
FIG. 2 is a view schematically showing an internal structure of an illumination system of the crystallization apparatus depicted in FIG. 1.

FIG. 1 is a view schematically showing a structure of a crystallization apparatus according to the first embodiment of the present invention. FIG. 2 is a view schematically showing an internal structure of an illumination system of the crystallization apparatus depicted in FIG. 1. Referring to FIGS. 1 and 2, the crystallization apparatus according to the first embodiment has an optical modulation element 1, a light beam division element 2 (e.g., a birefringent element), an image formation optical system, and an illumination system 3. The optical modulation element 1 has a plurality of steps (excluding a step whose phase difference is substantially 180 degrees) provided to a translucent substrate, i.e., a phase difference which is not 180 degrees, and modulates a phase of an incident light beam, thereby forming a light intensity distribution with an inverse peak shape (a first light intensity distribution). The light beam division element 2 is means for dividing an incident light beam into a plurality of light beams having optical characteristics. For example, it divides a light beam from the optical modulation element 1 into at least two different light beams which have different inverse-peak-shaped light intensity distributions (second and third light intensity distributions) and the incoherence or into at least two light beams having polarization states. The image formation optical system forms on a predetermined surface or plane of an irradiation target object a predetermined light intensity distribution (a fourth light intensity distribution) corresponding to a combination of two inverse-peak-shaped light intensity distributions separated from each other based on the light beams which have entered through the optical modulation element 1 and/or the light beam division element 2.

The light beam division element and the image formation optical system divide the phase-modulated light beam into at least two light beams which have the second and third light intensity distributions with the inverse peak shape and have different optical characteristics, and project these light beams. The light beam division element and the image formation optical system constitute an optical system in which the light intensity distributions of the thus projected light beams are combined with each other and the combined light beam having the fourth light intensity distribution with the inverse peak shape enters an irradiation target object on a surface of a non-single-crystal substance.

The optical modulation element 1 is, e.g., a phase shifter, and arranged in such a manner that its pattern surface (a surface having a step) faces the light beam division element 2 although not restricted to the light intensity division element 2. The optical modulation element 1 is constituted so that the minimum light intensity can be set in the vicinity of a fusing point of a non-single-crystallized substrate or layer while keeping off a phase difference of 180 degrees where the minimum light intensity in the transmitted light intensity distribution is close to 0. The light beam division element 2 divides a light intensity distribution with an inverse peak shape formed by the optical modulation element 1 into, e.g., two light beams which have the incoherency and are separated from each other in this preferred example. This separation distance is set to be odd-fold of a gap corresponding to a space between steps (odd-fold of a value which is a conversion value of the first interval on the image forming plane), thereby obtaining a light intensity distribution with an inverse peak shape which is symmetrical in a right-and-left direction (a lateral direction) and in which the minimum light intensity can be set in the vicinity of a fusing point of the single-crystallized substrate. The light intensity distribution with an inverse peak shape which is symmetrical and in which the minimum light intensity can be set in the vicinity of the fusing point of the single-crystallized substrate enables stable formation of a crystallized area having crystal grains with the same particle size and a large grain diameter. With this light intensity distribution, an entire irradiation target area can be set to a temperature close to the fusing point, and hence crystal gains can be formed on a semiconductor film (a non-single-crystallized area) at a high filling rate. Further, the crystal can be grown without generating ablation. The optical modulation element 1 and the light beam division element 2 may be integrally constituted.

The illumination system 3 illuminates the optical modulation element 1. This illumination system 3 comprises a light source 3a which projects a light ray having an energy which fuses a crystallization processing target substance, and a homogenizer which projects a substantially even incident angle and light intensity distribution, as shown in FIG. 2. The light source 3a is, e.g., a KrF excimer laser light source which supplies a light having a wavelength of 248 nm. As this light source 3a, it is possible to use any other appropriate light source having performances which project an energy light ray which fuses a crystallization processing target substance or a non-single-crystallized layer, e.g., an XeCl excimer laser light source or a YAG laser light source.

A laser beam supplied from the light source 3a is expanded through a beam expander 3b and then enters a first fly-eye lens 3c. Thus, a plurality of small light sources are formed on a rear focal surface of the first fly-eye lens 3c. Light fluxes from the plurality of light sources illuminate an incidence surface of a second fly-eye lens 3e through a first condenser optical system 3d in an overlapping manner. As a result, more small light sources than those on the rear focal surface of the first fly-eye lens 3c are formed on a rear focal surface of the second fly-eye lens 3e. Light fluxes from the plurality of small light sources formed on the rear focal surface of the second fly-eye lens 3e illuminate the optical modulation element 1 through a second condenser optical system 3f in an overlapping manner.

Here, the first fly-eye lens 3c and the first condenser optical system 3d constitute a first homogenizer, and the first homogenizer homogenizes the laser beam supplied from the light source 3a so that an incidence angle on the optical modulation element 1 becomes even. Furthermore, the second fly-eye lens 3e and the second condenser optical system 3f constitute a second homogenizer, and the second homogenizes the laser beam having the homogenized incidence angle from the first homogenizer so that a light intensity at each in-plane position on the optical modulation element 1 becomes even. In this manner, the illumination system 3 projects a laser beam having a substantially even light intensity distribution and irradiates the optical modulation element 1 with this laser beam.

The laser beam subjected to phase modulation by the optical modulation element 1 is caused to enter a processed substrate or a non-single-crystallized layer 5 through the light beam division element 2 and the image formation optical system 4 as shown in FIG. 1. Here, light beam division element 2 divides the light intensity distribution with the inverse peak shape formed by the optical modulation element 1 into two different light beams which have the incoherency and are separated from each other. The image formation optical system 4 arranges a pattern surface of the optical modulation element 1 and the processed substrate 5 in an optically conjugate manner. In other words, the processed substrate 5 is arranged on a surface (an image surface of the image formation optical system 4) which is optically conjugate with the pattern surface of the optical modulation element 1. The image formation optical system 4 comprises aperture limiting means 4c between a positive lens group 4a and a positive lens group 4b.

The aperture limiting means 4c comprises a plurality of apertures stops whose aperture portions (light transmission portions) are different in size, and predetermined ones in the plurality of aperture diaphragms 4c are arranged in a light path in a replaceable manner. Alternatively, the aperture limiting means 4c may comprise an iris diaphragm which can continuously or intermittently change a size of each aperture portion. In any case, a size of each aperture portion of the aperture limiting means 4c (and thus an image side numerical aperture NA of the image formation optical system 4) is set so that a laser beam having a necessary light intensity distribution is applied to a non-crystallized semiconductor film of the processed substrate 5 as will be described later. The image formation optical system 4 may be a refraction type optical system, may be a reflection type optical system, or may be a refraction/reflection type optical system.

The processed substrate 5 is obtained by sequentially forming an underlying insulating film, an amorphous silicon film and a cap film on a transparent substrate for a liquid crystal display, e.g., a glass sheet by a chemical vapor deposition method (CVD). Each of the underlying insulating film and the cap film is a film having electrical insulation properties, e.g., an $SiO_2$ film. The underlying insulating film prevents a non-single-crystal film, e.g., an amorphous silicon film from directly coming into contact with the glass substrate in order to avoid mixing of a foreign matter such as Na in the glass substrate into the amorphous silicon film, and also prevents heat used for fusing the amorphous silicon film from being directly transmitted to the glass substrate. The amorphous silicon film is a semiconductor film to be crystallized. The cap film is a film which is heated by a part of the light beam which enters the amorphous silicon film, and stores a temperature of this heating. This heat storage effect alleviates a relative rapid decrease in temperature of a high-temperature portion in a irradiation target surface of the amorphous silicon film when entering of the light beam is interrupted, and facilitates the crystal growth with a large particle size in the lateral direction. The processed substrate 5 is positioned and held at a predetermined position on a substrate stage 6 by, e.g., a vacuum chuck or an electrostatic chuck.

In the crystallization apparatus, each element is set as follows, for example. A wavelength λ of a laser beam exiting from the light source 3a is 248 nm. An image side numerical aperture NA of the image formation optical system 4 is 0.13, a value σ of the image formation optical system 4 is 0.47, and a magnification of the image formation optical system 4 is, e.g., ⅕ (the image formation optical system 4 may be a magnifying optical system according to needs). A dimension of a pattern of the optical modulation element 1 is indicated by a value converted for an image side of the image formation optical system 4, i.e., an image side converted value.

Figure 3A:
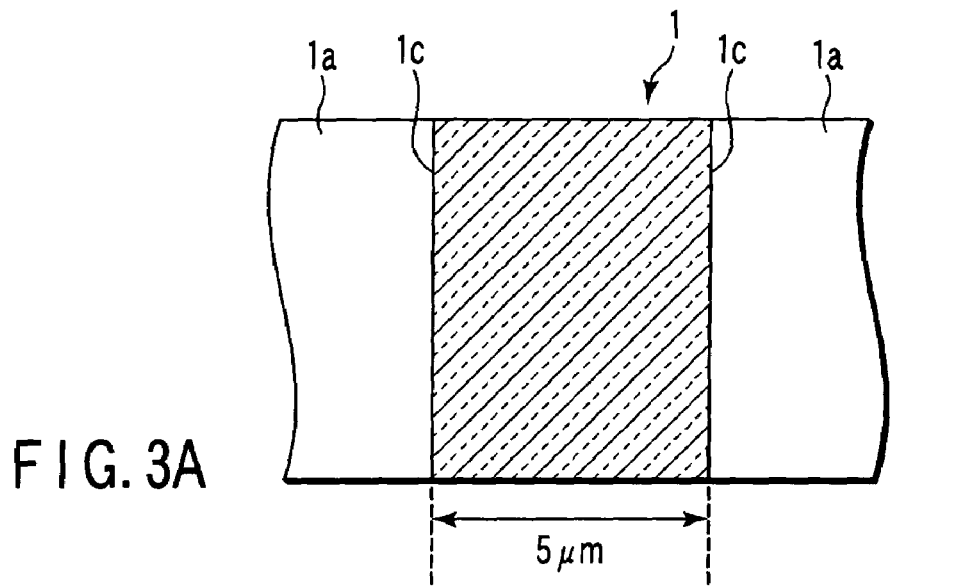
FIGS. 3A to 3C are views illustrating a structure and an effect of an optical modulation element in the first embodiment.

A structure and an effect of the optical modulation element 1 will now be described in detail with reference to FIGS. 3A to 3C. The optical modulation element 1 according to the first embodiment comprises a transparent body such as a quartz substrate and, as shown in FIG. 3A, it is a line type phase shifter having a phase difference of 60 degrees in which, e.g., a rectangular area 1a having a phase value of 0 degree and a rectangular area 1b having a phase value of 60 degrees are alternately repeated along one direction or the lateral direction. Thus, a phase difference line (a boundary between phases: a phase shift line) 1c of 60 degrees is formed between the two rectangular areas 1a and 1b. In the entire optical modulation element 1, the phase difference line 1c is formed at a predetermined pitch, e.g., a pitch of 5 μm in terms of the image side converted value (a pitch in the actually formed transparent body is 25 μm). In this specification, the term "phase difference line (a boundary between phases: a phase shift line)" means a step formed to the transparent body, and this step provides a periodic spatial distribution (an inverse peak light intensity distribution) to a light intensity of an incident light.

Figure 3B:
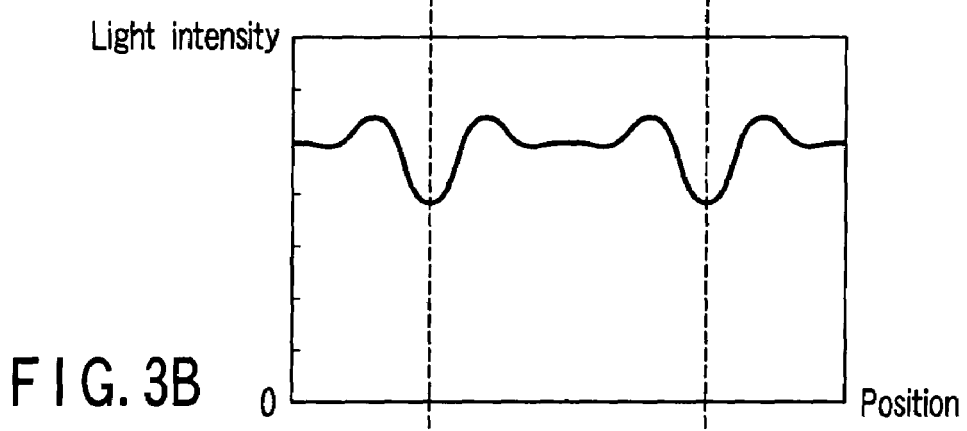

As different from the present invention, when the light beam division element 2 is not interposed, on the surface of the processed substrate 5 set to a focus position (an image surface) of the image formation optical system 4, as shown in FIG. 3B, the processed substrate 5 is irradiated with a laser beam having a symmetrical light intensity distribution with an inverse peak shape in which a light intensity is minimum in a line area corresponding to the phase difference line 1c of the optical modulation element 1 and the light intensity suddenly increases in the lateral direction from this line area. On the contrary, as shown in FIG. 3C, an asymmetrical light intensity distribution in which the light intensity is minimum in a line area displaced in the lateral direction from the line area corresponding to the phase difference line 1c of the optical modulation element 1 and the light intensity suddenly increases toward the periphery is formed on the surface of the processed substrate 5 which is set at a defocus position slightly moved from the focus position of the image formation optical system 4 by, e.g., 10 μm.

The optical modulation element 1 can be manufactured by forming a thickness distribution corresponding to a necessary phase difference to the transparent body, e.g., a quartz glass substrate by a predetermined known expression. A change in thickness of the quartz glass substrate can be accurately formed by selective etching or FIB (Focused Ion Beam) processing.

A structure and an effect of the light beam division element 2 will now be described with reference to FIGS. 4A and 4B.

Figure 4A:
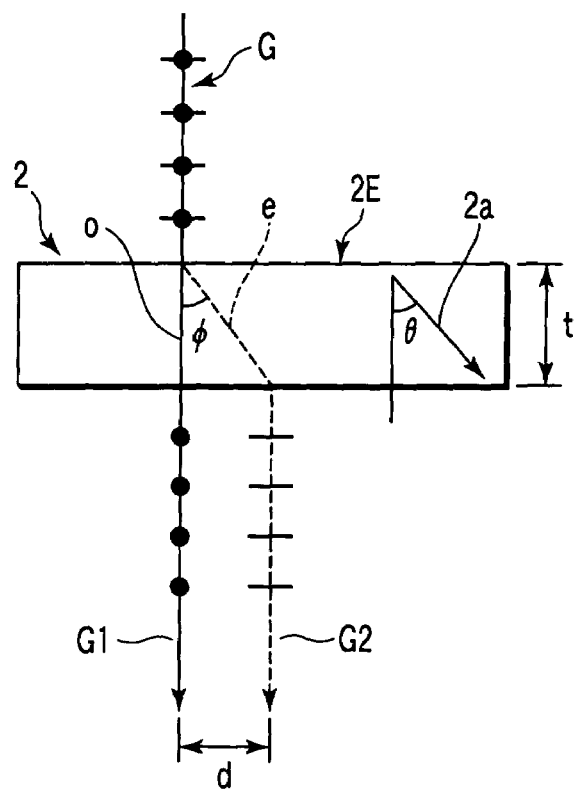
FIGS. 4A and 4B are views illustrating a structure and an effect of a light beam division element used in the present invention.
Figure 4B:
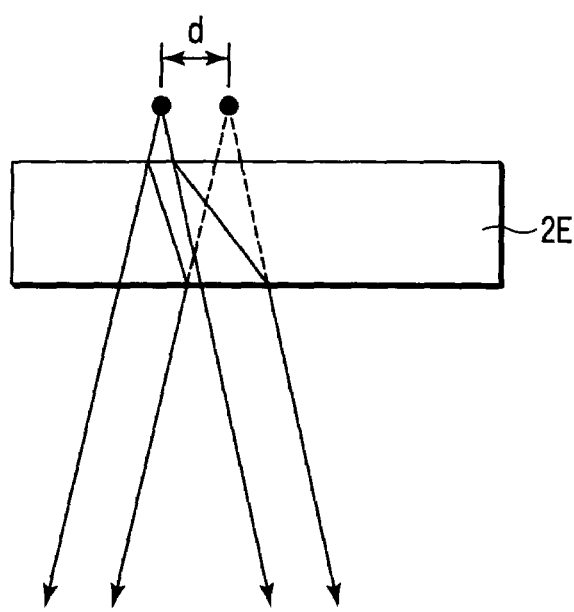

Referring to FIG. 4A, the light beam division element 2 is, e.g., a birefringent element 2E comprising a birefringent plane-parallel plate which is set in such a manner that its crystal optical axis 2a forms a predetermined angle θ with respect to an optical axis of the illumination system. As a birefringent optical material forming the birefringent element 2E, it is possible to use, e.g., quartz, calcite, magnesium fluoride or the like.

In such a light beam division element, when, e.g., a randomly-polarized light ray (laser beam) G enters the birefringent element 2E in parallel with the optical axis of the illumination system, a linearly-polarized light ray whose polarizing direction is a direction vertical to a page space of FIG. 4A, i.e., a normal light ray o (a first light beam G1) advances straight without being affected by the refraction of the birefringent element 2E and exits in parallel with the optical axis. On the other hand, a linearly-polarized light ray whose polarizing direction is a horizontal direction in the page space of FIG. 4A, i.e., an abnormal light ray e (a second light beam G2) is refracted by an incidence interface of the birefringent element 2E, advances in a direction forming an angle φ with the optical axis, then refracted by an projecting interface of the birefringent element 2E and exits in parallel with the optical axis. This phenomenon is widely known, and described in detail in, e.g., "Introduction to Optics (Kougaku Gairon) II", the chapter 5 by Junpei Tsujinai, published by Asakura Shoten, "Basic Optics <Ray Optics/Electromagnetic Optics> (Kiso Kougaku <Kousen Kougaku/Denji Kougaku); by Keiei Kudou and Tomiya Uehara, published by Gendai Kougaku Sha, and others. This reference is incorporated herein.

At this time, a distance between the normal light ray (the first light beam) C1 exiting from the birefringent element 2E in parallel with the optical axis and the abnormal light ray (the second light beam) G2, i.e., a separation width (a separation distance) d is dependent on a type of an optical material forming the birefringent element 2E, a direction with the crystal optical axis, a cutting method, a dimension of the birefringent element 2 in the optical axis direction, i.e., a thickness and others. That is, the separation width (the separation distance) d is determined by characteristics and a shape of a material constituting the birefringent element 2E, and set to be a value obtained by dividing a pitch of the phase difference line of the optical modulation element 1 by an odd number. FIG. 4B is a view schematically showing how each point on the optical modulation element 1 is divided into two points by the birefringent element 2E and observed. The separation width d obtained by the birefringent element 2E is a value on an object side of the image formation optical system 4, and the separation width on the image surface of the image formation optical system 4 is a value obtained by multiplying the separation width d by a magnification ⅕ of the image formation optical system 4.

A separation width d obtained when causing a light ray to vertically enter a birefringent element 2 comprising a plane-parallel plate formed of a uniaxial crystal material can be represented by the following Expression (1):

$$d = \tan \phi \times t \qquad (1)$$

where $\tan \phi = (no^2 - ne^2)\sin\theta \cdot \cos\theta / (ne^2\cos^2\theta + no^2\sin^2\theta)$.

In Expression (1), no is a refraction factor of the normal light ray o, and ne is a refraction factor of the abnormal light ray e. Further, as described above, φ is an angle formed by the abnormal light ray e and a normal line (i.e., an optical axis) of the incidence interface, θ is an angle formed by the crystal optical axis 2a and the normal line of the incidence interface, and t is a thickness of the birefringent element 2E.

For example, obtaining a thickness t of the birefringent element 2 required to acquire the separation width d=25 μm when the birefringent element 2E formed of artificial quartz set to a light having a wavelength of 248 nm and θ=degrees is used, since refraction factors of the artificial quartz with respect to the light having a wavelength of 248 nm are ne=1.6124 and no=1.6016, t=3697 μm is obtained. In this embodiment, a plane-parallel plate which is formed of artificial quarts and has an angle θ of the crystal optical axis set to 45 degrees and a thickness t of 3697 μm is used as the birefringent element 2E. Therefore, the separation width d obtained by the birefringent element 2E is 25 μm, and the separation width on the image surface of the image formation optical system 4 is 5 µm.

A cooperative effect of the optical modulation element 1 and the light beam division element 2 will now be described with reference to FIGS. 5A to 5C.

As described above, when the birefringent element 2E is not interposed in the crystallization apparatus shown in FIG. 1, a symmetrical light intensity distribution with an inverse peak shape in which a light intensity is minimum in a line area corresponding to the phase difference 1c of the optical modulation element 1 and the light intensity suddenly increases toward the periphery is formed as shown in FIG. 3B on the surface of the processed substrate 5 set at the focus position of the image formation optical system 4 as mentioned above. On the other hand, when the birefringent element 2E shown in FIGS. 4A and 4B is interposed in the crystallization apparatus shown in FIG. 1, since the incident light beam G is divided into two non-interference light beams G1 and G2 having polarization states, a predetermined light intensity distribution corresponding to a combination of the two light intensity distributions with the inverse peak shape separated from each other is formed on the surface of the processed substrate 5.

At this moment, if the light beam entering the birefringent element 2E is in a randomly-polarized state, the intensities of the two light beams divided through the birefringent element 2E become substantially equal. Moreover, when the two light beams divided through the birefringent element 2E are overlapped on the surface of the processed substrate 5, the two light beams are simply combined as a sum of light intensities because these light beams do not interfere with each other. As described above, in this embodiment, the step 1c of the optical modulation element 1 is formed with a pitch of 5 µm (an image side converted value), and a gap between the two light intensity distributions with the inverse peak shape on the surface of the processed substrate 5 (i.e., the separation width on the image surface of the image formation optical system 4) is also 5 µm.

In other words, the gap between the two light intensity distributions with the inverse peak shape divided by the birefringent element 2E which is image-formed on the surface of the processed substrate 5 is set to correspond to the gap between the phase difference lines 1c of the optical modulation element 1 (generally correspond to odd-fold of the gap between the phase difference lines 1c). This embodiment is an example where a multiple of odd-fold is 1, and any other number such as 3, 5, 7, . . . can be used. Therefore, in the focus state, the light intensity distribution with the inverse peak shape formed by the normal light ray o (FIG. 5A) and the light intensity distribution with the inverse peak shape formed by the abnormal light ray e (FIG. 5B) just completely overlap one another. As a result, as shown in FIG. 3B, the symmetrical light intensity distribution with the inverse peak shape in which the light intensity is minimum in the line area corresponding to the phase difference line 1c of the optical modulation element 1 and the light intensity suddenly increases toward the periphery (FIG. 5C) is finally formed on the surface of the processed substrate 5 without being affected by the birefringent element 2E.

Figure 3C:
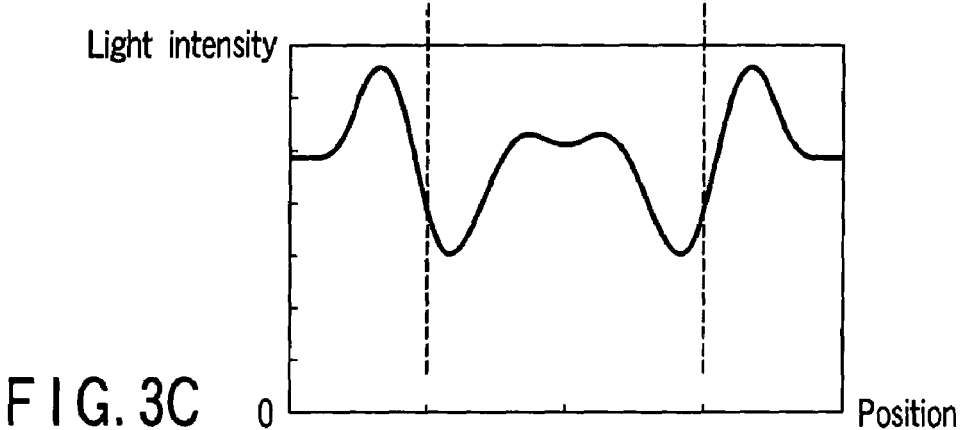

On the other hand, when the birefringent element 2 is not interposed, the asymmetrical light intensity distribution with the inverse peak shape in which the light intensity is minimum in a line area displaced from the line area corresponding to the phase difference line 1c of the optical modulation element 1 and the light intensity suddenly increases toward the periphery is formed on the surface of the processed substrate 5 set at the defocus position of the image formation optical system 4 as shown in FIG. 3C. As to the light beam transmitted through the birefringent element 2E, since the incident light beam is divided into two non-interference light beams having polarization states, a predetermined light intensity distribution corresponding to a combination of the two asymmetrical light intensity distributions having the inverse peak shape separated from each other is formed on the surface of the processed substrate 5.

Figure 5A:
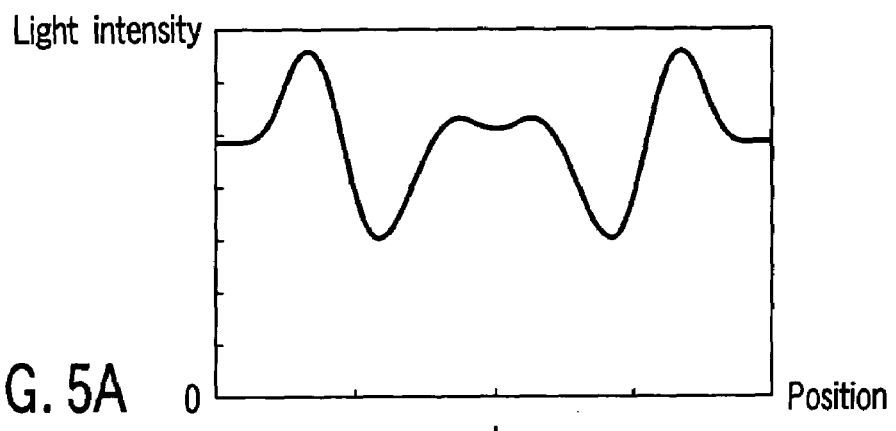
FIGS. 5A to 5C are views illustrating a cooperative effect of the optical modulation element and the light beam division element in the first embodiment.
Figure 5B:
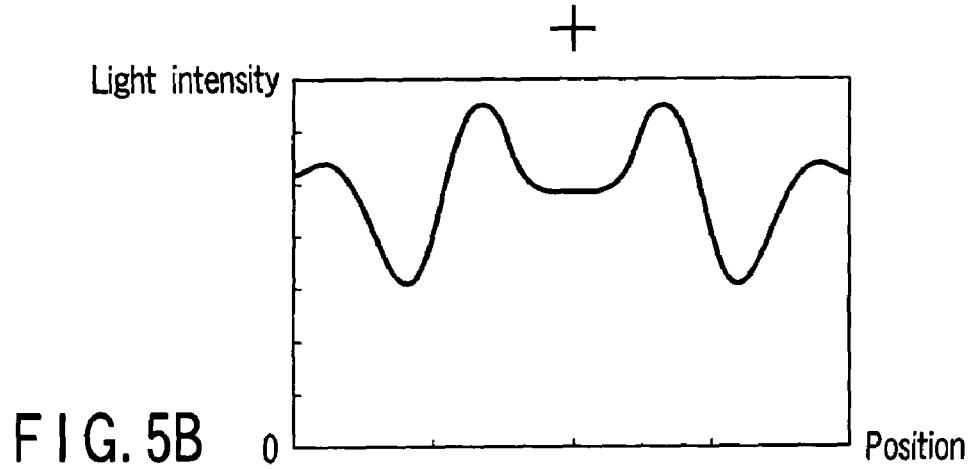

That is, in the defocus state, the asymmetrical light intensity distribution with the inverse peak shape formed by the normal light ray o such as shown in FIG. 5A and the asymmetrical light intensity distribution with the inverse peak shape formed by the abnormal light ray e such as shown in FIG. 5B are formed. Here, the asymmetrical light intensity distribution with the inverse peak shape shown in FIG. 5A and the asymmetrical light intensity distribution with the inverse peak shape shown in FIG. 5B are displaced by 5 µm on the surface of the processed substrate 5 by the effect of the birefringent element 2E. Further, the two light intensity distributions with the inverse peak shape which are adjacent in FIG. 31C are symmetrical with respect to a line area corresponding to an intermediate line of the two adjacent phase difference lines 1c, and a pitch of the line area corresponding to the intermediate line is also 5 µm.

Figure 5C:
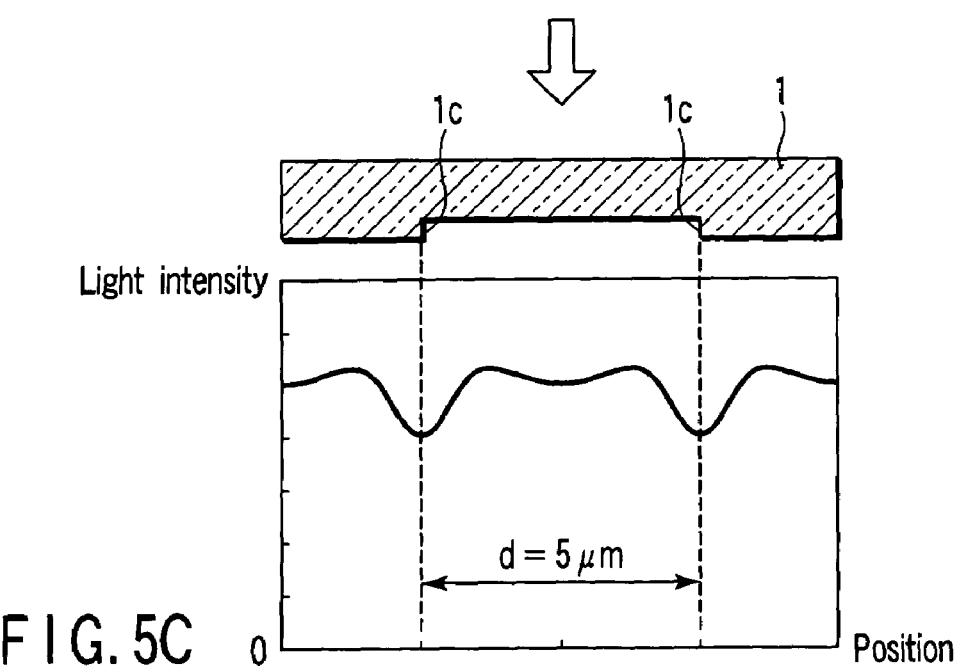

Therefore, in the defocus state, the symmetrical light intensity distribution with the inverse peak shape such as shown in FIG. 5C is formed by a combination of the asymmetrical light intensity distribution with the inverse peak shape formed by the normal light ray o and the asymmetrical light intensity distribution with the inverse peak shape formed by the abnormal light ray e. In the defocus state, an inverse peak point at which the light intensity is minimum does not deviate from the line area corresponding to the phase difference line 1c in the light intensity distribution with the inverse peak shape formed on the surface of the processed substrate 5. FIG. 5 shows a cross-section of the optical modulation element 1 depicted in FIG. 3A, and this cross section is associated with the phase difference lines 1c by dotted lines.

As described above, since the apparatus according to this embodiment uses the optical modulation element 1 having a phase shift pattern in which a phase difference is 60 degrees (a phase difference is substantially different from 180 degrees), the minimum light intensity at the inverse peak point has a value which is larger than 0 to some extent in the light intensity distribution with the inverse peak shape formed on the surface of the processed substrate 5. Furthermore, all or almost all of an irradiation target area can be set to a fusing area. Moreover, although a board thickness deviation which can be a factor of defocusing unavoidably exists in the processed substrate 5, the light intensity distribution with the inverse peak shape formed on the surface of the processed substrate 5 becomes symmetrical due to the cooperative effect of the optical modulation element 1 and the light beam division element 2 without being affected by defocusing. As a result, in this embodiment, a desired light intensity distribution with the inverse peak shape can be stably formed based on a deep focal depth, and a filling rate of a crystal grain formed on the semiconductor film of the processed substrate 5 can be increased.

In the above-described embodiment, in order to suppress an aberration generated by the birefringent element 2E, it is desirable to form the birefringent to be appressed against the optical modulation element 1 or move the birefringent element 2E closer to the optical modulation element 1 as much as possible. However, since irregularities in strength occur due to interference when reflection is repeatedly generated between the surface of the birefringent element 2E and the surface of the optical modulation element 1, it is preferable to provide means for compensating the irregularities. As the means for compensation, it is possible to use a refraction factor matching material provided between the two elements, a coat surface of a reflection free material formed on the opposed surfaces of the two elements, and others.

Additionally, the birefringent element 2E and the optical modulation element 1 can be integrated with each other by providing a phase difference by subjecting the light incidence surface of the birefringent element 2E to a surface treatment. Further, although the birefringent element 2E is arranged in close proximity to the optical modulation element 1 on the rear side (the exiting light side) of the optical modulation element 1 in the above-described embodiment, the present invention is not restricted thereto, and the birefringent element 2E can be arranged at or in the vicinity of a conjugate position of the optical modulation element 1. Of course, the both elements may be arranged in such a manner that they are greatly separated from each other.

Furthermore, since the birefringent element 2E is formed of a birefringent plane-parallel plate in the above-described embodiment, the normal light ray o and the abnormal light ray e have different optical paths. Therefore, a phase difference is generated between the two light beams divided through the birefringent element 2E, and image formation positions of the two light beams are separated from each other in the optical axis direction. In order to avoid this problem, it is possible to use a Savart plate comprising a pair of birefringent plane-parallel plates each of which is set so that a crystal optical axis forms a predetermined angle with respect to an optical axis. This example will now be described with reference to FIGS. 6A and 6B.

Figure 6A:
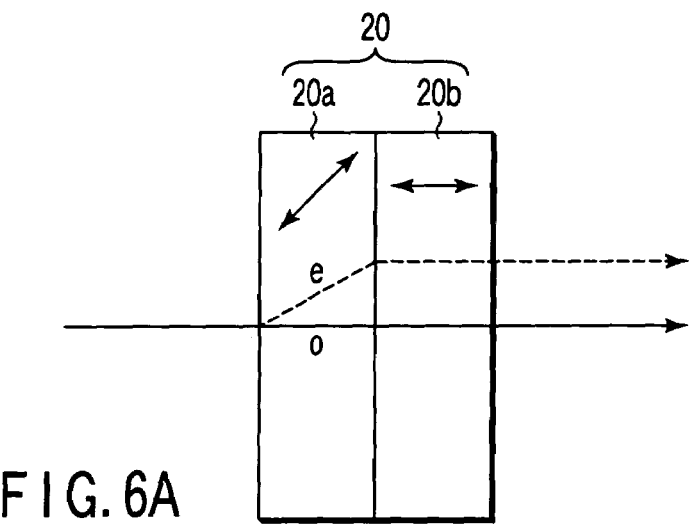
FIGS. 6A and 6B are views illustrating a structure and an effect of a Savart plate which can be used as the light beam division element in the first embodiment.
Figure 6B:
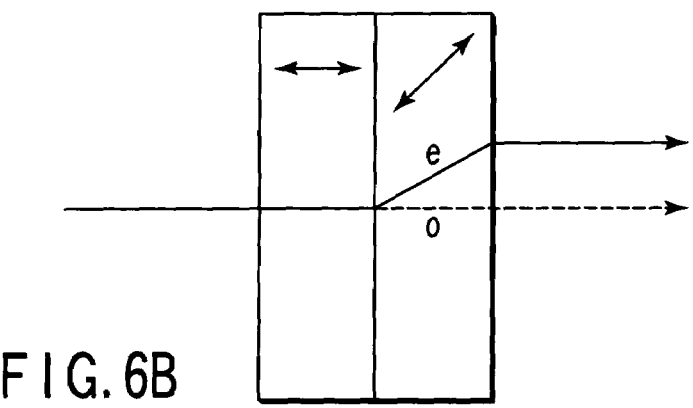

A pair of plane-parallel plates 20a and 20b constituting a Savart plate 20 have the same thickness, and each of these plates is set so that its crystal optical axis forms an angle of approximately 45 degrees with respect to an optical axis. That is, the second plane-parallel plate 20b is in a state in which the first plane-parallel plate 20a is rotated around the optical axis 90 degrees. In the Savart plate 20, since an optical path length of the normal light ray o and that of the abnormal light ray e become equal to each other as shown in FIG. 6A, such an image formation position separation problem due to a phase difference as described above does not occur.

Alternatively, a modification of the Savart plate based on so-called Francon can be used as the light beam division element in order to avoid the image formation position separation problem due to a phase difference. This example will now be described with reference to FIG. 7.

A birefringent element 21 according to the modification of the Savart plate based on Francon comprises a pair of birefringent plane-parallel plates 21a and 21b each of which is set in such a manner that its crystal optical axis forms a predetermined angle with respect to the optical axis and a half wave plate 21c provided between the pair of plane-parallel plates 21a and 21b.

Figure 7:
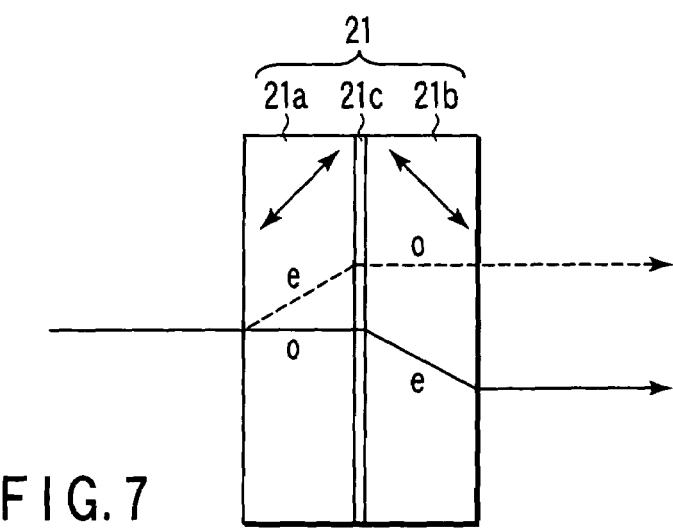
FIG. 7 is a view illustrating a structure and an effect of a modification of a Savart plate which can be used as the light beam division element in the embodiment.

Each of the pair of plane-parallel plates 21a and 21b constituting the birefringent element 21 is set in such a manner that its crystal optical axis forms an angle of approximately 45 degrees with respect to the optical axis. That is, the first plane-parallel plate 21a and the second plane-parallel plate 21b are arranged to be symmetrical with respect to the half wave plate 21c. Furthermore, the normal light ray o is converted into the abnormal light ray e and the abnormal light ray e is converted into the normal light ray o through the half wave plate 21c. As a result, in the birefringent element 21, the optical path length of the normal light ray o and that of the abnormal light ray e become equal to each other as shown in FIG. 7, and hence such an image formation position separation problem due to a phase difference as described above is not generated.

Figure 8:
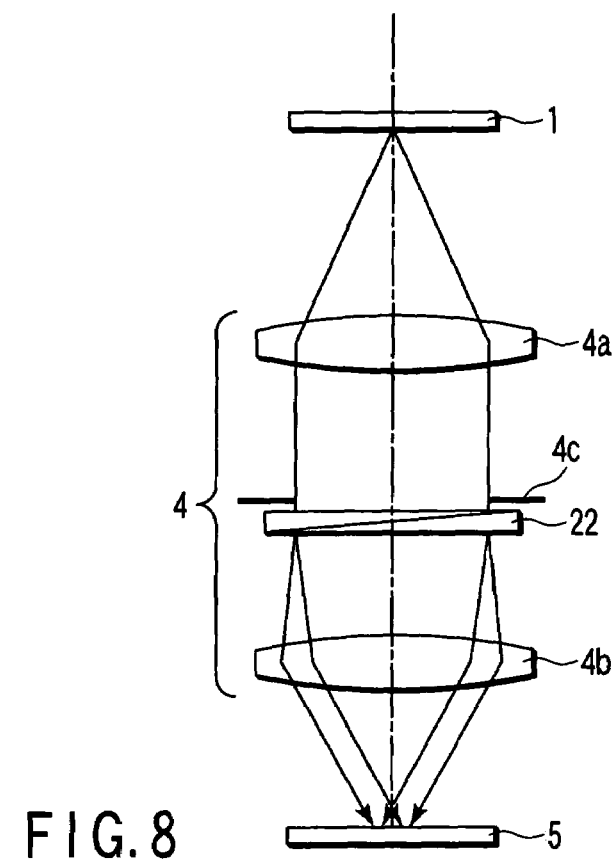
FIG. 8 is a view showing a modification in which a birefringent element is arranged on or in the vicinity of a pupil surface of an image formation optical system.
Figure 9:
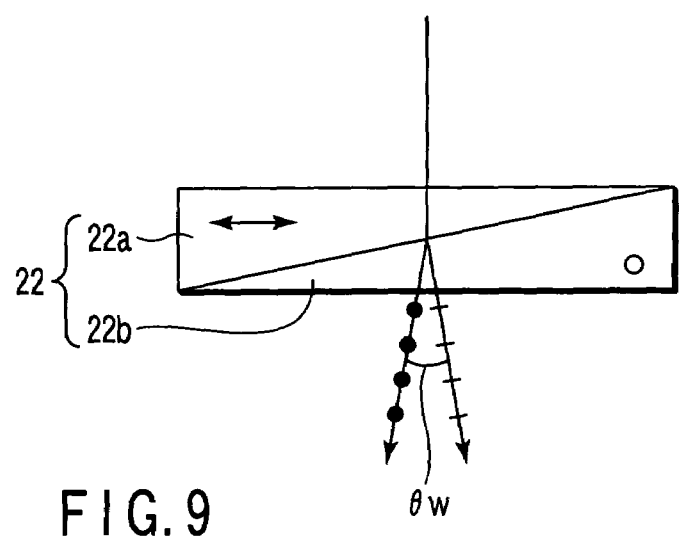
FIG. 9 is a view illustrating a structure and an effect of a Wollaston prism depicted in FIG. 8.

In the above-described embodiment, the birefringent element 2E arranged in the vicinity of the optical modulation element 1 is used as the light beam separation element 2. However, the present invention is not restricted thereto, and a birefringent element 22 arranged on or in the vicinity of a pupil surface of the image formation optical system 4 can be used as shown in FIG. 8 in place of the birefringent element 2E. As shown in FIG. 9, this birefringent element 22 is a Wollaston prism comprising a pair of birefringent polarizing prisms 22a and 22b each of which is set in such a manner that its crystal optical axis forms a predetermined angle with respect to the optical axis.

Here, the crystal optical axis of the first polarizing prism 22a is horizontally set with respect to the page space of FIG. 9, and the crystal optical axis of the second polarizing prism 22b is vertically set with respect to the page space of FIG. 9. That is, the plane-parallel plate type Wollaston prism 22 comprises the pair of polarizing prisms 22a and 22b whose crystal optical axes are orthogonal to each other. The Wollaston prism 22 divides an incident light into two light beams having polarization states, i.e., a linearly-polarized light beam whose polarizing direction is a direction vertical to the page space of FIG. 9 and a linearly-polarized light beam whose polarizing direction is a direction parallel to the page space of FIG. 9.

In this example, the two light beams having polarizing states are divided at a polarizing angle which is symmetrical with respect to an incident light. A division angle $\theta_W$ of the two light beams divided by the Wollaston prism 22 is represented by the following Expression (2) provided that a refraction factor of the normal light ray o is no and a refraction factor of the abnormal light ray e is ne.

$$\sin \theta_W = 2(ne-no)\tan \theta_W \{1-(ne-no)^2 \cdot \tan^2\theta_W/2 + \ldots \} \quad (2)$$

When the Wollaston prism 22 is used as the light beam division element 2, the same advantage as that of the above-described embodiment can be obtained by appropriately setting the division angle $\theta_W$. It is also possible to use a Rochon prism or a de Senarmont prism as the light beam division element 2 which performs angle division in polarizing directions like the Wollaston prism. Furthermore, a Fresnel (multiple) prism can be also used as an element which performs angle division in clockwise polarizing direction and a counterclockwise polarizing direction. The light beam division element 2 or the Savart plate is generically referred to as a double imager since two images of an object can be seen through such a member.

Figure 10A:
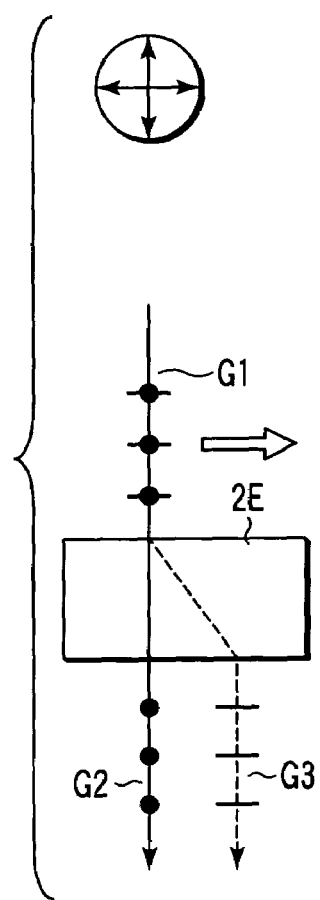
FIGS. 10A to 10C are views showing a modification in which a control element which controls a polarization state of a light beam entering the birefringent element is additionally provided.
Figure 10B:
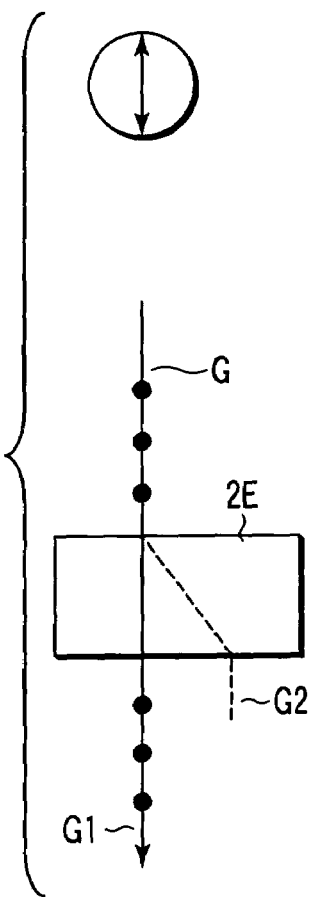

In the above-described embodiment, it is assumed that a randomly-polarized light beam enters the birefringent element 2E as shown in FIG. 10A and intensities of two light beams divided by the birefringent element 2E are substantially equal to each other. However, if there is a deflection in a polarization state of the light beam entering the birefringent element 2E, intensities of the two light beams divided by the birefringent element 2E do not become equal to each other. Specifically, as shown in FIG. 10B, when a linearly-polarized light beam G whose polarizing direction is a direction vertical to the page space of FIG. 10B enters the birefringent element 2E, the incident light beam advances straight and passes through the birefringent element 2E while maintaining its polarization state and is turned into an exiting light beam G1. A light beam G2 obtained from the abnormal light ray has a very weak intensity, only the light beam G1 practically exists, and the incident light beam is not divided. Division of the incident light beam means that the normal light ray and the abnormal light ray are separated while each ray has a certain extent of intensity, and it is desirable that the light intensity of the divided light beam is substantially equivalent to the light intensity of the incident light beam.

When the intensities of the two light beams divided by the birefringent element 2E are far different from each other, the minimum light intensity at the inverse peak point does not become fixed in the light intensity distribution with the inverse peak shape formed on the surface of the processed substrate 5. As a result, the crystal growth starts from the vicinity of the two types of inverse peak points having different light intensities, and there occurs a problem that there is a difference in size and shape of a crystal to be formed. Thus, when there is a deflection in polarization state of the two light beams entering the birefringent element 2E, it is preferable to additionally provide a control element which controls a polarization state of the light beam entering the birefringent element 2E so that the two light beams divided by the birefringent elements 2E have substantially equal intensities.

Figure 10C:
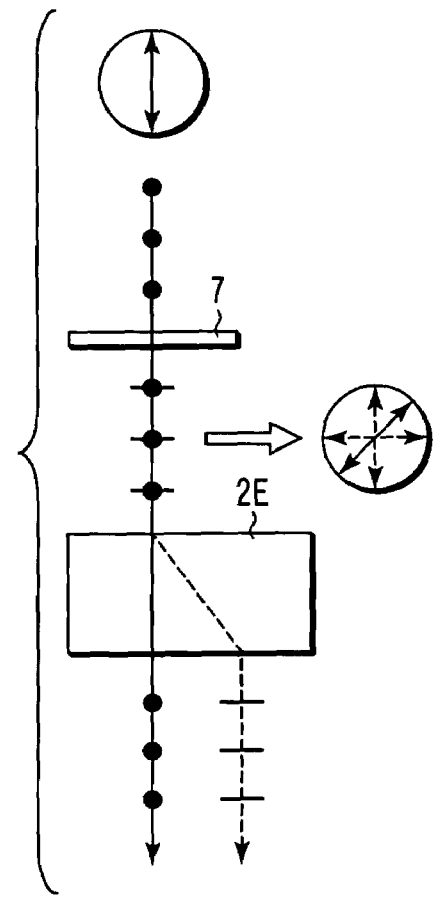

As the control element which controls a polarization state of the light beam entering the birefringent element 2E, as shown in FIG. 10C, a half wave plate 7 arranged on the incidence side of the birefringent element 2E can be used. Specifically, when a linearly-polarized light beam whose polarizing direction is a direction vertical to the page space of FIG. 10C enters the half wave plate 7, the polarizing direction of the light beam is rotated around the optical axis by 45 degrees by the effect of the half wave plate 7 and this light beam enters the birefringent element 2. As a result, like the example where the randomly-polarized light beam enters the birefringent element 2, the two light beams divided by the birefringent element 2E have substantially equal intensities. It is to be noted that the divided two light beams can have substantially equal intensities by converting the linearly-polarized light into a circularly-polarized light and causing the obtained light to enter the birefringent element 2E by using a quarter wave plate in place of the half wave plate 7.

Second Embodiment

Figure 11A:
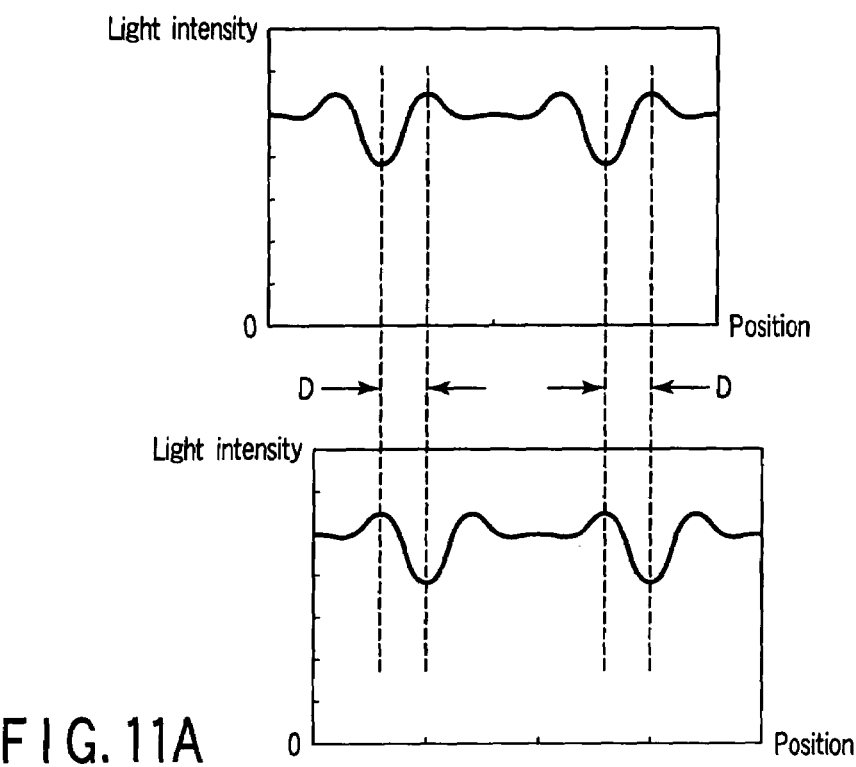
FIGS. 11A and 11B are views illustrating a technique which substantially erases an inverse peak or reduces a depth of the inverse peak by overlapping an inverse peak point and a peak shape position on one side.
Figure 11B:
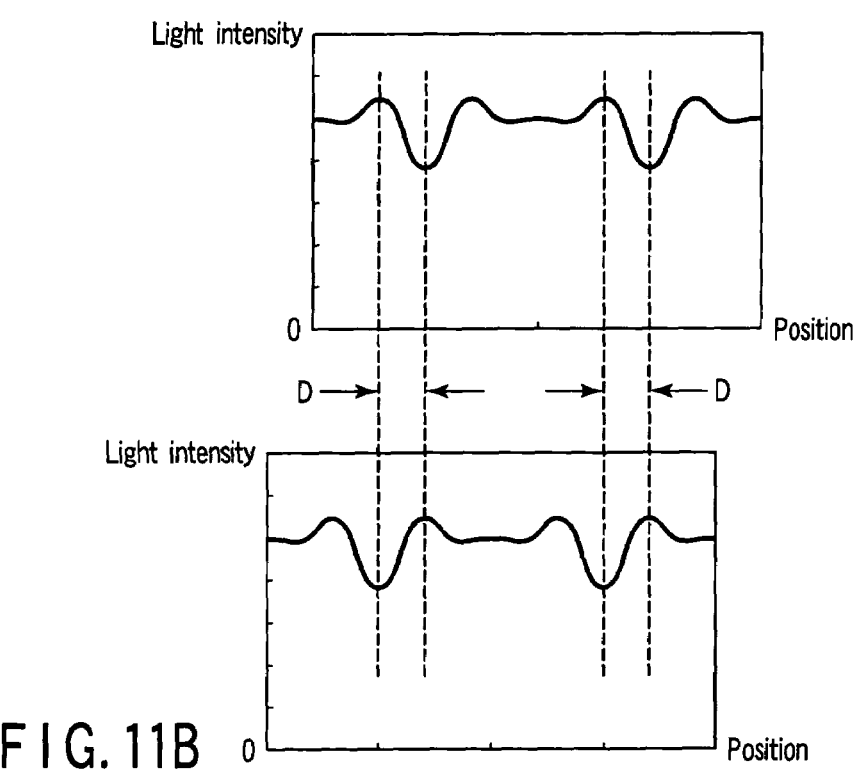

In the first embodiment, since the gap between the two light intensity distributions with the inverse peak shape divided by the birefringent element 2E corresponds to the gap between the phase difference lines 1c, the minimum light intensity at the inverse peak point is fixed in the light intensity distribution with the inverse peak shape obtained by combination of the two light intensity distributions. On the contrary, as shown in FIGS. 11A and 11B, when the gap between the two light intensity distribution with the inverse peak shape is intentionally deviated from the gap between the phase difference lines 1c and the inverse peak point is superimposed on the peak shape position on one side, the peak can be substantially erased or the inverse peak can be formed shallow.

Here, the term "inverse peak" means a concave curve which represents the minimum light intensity distribution formed by the optical modulation element 1. The term "inverse peak point" means a point which has the minimum light intensity value of this concave curve. The term "peak shape" means a shape of the light intensity distribution curve which shows the minimum light intensity of the inverse peak pattern. By substantially erasing the peak, even when the maximum light intensity has a temperature which is not less than a temperature at which ablation occurs, the light intensity is controlled so that no ablation is generated, and the crystal growth can be prevented from stopping at the peak portion. Therefore, the crystal growth continues, and greater crystallization is enabled. A gap D between the inverse peak point and the peak shape position can be approximated by the following Expression (3).

$$D \approx 0.5 \times \lambda / NA \tag{3}$$

Figure 12A:
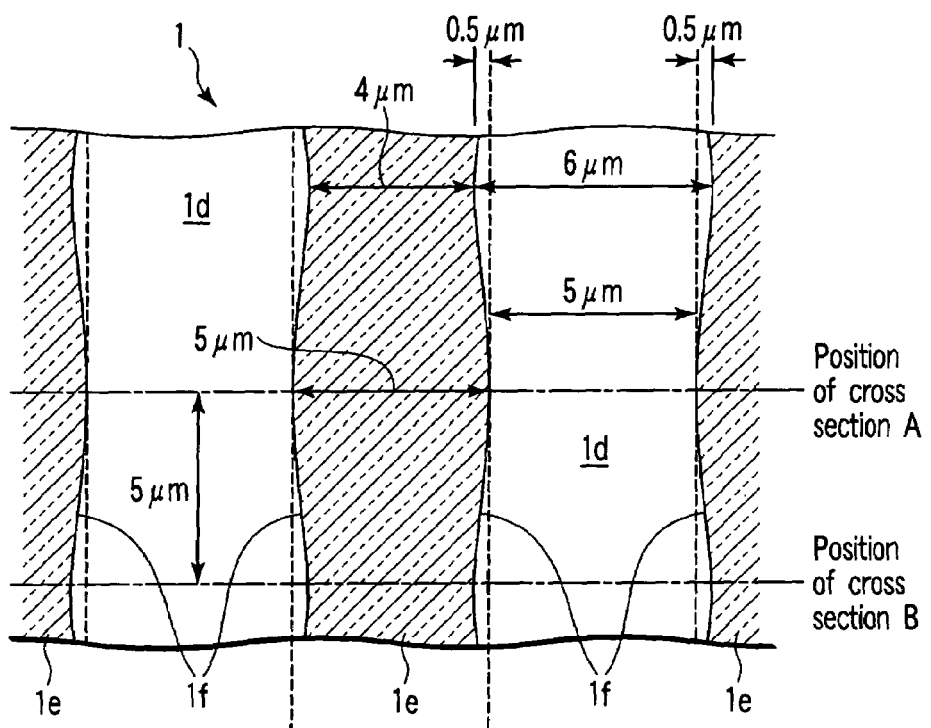
FIGS. 12A to 12C are views schematically showing a structure of an optical modulation element in a second embodiment and a light intensity distribution to be formed.

In this embodiment, like the first embodiment, $\lambda$ is set to 248 nm and NA is set to 0.13. Therefore, the gap D between the inverse peak point and the peak shape position is approximately 1 µm. FIG. 12A is a view schematically showing a structure of the optical modulation element 1 and a light intensity distribution to be formed in the second embodiment. In the optical modulation element 1 according to the first embodiment, as shown in FIG. 3A, the rectangular area 1a having a phase value of 0 degree and the rectangular area 1b having a phase value of 60 degrees are alternately repeated along the lateral direction, and the phase difference 1c of 60 degrees is formed at a pitch of 5 µm in terms of an image size converted value.

On the contrary, in the optical modulation element 1 according to the second embodiment, as shown in FIG. 12A, an area 1d having a phase value of 0 degree and an area 1e having a phase value of 60 degrees are alternately repeated along the lateral direction, but this element is preferable when a crystallization target position should be two-dimensionally and more accurately determined. In the optical modulation element 1 in which the area 1d having the phase value of 0 degree and the area 1e having the phase value of 60 degrees are alternately repeated along one direction, when a part of 5 µm (a reference interval) and a part of 4 µm (a correction interval) are formed with respect to the width of the area 1e having the phase value of 60 degrees for example, an inverse peak is formed at the part of 5 µm only. A formation position or a size of the reference interval is determined in accordance with a position where a transistor circuit is formed or a superficial content of a crystallized area. That is, a gap between two adjacent phase difference lines 1f (widths of the areas 1d and 1e) is 5 µm at a position of a cross section A, and the area 1e has a width of 4 µm or the area 1d has a width of 6 µm at a position of a cross section B separated from the position of the cross section A by a distance of, e.g., 5 µm in a direction along the phase difference line 1f. That is, in the optical modulation element 1 according to the second embodiment, the gap between the two light intensity distributions with the inverse peak shape corresponds to the gap between the phase difference lines 1f at the position of the cross section A.

However, at a position of a cross section other than the position of the cross section A, the gap between the two light intensity distributions with the inverse peak shape divided by the optical division element 2 deviates from the gap between the phase difference lines if, and a maximum deviation quantity is 1 µm at the position of the cross section B. As described above, in the optical modulation element 1 according to the second embodiment, the gap between the two adjacent phase difference lines 1f repeats an increase and a decrease between 5 µm as a first reference interval (a designed value) and 4 µm or 6 µm as a first correction interval along the direction of the phase difference line 1f. Moreover, a correction quantity C corresponding to an absolute value of a difference between the first correction interval and the first reference interval between the two adjacent phase lines if is not more than 1 μm, and satisfies the following Expression (4).

$$C \leq 0.5 \times \lambda/NA \quad (4)$$

Figure 12B:
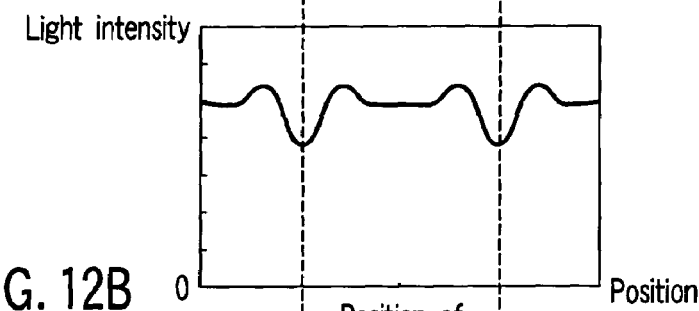
Figure 12C:
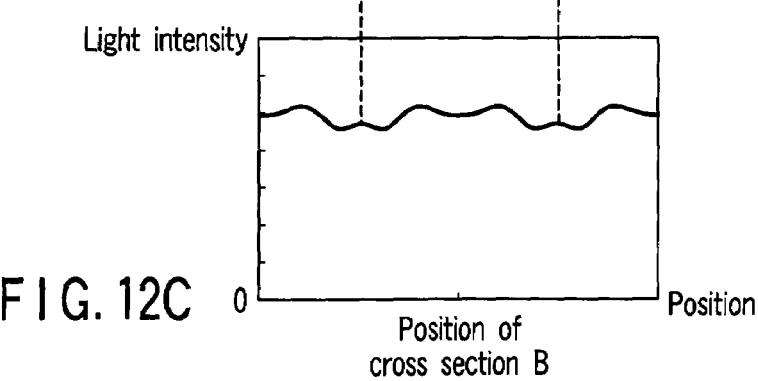

As described above, in this embodiment, the gap between the two light intensity distributions with the inverse peak shape corresponds to the gap between the phase difference lines if at the position of the cross section A of the optical modulation element 1. Therefore, as shown in FIG. 12B, the light intensity distribution with the inverse peak shape is formed at a surface position of the processed substrate 5 corresponding to the position of the cross section A of the optical modulation element 1 shown in FIG. 12A. On the other hand, the gap between the two light intensity distributions with the inverse peak shape is caused to deviate from the gap between the phase difference lines if by approximately the gap D at the position of the cross section B of the optical modulation element 1 shown in FIG. 12A, and the inverse peak point is superimposed on the peak shape position on one side of this point. Therefore, the light intensity distribution in which the inverse peak is substantially erased is formed at the surface position of the processed substrate 5 corresponding to the position of the cross section B of the optical modulation element 1 as shown in FIG. 12C.

In the optical modulation element 1 according to the second embodiment, the gap between the two adjacent phase difference lines 1f repeats an increase and a decrease between 5 μm as the first reference interval and 4 μm or 6 μm as the first correction interval along the direction of the phase difference line 1f. Therefore, the light intensity of the inverse peak point is minimum at the surface position of the processed substrate corresponding to the position of the cross section A of the optical modulation element 1, and the light intensity of the inverse peak point increases toward the surface position of the processed substrate 5 corresponding to the position of the cross section B in the direction of the phase difference line 1f.

As a result, in the second embodiment, the inverse peak point can be restricted to the surface position of the processed substrate 5 corresponding to the position of the cross section A of the optical modulation element 1. That is, in the second embodiment, it is possible to realize the advantage of two-dimensionally determining a crystal formation position in addition to the advantage of the first embodiment.

Third Embodiment

In the first embodiment, an unnecessary peak shape appears on both sides of the inverse peak in the light intensity distribution with the inverse peak shape formed in the focus state in particular. As described above, existence of the peak shape can be a factor of ablation and a factor which stops the crystal growth. First, before the concrete explanation of the third embodiment, a principle of occurrence of the peak shape on both sides of the inverse peak will be described. In general, a complex amplitude distribution U(x, y) of a formed image obtained by the image formation optical system 4 can be represented by the following Expression (5) when a proportionality coefficient is eliminated.

$$U(x, y)=O(x, y)*PSF(x, y) \quad (5)$$

In Expression (5), O(x, y) represents a complex amplitude transmittance distribution of an object; *, a convolution (convolution integral); and PSF(x, y), a point spread function of the image formation optical system 4. In this example, the point spread function is defined as a complex amplitude distribution of a point image obtained by the image formation optical system 4. When the image formation optical system 4 has an even circular pupil and no aberration, the point spread function PSF(x, y) is represented by the following Expression (6).

$$PSF(x, y)=2J_1(a \cdot r)/(a \cdot r) \quad (6)$$

where $a=(2\pi \cdot NA)/\lambda$
$r=(x^2+y^2)^{1/2}$

Figure 13:
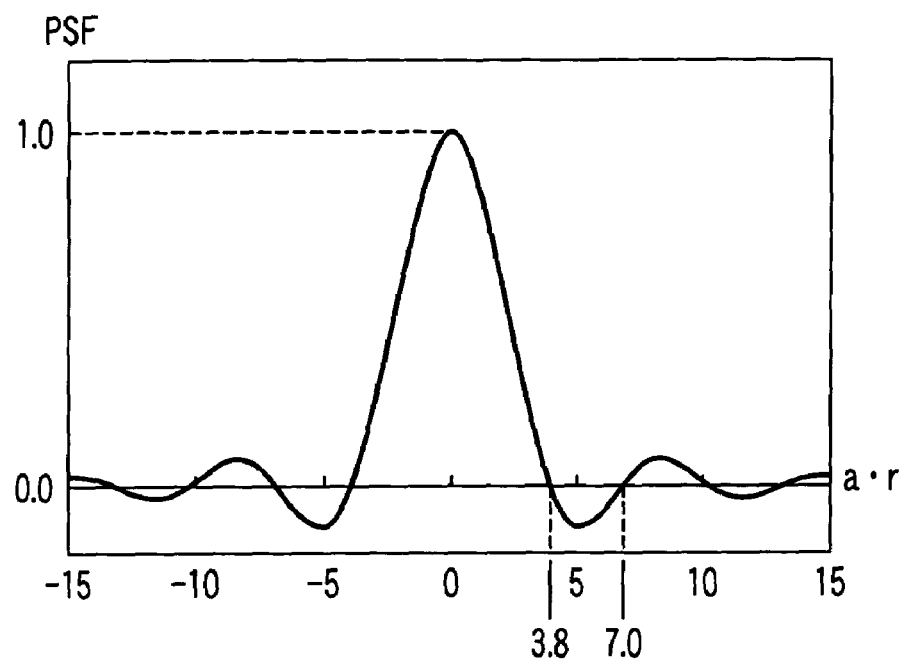
FIG. 13 is a view showing a point spread function PSF of an image formation optical system which has an even circular pupil and is aplanatic.

In Expression (6), $J_1$ represents a Bessel function; λ, a wavelength of a light; and NA, an image side numerical aperture of the image formation optical system 4 as described above. FIG. 13 shows the point spread function PSF based on Expression (6). In FIG. 13, a vertical axis represents a value of the point spread function PSF, and a horizontal axis represents a value of (a·r). Referring to FIG. 13, there is an area in which a value of the point spread function PSF is negative, i.e., a "negative area", and existence of this negative area is a factor of occurrence of a peak shape.

In this example, a positional range of the negative area closest to an origin is represented by the following Expression (7). Further, when substituting $a=(2\pi \cdot NA)/\lambda$ in Expression (7), a relationship represented by the following Expression (8) can be obtained.

$$3.8 < a \cdot r < 7.0 \quad (7)$$

$$0.61 \times \lambda/NA < r < 1.11 \times \lambda/NA \quad (8)$$

Figure 14A:
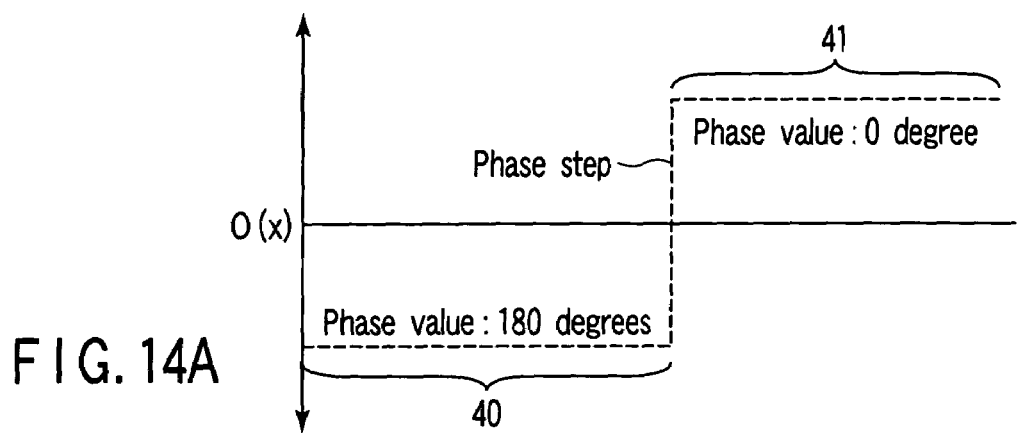
FIGS. 14A to 14D are views illustrating how a peak shape is generated on both sides of an inverse peak when a light intensity distribution with an inverse peak shape is formed by using a line type phase shifter whose phase step has 180 degrees.
Figure 14B:
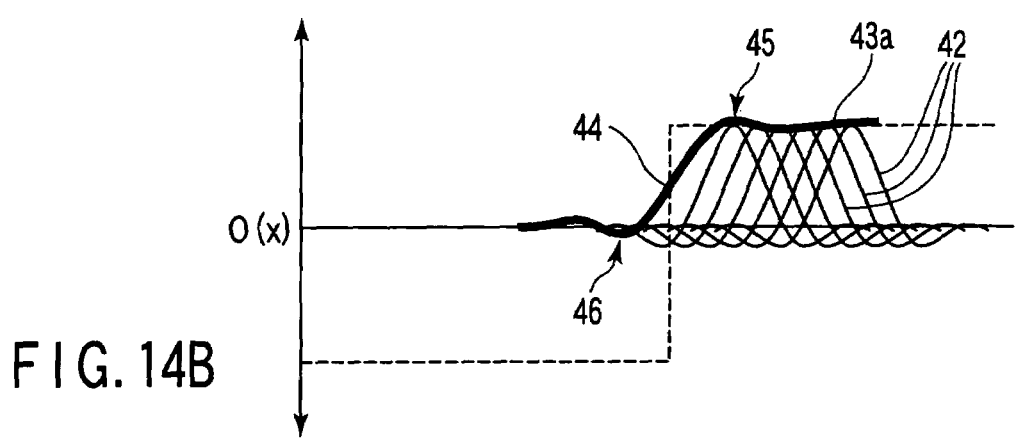

Taking a phase shift having a phase difference of 180 degrees as an example, occurrence of the peak shape will be further concretely described. FIG. 14A shows a complex amplitude transmittance distribution O(x) of the phase shifter having a phase difference of 180 degrees. Of a left side area, i.e., an area 40 having a phase value of 180 degrees and a right side area, i.e., an area 41 having a phase value of 0 degree in FIG. 14A, attention is paid to the right side area 41. A state of convolution with the point spread function PSF(x) is indicated by a plurality of thin lines 42 and a complex amplitude distribution U(x) of the thus obtained image is indicated by a bold line 43a in FIG. 14B. The complex amplitude distribution U(x) indicated by the bold line 43a becomes symmetrical about a point with respect to a position 44 of a step, and a convex portion 45 is generated on the right side whilst a concave portion 46 is generated on the left side.

Figure 15:
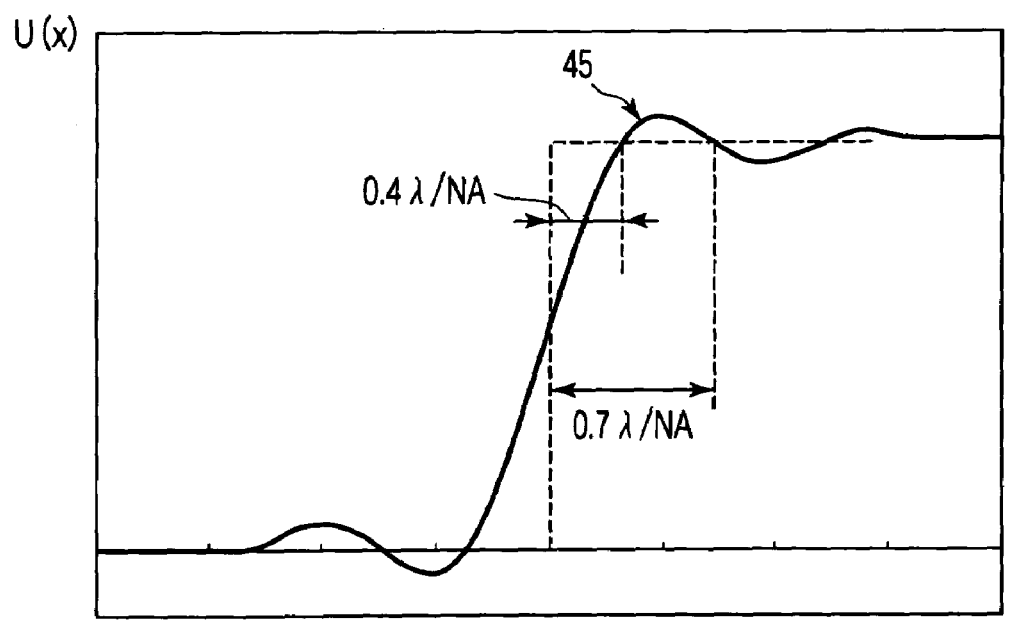
FIG. 15 is a view showing a precise shape of a complex amplitude distribution U(x) of an image corresponding to an area where a phase value of the line type phase-shifter is 0 degree.
Figure 14C:
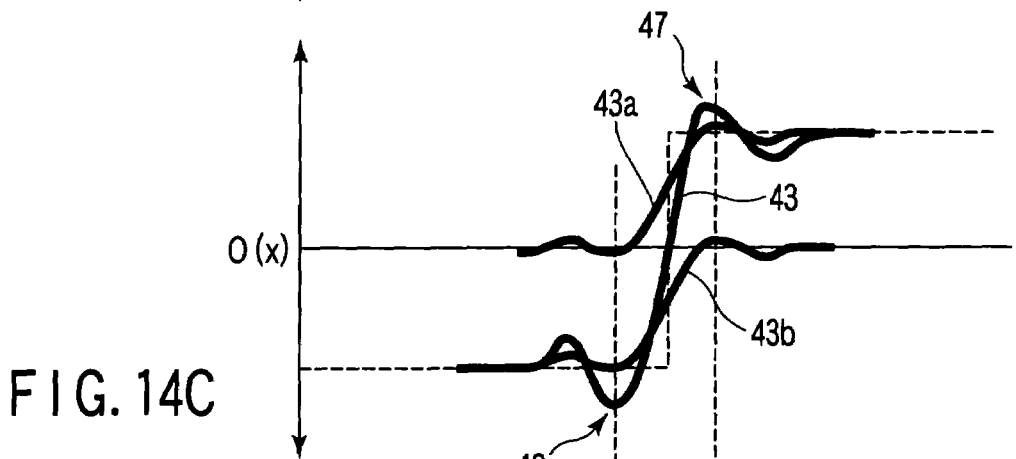
Figure 14D:
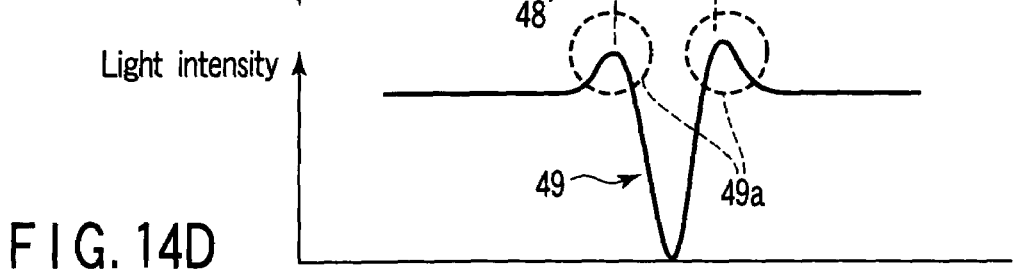

FIG. 15 shows a precise shape of the complex amplitude distribution U(x) of an image corresponding to the area 41 having a phase value of 0 degree. The same phenomenon occurs with respect to the left side area in FIG. 14A, i.e., the area 40 having a phase value of 180 degrees. As described above, a right convex portion 47 and a left concave portion 48 are emphasized and remain in a final complex amplitude distribution U(x) indicated by bold lines 43 obtained by superimposing the complex amplitude distribution U(x) indicated by the bold line 43a which corresponds to the area 41 having a phase Value of 0 degree and the complex amplitude distribution U(x) indicated by the bold line 43b which corresponds to the area 40 having a phase value of 180 degrees. As a result, as shown in FIG. 14D, a peak shape (indicated by each circle of a broken line in the drawing) 49 is generated on both sides of the inverse peak in the light intensity distribution with the inverse peak shape formed by the phase difference of the phase shifter in accordance with the convex portion 47 and the concave portion 48 shown in FIG. 14C.

FIGS. 16A to 16D are views associated with FIGS. 14A to 14D, and they are views illustrating a first technique of suppressing the peak shape based on the present invention. Referring to FIG. 16A, in the first technique, light shielding areas 60 and 61 are respectively provided at positions corresponding to the convex portion 47 and the concave portion 48 depicted in FIG. 14C. Therefore, as shown in FIG. 16A, a value of the complex amplitude transmittance distribution O(x) of each of the light shielding areas 60 and 61 is 0.

As a result, as shown in FIG. 16B, in convolution with the point spread function PSF(x), a part indicated by a bold broken line 61 is missing in accordance with the light shielding area 60, and a complex amplitude distribution U(x) of a resultant image is as indicated by a bold line 63a. Comparing the complex amplitude distribution U(x) indicated by a bold line 43a with the complex amplitude distribution U(x) indicated by the bold line 63a, a convex portion 45a in the complex amplitude distribution U(x) indicated by the bold line 43a is changed to a concave portion 64a by the effect of the light shielding area 60. A concave portion 46 slightly changes to be a concave portion 65a, but the concave portion 46 and the concave portion 65a can be basically regarded as the same. In this example, it is desirable that a superficial content of the concave portion 64a is substantially equal to a superficial content of the concave portion 65a (=a superficial content of the concave portion 46).

In such a case, as shown in FIG. 16C, in a final complex amplitude distribution U(x) indicated by a bold line 63 which is obtained by superimposing the complex amplitude distribution U(x) indicated by the bold line 63a corresponding to an area having a phase value of 0 degree in which the light shielding area 60 is formed on the complex amplitude distribution U(x) indicated by the bold line 63b corresponding to an area having a phase value of 180 degrees in which the light shielding area 61 is formed, the concave portion 64a and the convex portion 65b which corresponds to the inversion of the concave portion 65a are canceled out and the concave portion 65a and the convex portion 64b which corresponds to the inversion of the concave portion 64a are canceled out as indicated by each ellipse of a broken line in the drawing. The convex portion 47 and the concave portion 48 indicated by the bold line 43 which are observed in the complex amplitude distribution U(x) are eliminated, and a relatively flat distribution can be obtained at these portions. As a result, in the first technique, as shown in FIG. 16D, the peak shape is not substantially generated on both sides of the inverse peak in the light intensity distribution 66 having the inverse peak shape formed by the phase difference of the phase shifter.

Figure 17A:
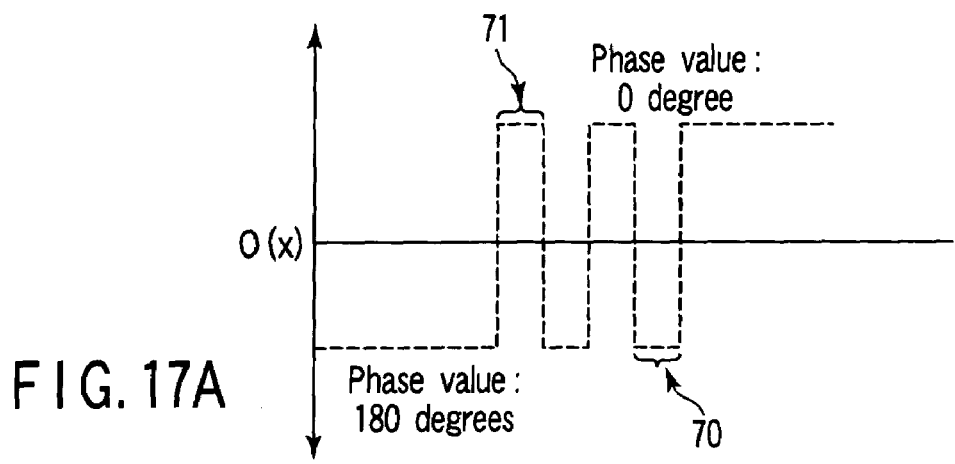
FIGS. 17A to 17D are views which are associated with FIGS. 14A to 14D and illustrate a second technique which suppresses a peak shape based on the present invention.

FIGS. 17A to 17D are views associated with FIGS. 14A to 14D and illustrating a second technique which suppresses the peak shape based on the present invention. Referring to FIG. 17A, in the second technique, a phase modulation areas 70 and 71 are respectively provided at positions corresponding to the convex portion 47 and the concave portion 48 depicted in FIG. 14C. In this example, a phase modulation quantity in each of the phase modulation areas 70 and 71 is set to 180 degrees. Therefore, as shown in FIG. 17A, a value of a complex amplitude transmittance distribution O(x) in the phase modulation area 70 is the same as that in the area having the phase value of 180 degrees, and a value of a complex amplitude transmittance distribution O(x) in the phase modulation area 71 is the same as that in the area having the phase value of 0 degree.

Figure 17B:
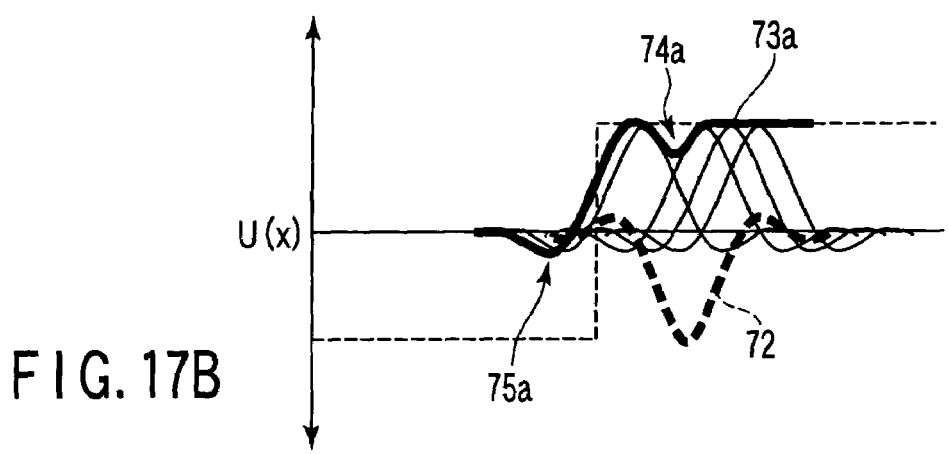

As a result, as shown in FIG. 17B, in convolution with the point spread function PSF(x), a part indicated by a bold broken line 72 is inverted in accordance with the phase modulation area 70, and a complex amplitude distribution U(x) of a resulting image is as indicated by a bold line 73a. Comparing the complex amplitude distribution U(x) indicated by the bold line 43a with the complex amplitude distribution U(x) indicated by the bold line 73a, a convex portion 45 in the complex amplitude distribution U(x) indicated by the bold line 43a is changed to a concave portion 74a by the effect of the phase modulation area 70. The concave portion 46 slightly changes to be a concave portion 75a, but the concave portion 46 and the concave portion 75a can be basically regarded as the same. In this example, it is desirable that a superficial content of the concave portion 74a is substantially equal to a superficial content of the concave portion 75a (=a superficial content of the concave portion 46).

Figure 17C:
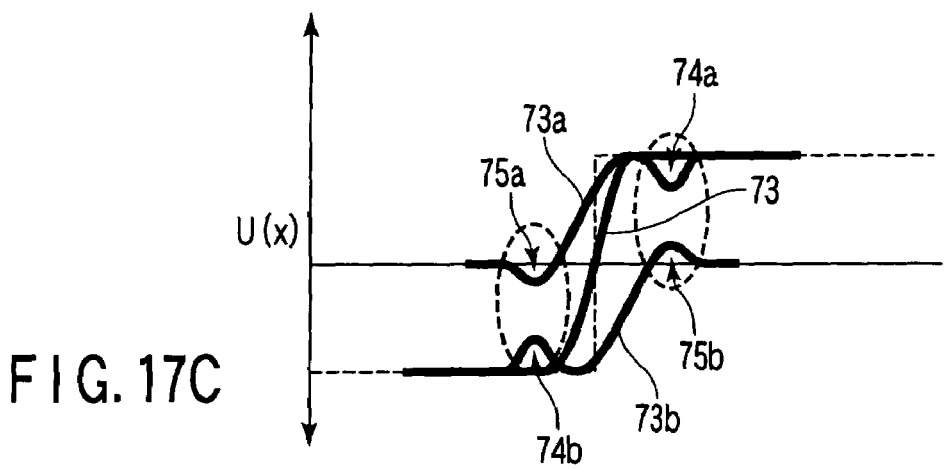
Figure 17D:
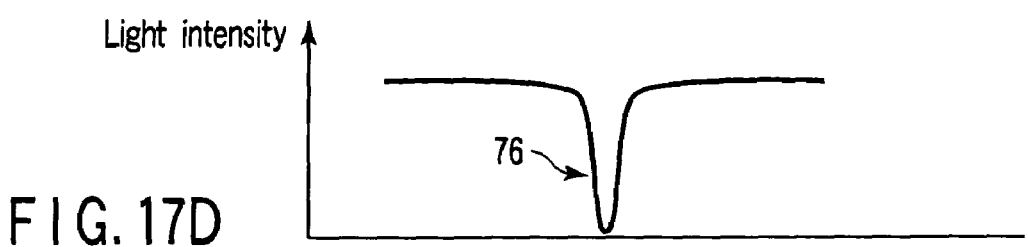

In such a case, as shown in FIG. 17C, in a final complex amplitude distribution U(x) indicated by a bold line 73 obtained by superimposing the complex amplitude distribution U(x) indicated by the bold line 73b corresponding to an area having a phase value of 0 degree in which the phase modulation area 70 is formed on the complex amplitude distribution U(x) indicated by the bold line 73b corresponding to an area having a phase value of 180 degrees in which the phase modulation area 71 is formed, the concave portion 74a and the convex portion 75b which corresponds to the inversion of the concave portion 75a are canceled out and the concave portion 75a and the convex portion 74b which corresponds to the inversion of the concave portion 74a are canceled out as indicated by each ellipse of a broken line in the drawing. The convex portion 47 and the concave portion 48 indicated by the bold line 43 illustrated in FIG. 14C which are observed in the complex amplitude distribution U(x) are eliminated, and a relatively flat distribution can be obtained at these portions. As a result, in the second technique, the peak shape (the convex portion 45 in FIG. 15) is not substantially generated at the maximum light intensity portions on both sides of the inverse peak in the light intensity distribution 76 having the inverse peak shape formed by the step of the phase shifter as shown in FIG. 17D like the first technique.

Positions and sizes of the light shielding areas 60 and 61 or the phase modulation areas 70 and 71 will now be described. As mentioned above, in FIG. 14B, a position of each of the convex portion 45 and the concave portion 46 in the complex amplitude distribution U(x) of an image is determined by integrating the area 41 on the right side only apart from the step in accordance with Expression (5) of the convolution. Referring to FIG. 15 accurately showing a result, the convex portion 45 is placed in a range of 0.4λ/NA to 0.7λ/NA apart from the step. Therefore, it is good enough to likewise provide the light shielding areas 60 and 61 or the phase modulation areas 70 and 71 in the vicinity of this position. Further, as to sizes of the light shielding areas 60 and 61 or the phase modulation areas 70 and 71, it is good enough to set superficial contents of the concave portions 64a and 74a to be substantially equal to superficial contents of the concave portions 65a and 75a. Specifically, the peak shape remains in the light intensity distribution if each light shielding area is too small, the peak shape is excessively corrected if each light shielding area is too big, and a concave shape is obtained. Therefore, obtaining an optimum shape while calculating the light intensity distribution is suffice. The light shielding area 61 may transmit a part of the light only therethrough.

Figures 18A, 18B:
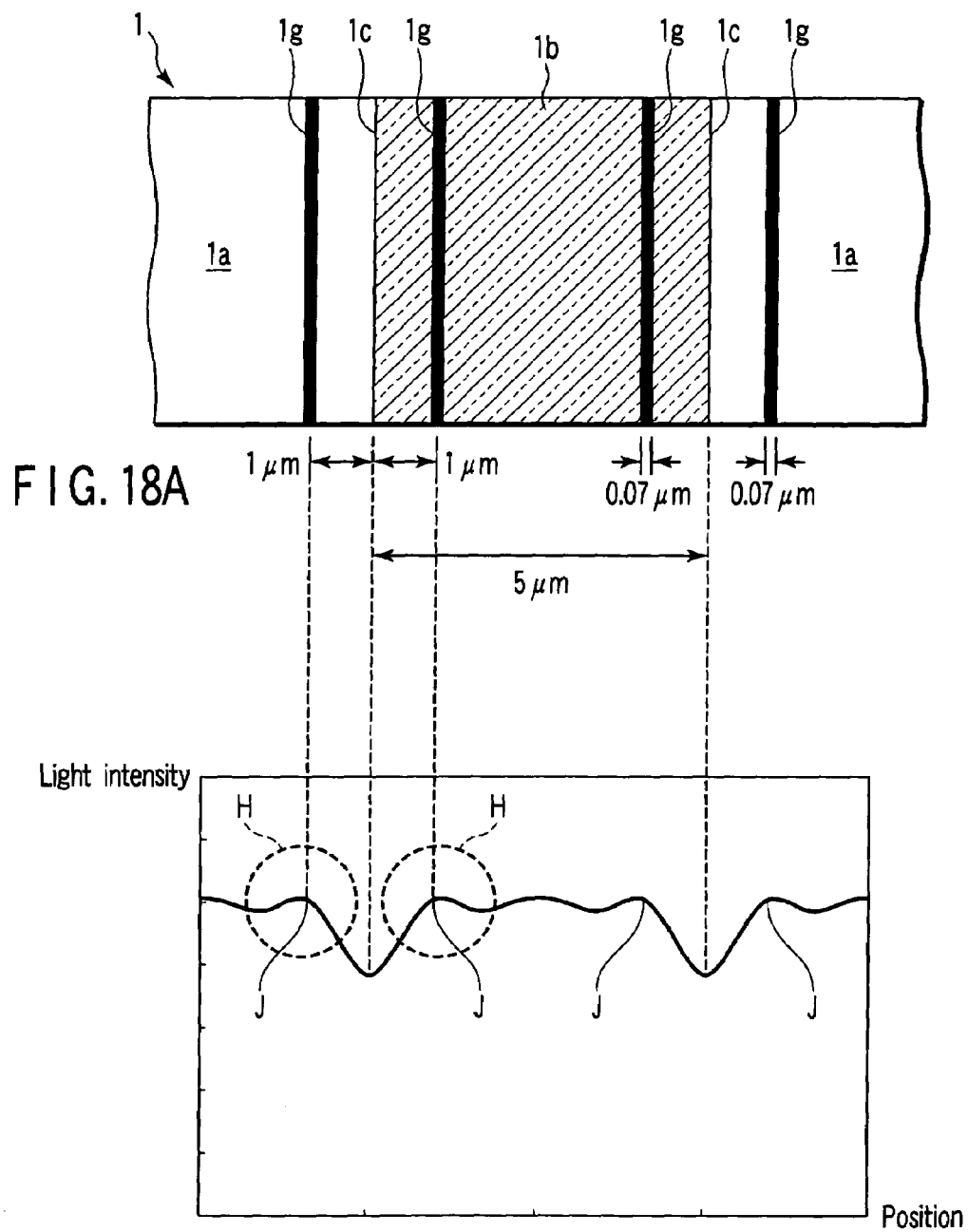
FIGS. 18A and 18B are views illustrating a modification of a third embodiment in which the second technique according to the present invention is applied to the optical modulation element of the first embodiment.

In a modification of the third embodiment, the second technique according to the present invention is applied to the optical modulation element 1 of the first embodiment. Specifically, in this example, a phase modulation type phase shifter obtained by additionally providing a linear phase modulation area is used for the optical modulation element 1 of the first embodiment in accordance with the second technique of the present invention. In the optical modulation element 1 of this embodiment, as shown in FIG. 18A, a linear phase modulation area 1g extending in parallel with the phase difference line 1c is formed on both sides of the phase difference line 1c. Here, the linear phase modulation area 1g formed in a rectangular area 1a having a phase value of 0 degree has a phase value of 60 degree, and the linear phase modulation area 1g formed in a rectangular area 1b having a phase value of 60 degrees has a phase value of 0 degree. In other words, each of a phase modulation quantity of the phase difference line 1c and a phase modulation quantity of the linear phase modulation area 1g is 60 degrees.

Furthermore, a widthwise dimension of the linear phase modulation area 1g is set to 0.07 μm, and an image side converted distance D between a central line of the linear phase modulation area 1g and the adjacent phase difference line 1c is set to 1.0 μm. That is, the distance D corresponds to approximately $0.52 \times \lambda/NA$ and is set within a range of $0.4 \times \lambda/NA < D < 0.7 \times \lambda/NA$ mentioned above. As a result, in the third embodiment A, in the focus state shown in FIG. 18B, a light intensity distribution with an inverse pea shape in which a light intensity is minimum in a line area corresponding to the phase difference line 1c and the light intensity suddenly increases toward the periphery is formed, and the peak shape on the both sides of the inverse peak J is excellently suppressed as indicated by each circle H of a broken line in the drawing.

Figure 19A:
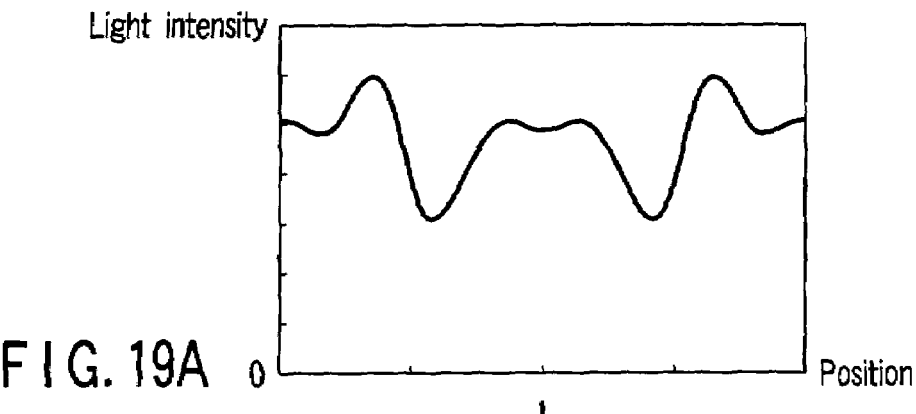
FIGS. 19A to 19C are views illustrating a modification of the third embodiment in which the second technique according to the present invention is applied to the optical modulation element of the first embodiment.
Figure 19B:
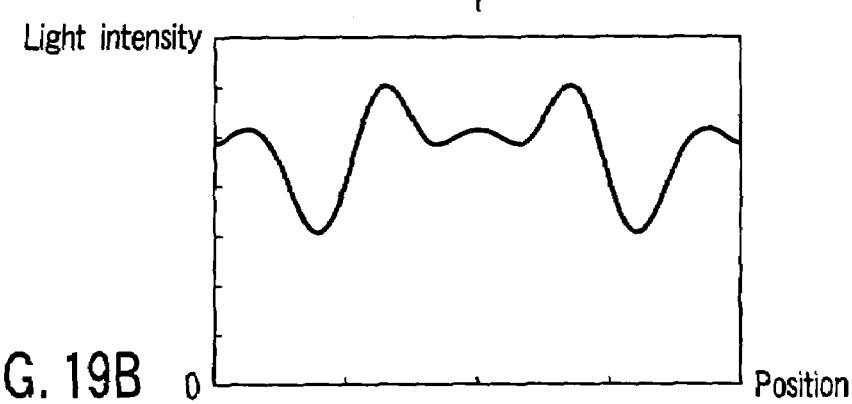
Figure 19C:
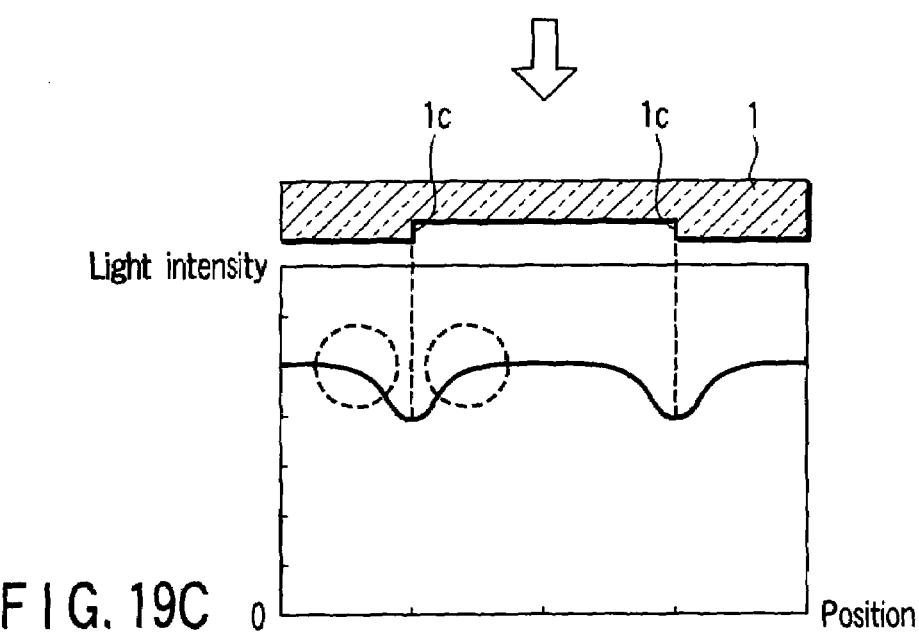

Moreover, in a modification of the third embodiment, in the defocus state, a symmetrical light intensity distribution with the inverse peak shape is formed as shown in FIG. 19C by a combination of an asymmetrical light intensity distribution with an inverse peak shape (corresponding to FIG. 5A) formed by such a normal light ray o as shown in FIG. 19A and an asymmetrical light intensity distribution with an inverse peak shape (corresponding to FIG. 5B) formed by such an abnormal light ray e as shown in FIG. 19B. Additionally, in the defocus state, the peak shape on both sides of the inverse peak is likewise excellently suppressed as indicated by each circle of a broken line in the drawing like the focus state. The peak shape slightly remains in the light intensity distribution in the defocus state when the linear phase area shown in FIG. 5C is not provided, but it is completely removed in FIG. 19C. Therefore, it can be confirmed that this embodiment is superior.

Figure 20:
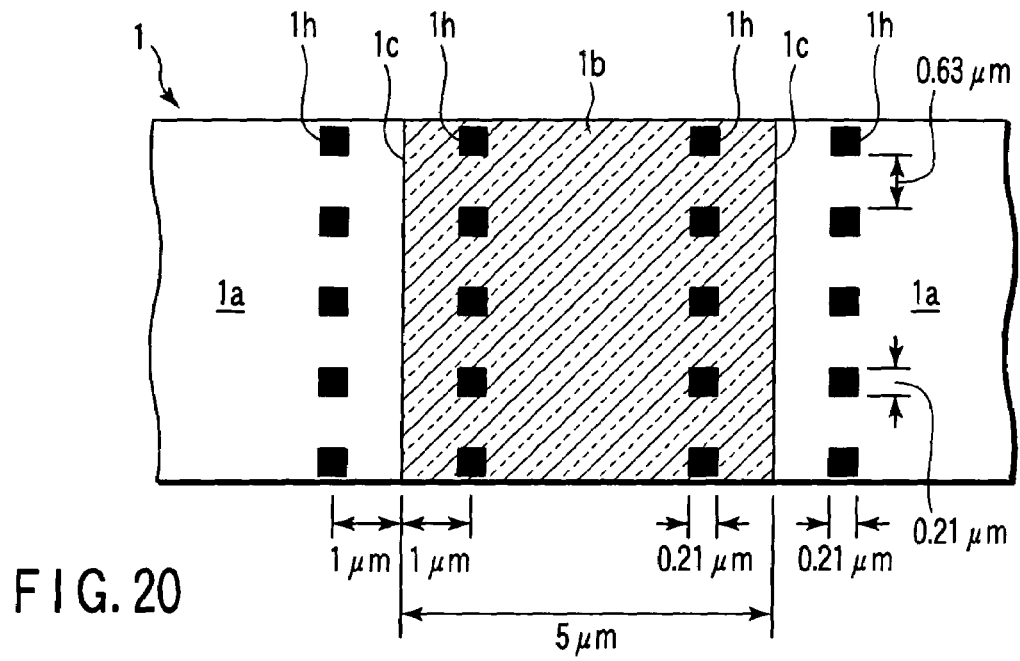
FIG. 20 is a view illustrating another modification of the third embodiment in which the second technique according to the present invention is applied to the optical modulation element of the first embodiment.

Another modification of the third embodiment uses a phase modulation type phase shifter which can be obtained by additionally providing a plurality of isolated phase modulation areas in the optical modulation element 1 of the first embodiment in accordance with the second technique of the present invention. In the optical modulation element 1 of the third embodiment B, as shown in FIG. 20, a plurality of island-shaped higher portions or lower portions aligned in parallel with the phase difference line 1c, e.g., square isolated phase modulation areas 1h are formed on both sides of the phase difference line 1c. In this example, the isolated phase modulation area 1h formed in the rectangular area 1a having a phase value of 0 degree has a phase value of 60 degrees, and the isolated phase modulation area 1h formed in the rectangular area 1b having a phase value of 60 degrees has a phase value of 0 degree. In other words, each of a phase modulation quantity of the phase difference line 1c and a phase modulation quantity of the isolated phase modulation area 1h is 60 degrees.

A widthwise dimension (a dimension of one side) and a gap of the isolated phase modulation area 1h are respectively set to 0.21 μm and 0.63 μm, and an image side converted distance D between a central line connecting centers of the plurality of isolated phase modulation areas 1h and the adjacent phase difference line 1c is set to 1.0 μm like the modification of the third embodiment. In other words, the linear phase modulation area 1g in this modification and the plurality of isolated phase modulation areas 1h in the third embodiment B are set so that their phase modulation superficial contents become substantially equal to each other and thereby have optically substantially equivalent advantages.

As a result, although not shown, in this modification, a similar light intensity distribution with an inverse peak shape in which a light intensity is minimum in a line area corresponding to the phase difference line 1c and the light intensity suddenly increases toward the periphery in the focus state and the defocus state is formed and the peak shape on the both sides of the inverse peak are excellently suppressed in the peak-shaped light intensity distribution like the modification mentioned above.

As described above, in the third embodiment (and the modification thereof), by using as the optical modulation element 1 the phase shifter having the phase modulation areas 1g and 1h provided in the vicinity of the phase difference line 1c, a desired light intensity distribution with an inverse peak shape in which the peak shape generated on both sides of the inverse peak is suppressed can be formed on the processed substrate 5. As a result, in the third embodiment, the semiconductor film is no longer destroyed by occurrence of ablation caused due to the peak shape, and a crystal with a large particle size can be generated while preventing the crystal growth which has started from the inverse peak portion from stopping at the peak shape portion.

Comparing the both modifications, the minimum dimension of the isolated phase modulation area 1h is larger than the minimum dimension of the linear phase modulation area 1g. Therefore, production of the phase shifter in one modification is easier than that of the phase shifter in the other modification. That is, the third embodiment B can be realized in an exposure device or process with a low resolution, and there is an advantage that irregularities which affect the light intensity distribution are small because a relative change rate of the third embodiment B is smaller even if the dimension fluctuates due to the process. Further, although the isolated phase modulation area 1h has a conformation of a regular square in FIG. 20, it is possible to apply an arbitrary shape having a dimension which is sufficiently smaller for a resolution (to λ/NA) of the image formation optical system 4.

Furthermore, although not shown, in the third embodiment C, it is possible to use a light shielding type phase shifter which can be obtained by additionally providing a linear light shielding area to the optical modulation element 1 of the first embodiment in accordance with the first technique of the present invention. That is, the optical modulation element 1 according to the third embodiment C has a configuration in which a linear light shielding area substitutes for the linear phase modulation area 1g. Moreover, although not shown, in the third embodiment D, it is possible to use a light shielding type phase shifter which can be obtained by additionally providing a plurality of isolated light shielding areas to the optical modulation element 1 of the first embodiment in accordance with the first technique of the present invention. That is, the optical modulation element 1 according to the third embodiment D has a configuration in which an isolated light shielding area substitutes for the isolated phase modulation area 1h depicted in FIG. 20.

In the third and fourth modifications of the third embodiment, a desired light intensity distribution with an inverse peak shape in which the peak shape generated on the both sides of the inverse peak is suppressed can be formed on the processed substrate 5 by using as the optical modulation element 1 the phase shifter having the light shielding area provided in the vicinity of the phase difference line 1c. As a result, the semiconductor film is no longer destroyed by occurrence of ablation caused due to the peak shape, and a crystal with a large particle size can be generated while preventing the crystal growth which has started from the inverse peak portion from stopping at the peak shape portion.

Incidentally, comparing the third modification C with the fourth modification, the minimum dimension of the isolated light shielding area is larger than the minimum dimension of the linear light shielding area. Therefore, formation of the isolated light shielding area in the fourth modification is easier than formation of the isolated light shielding area in the third modification, and production of the phase shifter in the fourth modification is thus easier than that of the phase shifter in the third modification. Additionally, in formation of the light shielding area, it is good enough to form a pattern of chrome by a regular lithography method after forming steps of forming a phase difference, for example.

Fourth Embodiment

Figure 21:
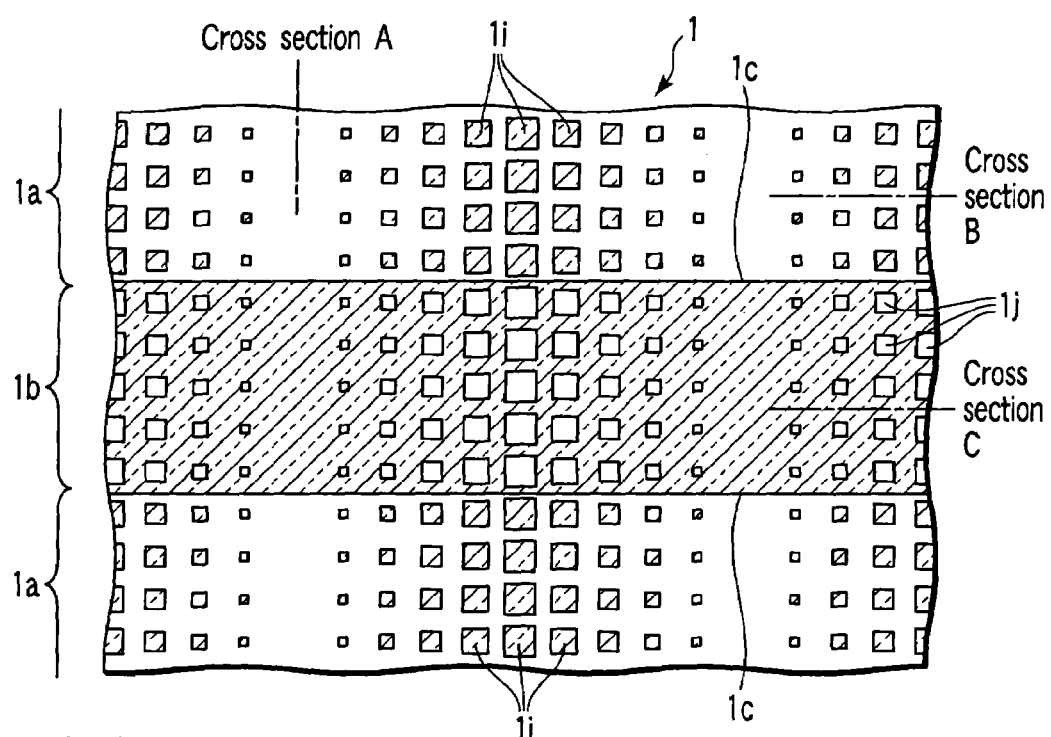
FIG. 21 is a view showing a pattern of an optical modulation element according to a fourth embodiment.
Figure 22A:
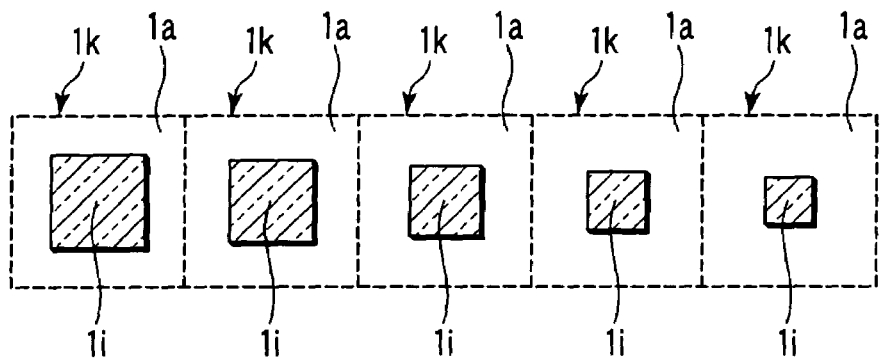
FIGS. 22A and 22B are views showing a basic pattern in the optical modulation element depicted in FIG. 21.
Figure 22B:
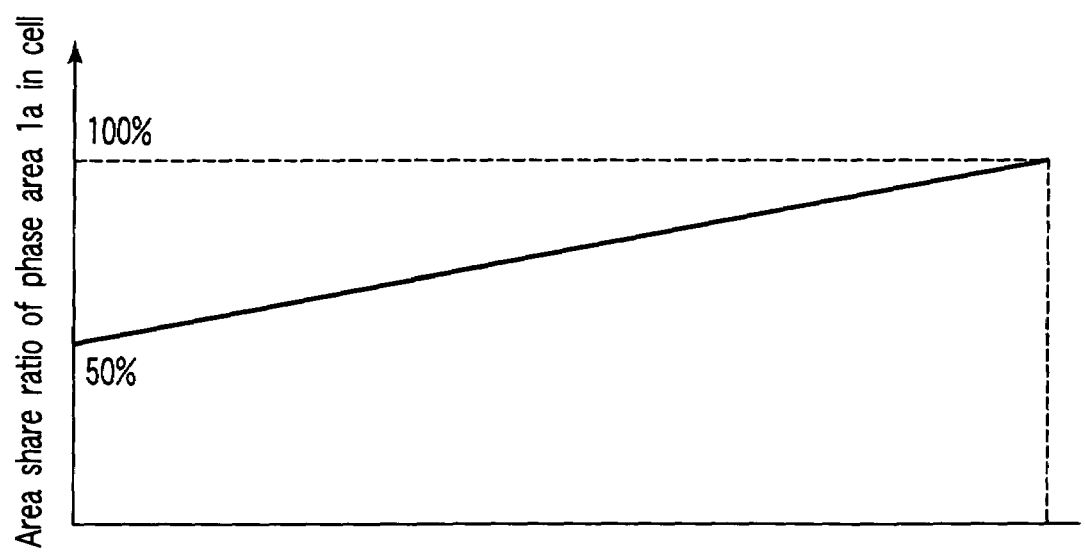

FIG. 21 is a view showing a pattern of an optical modulation element according to a fourth embodiment. Further, FIGS. 22A and 22B are views showing a basic pattern in the optical modulation element depicted in FIG. 21. Referring to FIG. 21, like the first embodiment, a rectangular area 1a having a phase value of 0 degree and a rectangular area 1b having a phase value of 60 degrees are alternately repeatedly formed along one direction in the optical modulation element 1 of the fourth embodiment. In other words, the phase areas 1a and 1b formed between two adjacent phase difference lines 1c alternately have different reference phase values (0 degree, 60 degrees).

Furthermore, in each of the phase areas 1a and 1b is formed a phase distribution in which an area share ratio of a first area which has an optically smaller dimension than a radius of a point spread function range of the image formation optical system 4 and has a first phase value different from the reference phase value varies depending on each position. Specifically, a square area 1i having a phase value of 60 degrees is formed in the rectangular area 1a having a phase value of 0 degree is formed in such a manner that an area share ratio of the area 1i varies depending on each position. On the other hand, a square area 1j having a phase value of 0 degree is formed in the rectangular area 1b having a phase value of 60 degrees in such a manner that an area share ratio of the area 1j varies depending on each position.

That is, the first areas 1i and 1j having the first phase values (60 degrees, 0 degree) different from the reference phase values (0 degree, 60 degrees) have substantially equal absolute values of phase modulation quantities and different signs between the two adjacent phase areas 1a and 1b. Furthermore, referring to FIG. 22A showing a basic pattern of each rectangular area 1a having the phase value of 0 degree, the basic pattern of the optical modulation element 1 has a plurality of cells (indicated by rectangular broken lines in the drawing) 1k optically smaller than the radius of the point spread function range of the image formation optical system 4.

In each cell 1k are formed the phase area (indicated by a blank portion in the drawing) 1a having the phase value (the reference phase value) of 0 degree and the first area (indicated by a shaded portion in the drawing) 1i having the phase value of 60 degrees (the first phase value). As shown in FIG. 22A, area share ratios of the first area 1i and the phase area 1a in each cell 1k vary in accordance with each cell. Moreover, specifically, the area share ratio of the phase area 1a in the cell is closest to 50% in a cell on the left-hand side in the drawing, closest to 100% in the cell on the right-hand side in the drawing, and monotonously varies between these cells. Therefore, there can be obtained a one-dimensional V-shaped light intensity gradient distribution in which the light intensity is maximum at both side positions where the area share ratio of the phase area 1a is closest to 100% and the light intensity is minimum at a central position where the area share ratio of the phase area 1a is closest to 50%.

Accordingly, there can be obtained a one-dimensional V-shaped light intensity gradient distribution in which the light intensity is maximum at both side positions where the area share ratio of the phase area 1a is closest to 100% and the light intensity is minimum at a central position where the area share ratio of the phase area 1a is closest to 50%. Likewise, as to the phase area 1b having the reference phase value of 60 degrees, there can be obtained a one-dimensional V-shaped light intensity gradient distribution in which the light intensity is maximum at both sides positions where the area share ratio of the phase area 1b is closest to 100% and the light intensity is minimum at a central position where the area share ratio of the phase area 1b is closest to 50%.

Figure 23A:
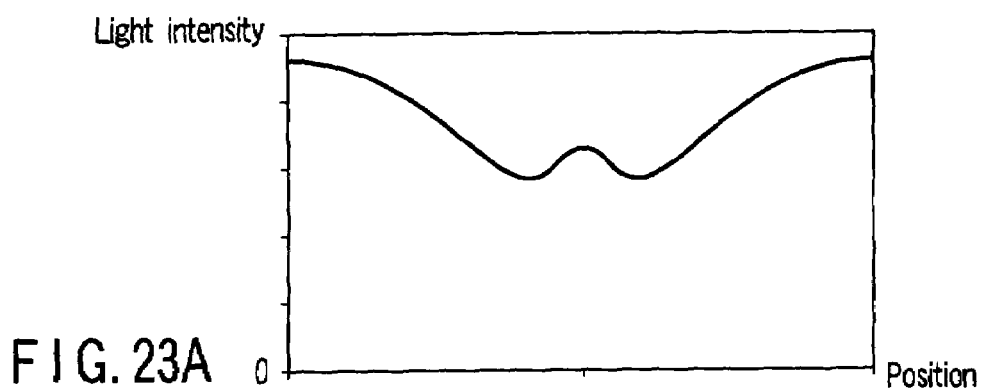
FIGS. 23A to 23C are views each showing a light intensity gradient distribution obtained along a cross section B when a light beam division element is not provided in the fourth embodiment.
Figure 23B:
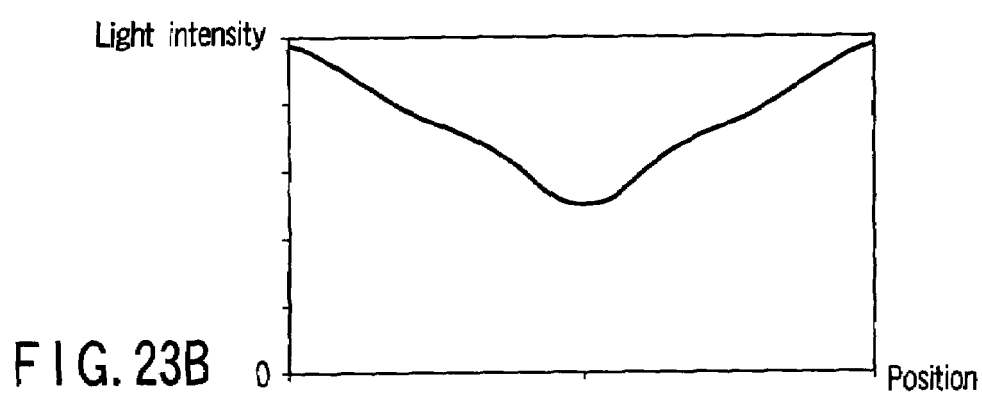

That is, when the light beam division element (the birefringent element) 2 is not interposed, such a V-shaped light intensity gradient distribution shown in FIG. 23B can be obtained along a cross section B (see FIG. 21) whose direction is orthogonal to a pitch direction of the phase difference line 1c in the phase area 1a having the reference phase value of 0 degree. Moreover, such a V-shaped light intensity gradient distribution as shown in FIG. 24B can be obtained along a cross section C (see FIG. 21) whose direction is orthogonal to a pitch direction of the phase difference line 1c in the phase area 1b having the reference phase value of 60 degrees.

Figure 23C:
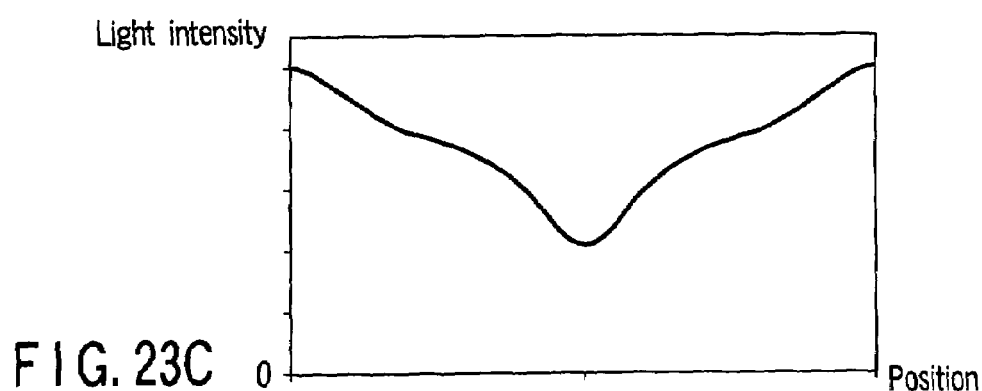
Figure 24A:
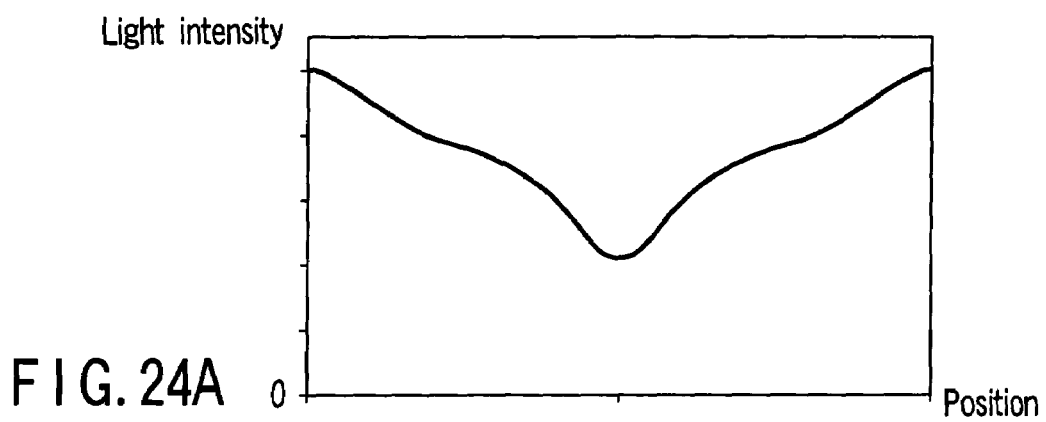
FIGS. 24A to 24C are views each showing a light intensity gradient distribution taken along a cross section C when the light beam division element is not provided in the fourth embodiment.

When the surface of the processed substrate 5 is defocused with respect to the image formation optical system 4, the V-shaped light intensity gradient distribution shown in FIG. 23B asymmetrically varies depending on the defocus direction as shown in FIGS. 23A and 23C. Likewise, when the surface of the processed substrate 5 is defocused with respect to the image formation optical system 4, the V-shaped light intensity gradient distribution shown in FIG. 24B also asymmetrically varies depending on the defocus direction as shown in FIGS. 24A and 24C.

Figure 24B:
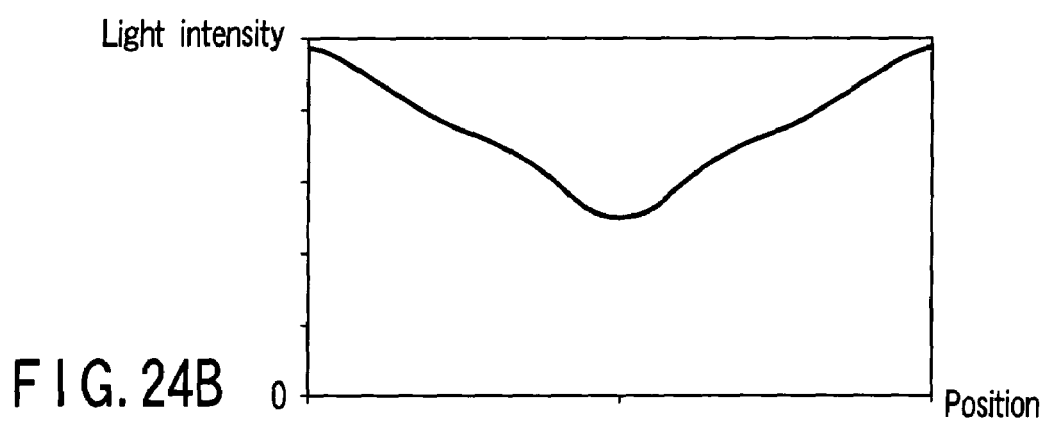
Figure 25A:
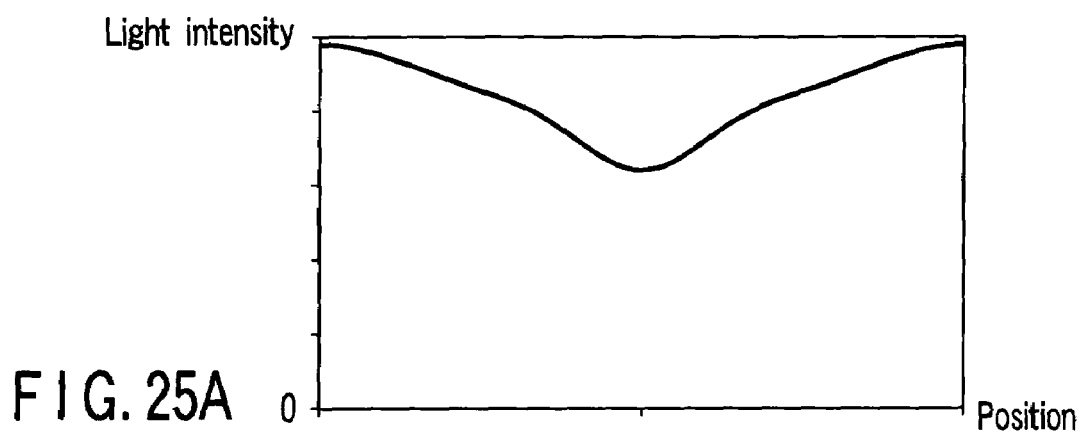
FIGS. 25A to 25C are views each showing a V-shaped light intensity gradient distribution obtained along the cross section B and the cross section C in the fourth embodiment.
Figure 25B:
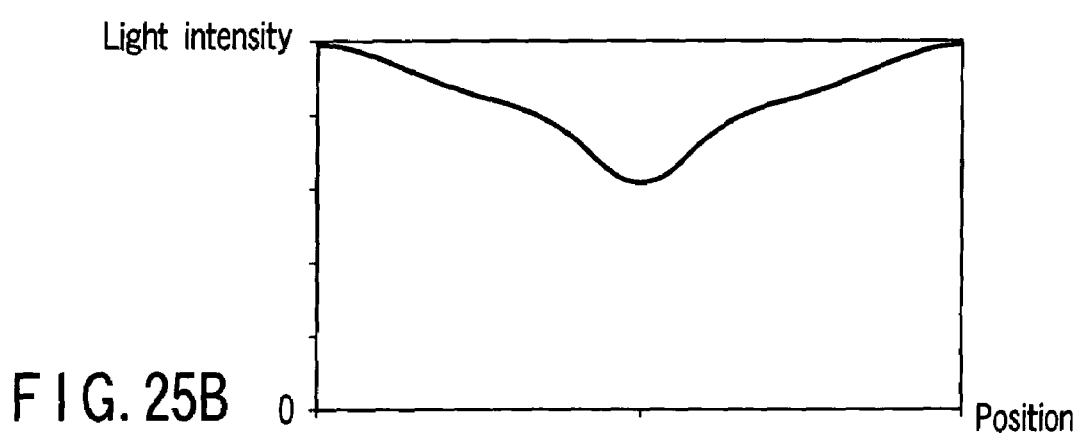

In the fourth embodiment, however, in the focus state, such a V-shaped light intensity gradient distribution as shown in FIG. 25B can be obtained along the cross section B and the cross section C by a combination of the V-shaped light intensity gradient distribution shown in FIG. 23B and the V-shaped light intensity gradient distribution shown in FIG. 24B due to the effect of the light beam division element 2. Moreover, in the defocus state in the upward direction, such a V-shaped light intensity gradient distribution as shown in FIG. 25A can be obtained along the cross section B and the cross section C by a combination of the light intensity gradient distribution shown in FIG. 23A and the light intensity gradient distribution shown in FIG. 24A.

Figure 24C:
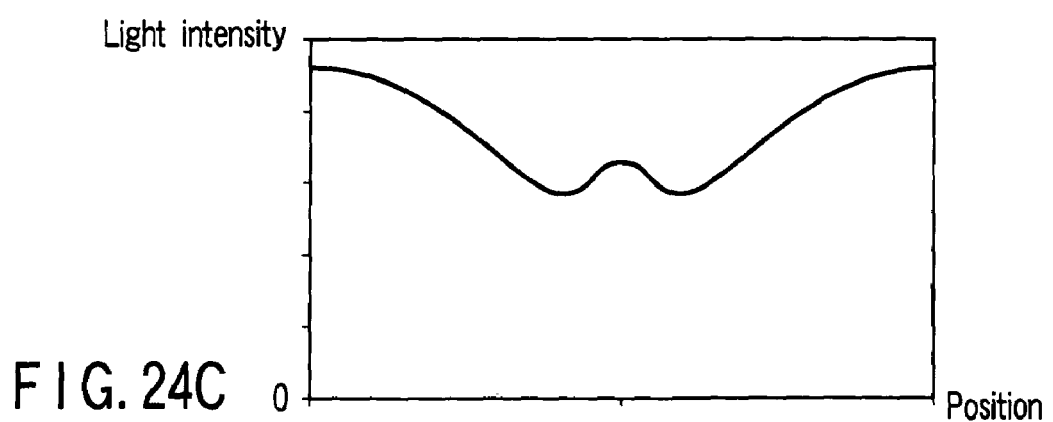
Figure 25C:
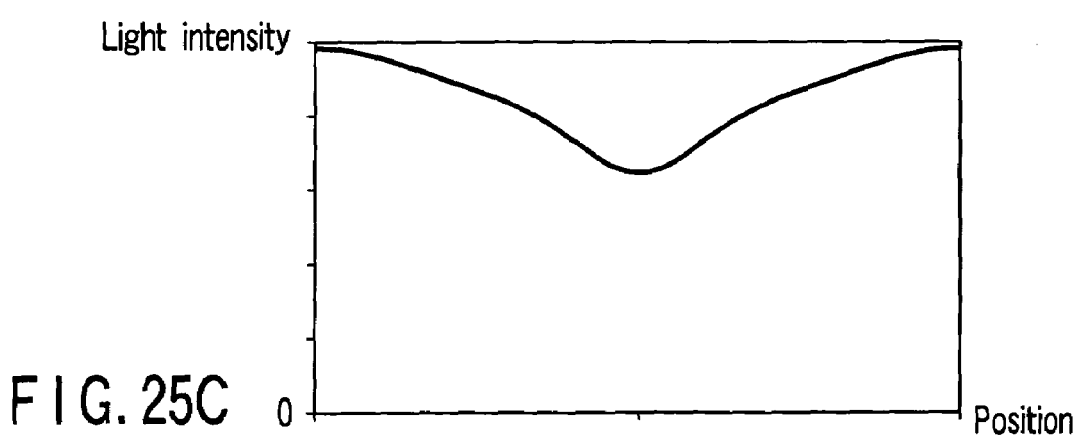

Additionally, in the defocus state in the downward direction, such a V-shaped light intensity gradient distribution as shown in FIG. 25C can be obtained along the cross section B and the cross section C by a combination of the light intensity gradient distribution shown in FIG. 23C and the light intensity gradient distribution shown in FIG. 24C. In this manner, referring to FIGS. 25A to 25C, in the fourth embodiment, a desired V-shaped light intensity gradient distribution can be stably obtained along the cross section B and the cross section C with almost no influence of defocusing. That is, a focal depth of the image formation optical system 4 becomes deeper.

Further, in the optical modulation element 1 according to the fourth embodiment, like the first embodiment, the area 1a having the phase value of 0 degree and the area 1b having the phase value of 60 degrees are alternately repeatedly formed. Therefore, like the first embodiment, a desired light intensity distribution with an inverse peak shape can be obtained along the cross section A (see FIG. 21) corresponding to the pitch direction of the phase step 1c. In this manner, a combined light intensity distribution obtained from the V-shaped light intensity gradient distribution and the light intensity distribution having the inverse peak shape, i.e., the light intensity distribution having the V-shaped pattern+the inverse-peak-shaped pattern is formed on the surface of the processed substrate 5.

In the light intensity distribution having the V-shaped pattern+the inverse-peak-shaped pattern, a crystal nucleus formation position, i.e., a crystal growth start position can be set close as much as possible to a position where the light intensity is minimum in the light intensity distribution with the inverse peak shape. Furthermore, the sufficient crystal growth in the lateral direction from the crystal nucleus can be realized along the gradient direction of the light intensity in the V-shaped light intensity gradient distribution, thereby generating a crystallized semiconductor film with a large particle size.

Fifth Embodiment

Figure 26:
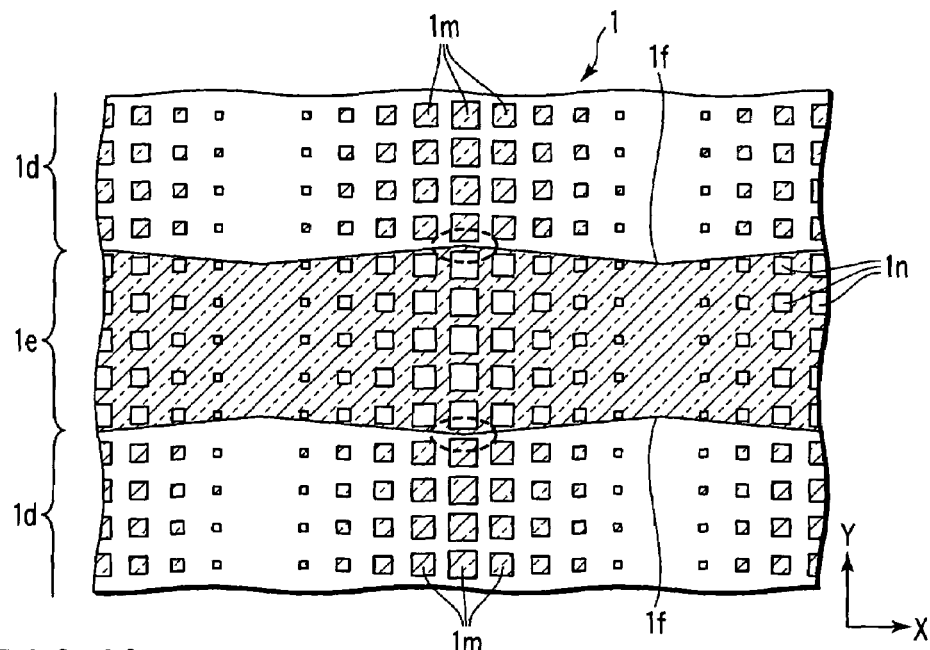
FIG. 26 is a view showing a pattern of an optical modulation element according to a fifth embodiment.

In the fourth embodiment, the first areas 1i and 1j having the first phase values (60 degrees, 0 degree) different from the reference phase values (0 degree, 60 degrees) are additionally provided to the optical modulation element 1 according to the first embodiment. On the contrary, in a fifth embodiment, a square first area having a first phase value different from the reference phase value is additionally provided to the optical modulation element 1 according to the second embodiment. FIG. 26 is a view showing a pattern of the optical modulation element according to the fifth embodiment. Referring to FIG. 26, like the second embodiment, an area 1d having a phase value of 0 degree and an area 1e having a phase value of 60 degrees are alternately repeatedly formed along one direction in the optical modulation element 1 according to the fifth embodiment.

Furthermore, each square area 1m having a phase value of 60 degrees is formed in the area 1d having the phase value of 0 degree in such a manner that an area share ratio of the area 1m varies depending on each position. On the other hand, each square area 1n having a phase value of 0 degree is formed in the area 1e having the phase value of 60 degrees in such a manner that an area share ratio of the area 1n varies depending on each position. It is to be noted that a phase difference line 1f is formed in zigzags between the phase area 1d and the phase area 1e like the second embodiment.

Specifically, a gap between the two adjacent phase difference lines 1f is 5 μm as a first reference interval at a position where the largest square areas 1m and 1n are formed. Moreover, a gap between the two adjacent phase difference lines 1f is 4 μm or 6 μm as a first correction interval at an intermediate position between two positions where the largest square areas 1m and 1n are formed. In other words, a correction quantity C is minimum at a position where an area share ratio of the phase area 1d or the phase area 1e is closest to 50%.

In the fifth embodiment, a V-shaped light intensity gradient distribution (corresponding to the cross section B and the cross section C in the fourth embodiment) can be obtained along the direction X like the fourth embodiment. In this example, a position where the light intensity is minimum in the V-shaped light intensity gradient distribution corresponds to a position where an area share ratio of the phase area 1d or the phase area 1e is closest 50%. On the other hand, in the fifth embodiment, as different from the fourth embodiment, a light intensity distribution with a point inverse peak shape which has an inverse peak point at a position indicated by each ellipse of a broken line in FIG. 26 is formed like the second embodiment.

Figure 27:
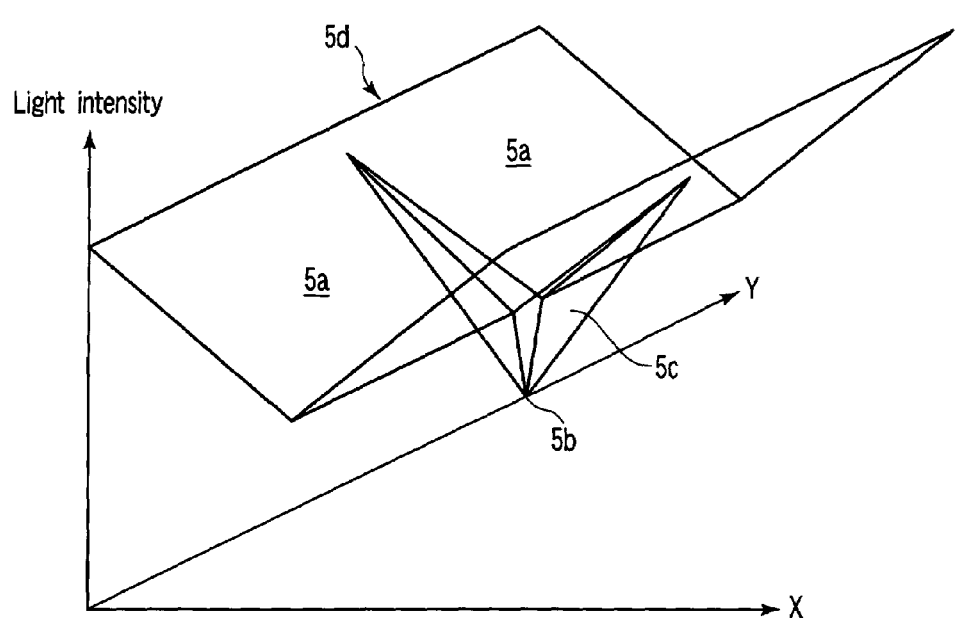
FIG. 27 is a perspective view showing a combined light intensity distribution of a V-shaped light intensity gradient distribution and a light intensity distribution with a point inverse peak shape formed in the fifth embodiment.

That is, in the fifth embodiment, as shown in FIG. 27, on the surface of the processed substrate 5 is formed a combined light intensity distribution obtained from a V-shaped light intensity gradient distribution 5a which one-dimensionally has a light intensity gradient along the direction X and a light intensity distribution 5c with a point inverse peak shape which has an inverse peak point 5b formed in accordance with each position indicated by the ellipse of a broken line in FIG. 26, i.e., a light intensity distribution 5d having a V-shaped pattern+a point-inverse-peak-shaped pattern. The light intensity distribution with the V-shaped pattern and the point-inverse-peak-shaped pattern shown in FIG. 27 is a light intensity distribution which is ideal for crystallization, can realize an even gradient in the widthwise direction in the last half of crystal growth, and increase a width of a crystal grain.

Sixth Embodiment

Figure 28:
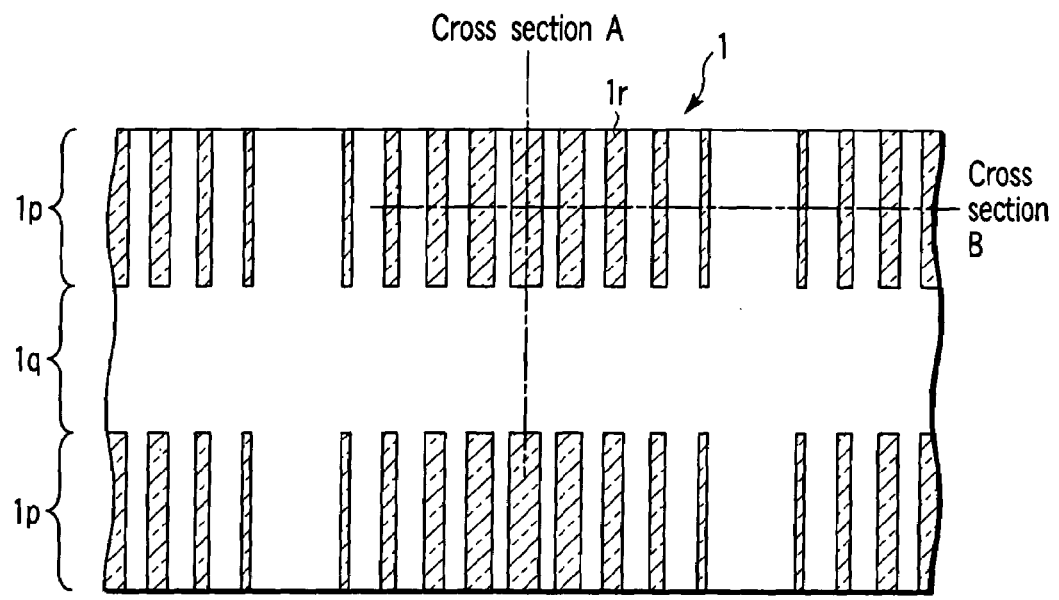
FIG. 28 is a view showing a pattern of an optical modulation element according to a sixth embodiment.

FIG. 28 is a view showing a pattern of an optical modulation element according to a sixth embodiment. Referring to FIG. 28, an optical modulation element 1 according to the sixth embodiment has two areas which are alternately repeatedly formed along one direction (a vertical direction in the drawing), i.e., a phase distribution area 1p having a width of 5 μm and a phase even area 1q having a width of 5 μm. Each rectangular area (a portion with hatching) 1r having an optically smaller dimension than a radius of a point spread function range of the image formation optical system 4 and a phase value of 90 degrees is formed in the phase distribution area 1p in such a manner that an area share ratio of the area 1r varies depending on each position. In the phase distribution area 1p, an area other than the area 1r has a phase value of 0 degree. The area share ratio of the area 1r varies between 0% and approximately 50%. On the other hand, the phase even area 1q entirely has a phase value of 0 degree. Moreover, a boundary between the phase distribution area 1p and the phase even area 1q forms a phase step.

In the sixth embodiment, such a symmetrical light intensity distribution with an inverse peak shape as shown in FIG.

Figure 29A:
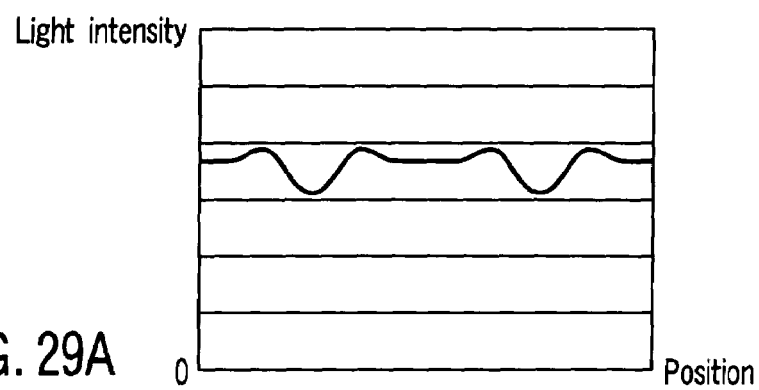
FIGS. 29A and 29B are views each showing a light intensity distribution obtained along a cross section A in a sixth embodiment.
Figure 29B:
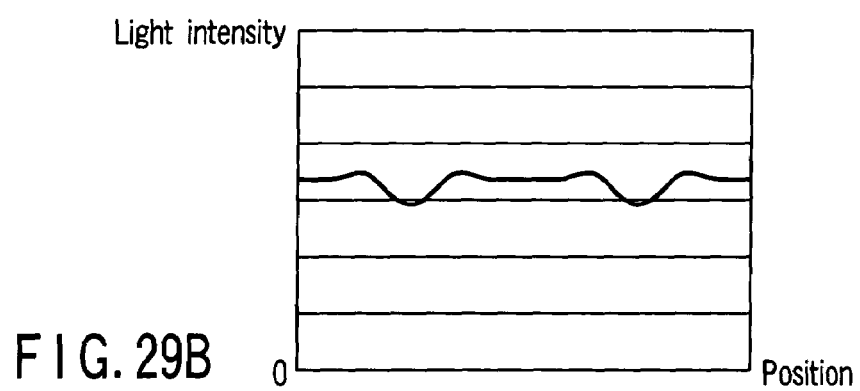
Figure 30A:
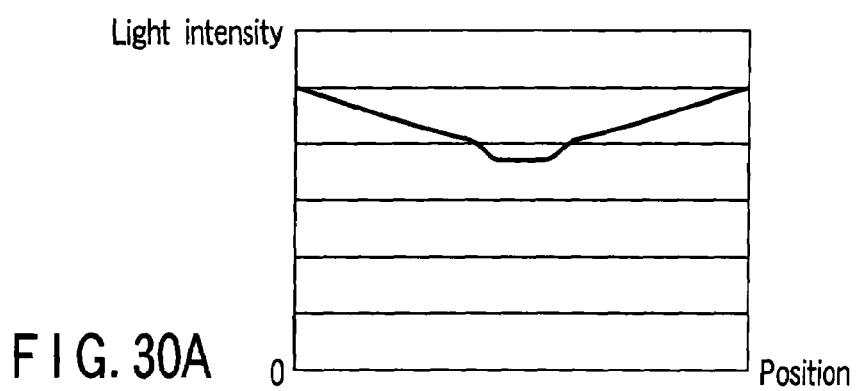
FIGS. 30A and 30B are views each showing a light intensity distribution obtained along a cross section B in the sixth embodiment.
Figure 30B:
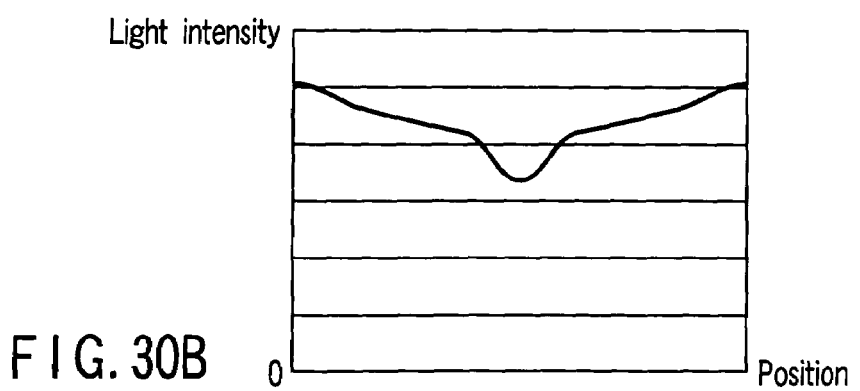

29A is formed along a cross section A in the focus state. Additionally, even in the defocus state, such a symmetrical light intensity distribution with an inverse peak shape as shown in FIG. 29B is formed along a cross section A. Further, in the focus state, such a light intensity gradient distribution as shown in FIG. 30A can be obtained along a cross section B. Furthermore, even in the defocus state, such a V-shaped light intensity gradient distribution as shown in FIG. 30B can be obtained along the cross section B.

In this manner, in the sixth embodiment, like the first embodiment, the symmetrical light intensity distribution with the inverse peak shape can be obtained along the cross section A by the effect of the light beam division element with almost no influence of defocusing like the first embodiment. Moreover, like the fifth embodiment, a light intensity distribution which is ideal for crystallization, i.e., a light intensity distribution with a V-shaped pattern+a point-inverse-peak-shaped pattern can be obtained. In the sixth embodiment, however, the V-shaped light intensity gradient distribution obtained along the cross section B is affected by defocusing to some extent.

Seventh Embodiment

Figure 31:
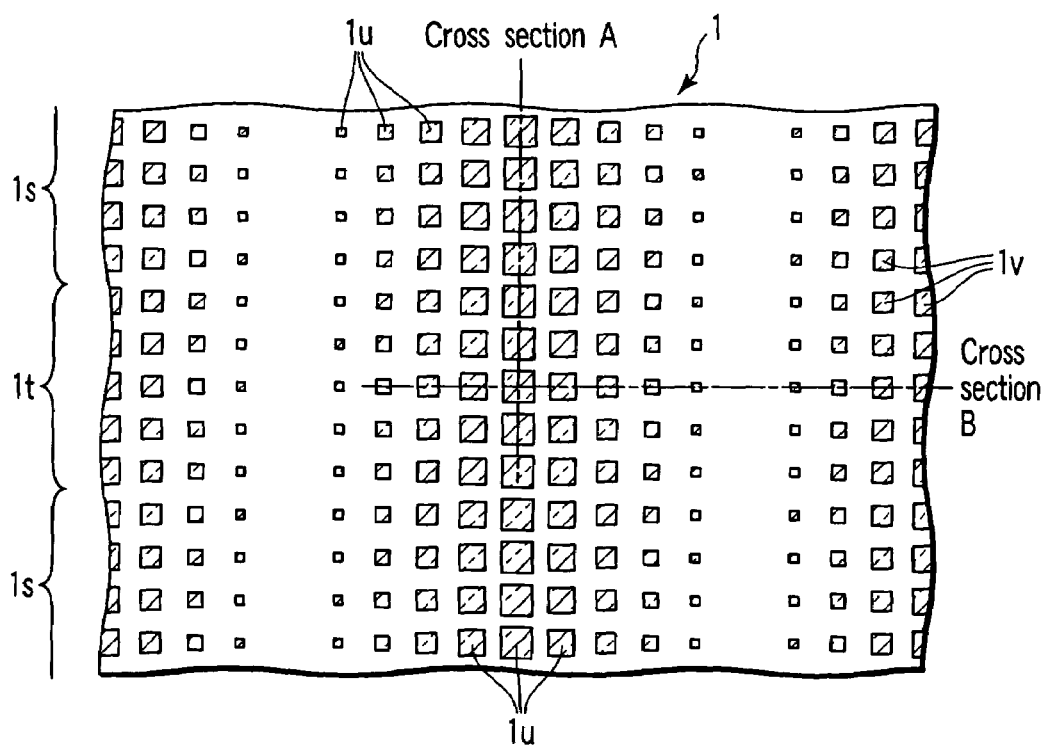
FIG. 31 is a view showing a pattern of an optical modulation element according to a seventh embodiment.

FIG. 31 is a view showing a pattern of an optical modulation element according to a seventh embodiment. Referring to FIG. 31, the optical modulation element 1 according to the seventh embodiment has two phase areas which are alternately repeatedly formed along one direction (a vertical direction in the drawing), i.e., a phase area $1s$ having a width of 5 µm and a phase area it having a width of 5 µm like the optical modulation element according to the fourth embodiment shown in FIG. 21. Each square area $1u$ which has an optically smaller dimension than a radius of a point spread function range of the image formation optical system 4 and a phase value of 60 degrees is formed in the phase area $1s$ in such a manner that an area share ratio of the area $1u$ varies depending on each position.

On the other hand, each square area $1v$ which has an optically smaller dimension than the radius of the point spread function range of the image formation optical system 4 and a phase value of −60 degrees is formed in the phase area $1t$ in such a manner that its area share ratio of the area $1v$ varies depending on each position. It is to be noted that any other area than the square areas $1u$ and $1v$ with hatching has a phase value of 0 degree in the phase area $1s$ and the phase area $1t$. Moreover, the area share ratio of each of the square areas $1u$ and $1v$ varies between 0% and approximately 50%. Additionally, a boundary between the phase area $1s$ and the phase area $1t$ substantially forms a phase step.

Figure 32A:
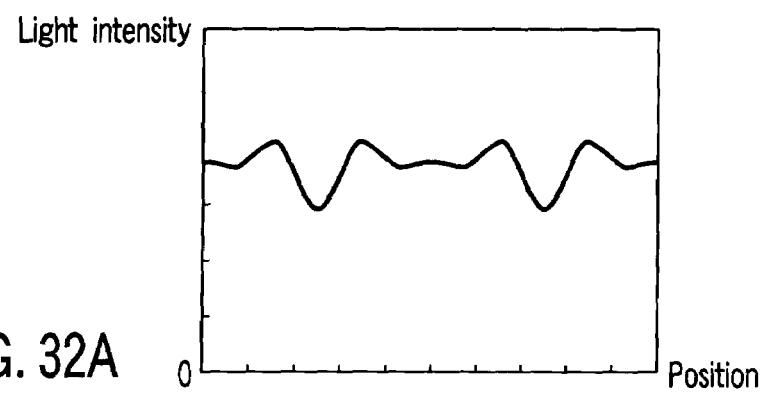
FIGS. 32A and 32B are views each showing a light intensity distribution obtained along a cross section A in the seventh embodiment.
Figure 32B:
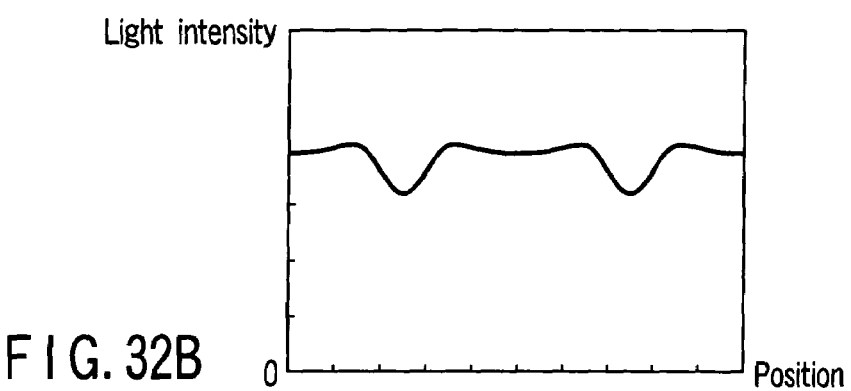
Figure 33A:
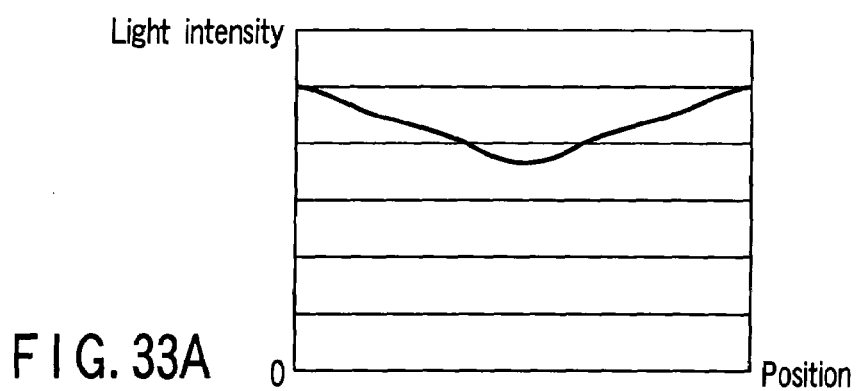
FIGS. 33A and 33B are views each showing a light intensity distribution obtained along a cross section B in the seventh embodiment.
Figure 33B:
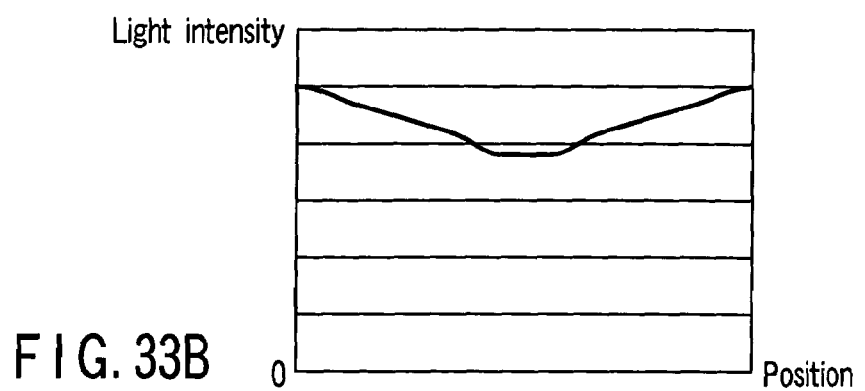

In the seventh embodiment, such a symmetrical light intensity distribution with an inverse peak shape as shown in FIG. 32A is formed along a cross section A in the focus state. Additionally, even in the defocus state, such a symmetrical light intensity distribution with an inverse peak shape as shown in FIG. 32B is formed along the cross section A. Further, in the focus state, such a V-shaped light intensity gradient distribution as shown in FIG. 33A is obtained along a cross section B. Furthermore, even in the defocus state, such a V-shaped light intensity gradient distribution can be obtained along the cross section B.

In this manner, in the seventh embodiment, the symmetrical light intensity distribution with the inverse peak shape can be obtained along the cross section A by the effect of the light beam division element with almost no influence of defocusing like the first embodiment. Moreover, like the fourth embodiment, the V-shaped light intensity gradient distribution can be obtained along the cross section B by the effect of the light beam division element with almost no influence of defocusing. Additionally, like the fifth embodiment, a light intensity distribution which is ideal for crystallization, i.e., a light intensity distribution with a V-shaped pattern+a point-inverse-peak-shaped pattern can be obtained.

Figure 34A:
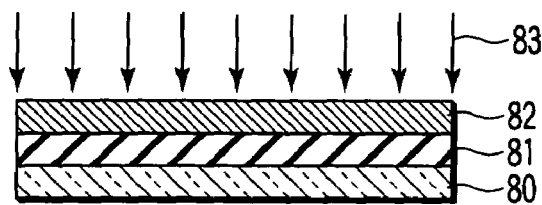
FIGS. 34A to 34E are process cross-sectional views showing processes for manufacturing an electronic device by using a crystallization apparatus according to the embodiment.

FIGS. 34A to 34E are process cross-sectional views showing processes of manufacturing an electronic device in an area crystallized by using the crystallization apparatus according to this embodiment. As shown in FIG. 34A, there is prepared a processed substrate 5 in which an underlying film 81 (e.g., a laminated film formed of SiN having a film thickness of 50 nm and $SiO_2$ having a film thickness of 100 nm) and an amorphous semiconductor film 82 (e.g., Si, Ge, SiGe or the like having a film thickness of approximately 50 nm to 200 nm) are formed on an insulating substrate 80 (e.g., alkali glass, quartz glass, plastic or polyimide) by using a chemical vapor deposition method or a sputtering method. Then, a laser light 83 (e.g., a KrF excimer laser light or an XeCl excimer laser light) is applied to a predetermined area on a surface of an amorphous semiconductor film 82 by using the crystallization apparatus according to this embodiment.

Figure 34B:
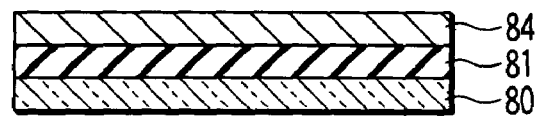
Figure 34C:
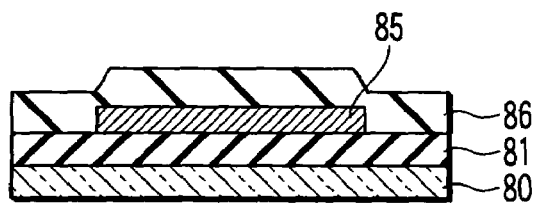
Figure 34D:
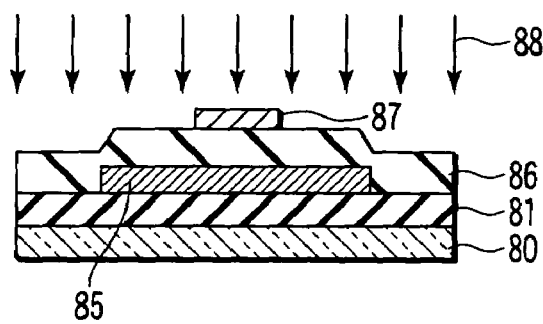
Figure 34E:
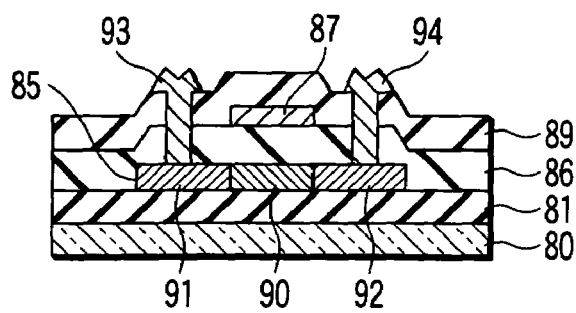

In this manner, as shown in FIG. 34B, a polycrystal semiconductor film or a single-crystallized semiconductor film 84 having a crystal with a large particle size is generated. Then, as shown in FIG. 34C, the polycrystal semiconductor film or the single-crystallized semiconductor film 84 is processed into an island-shaped semiconductor film 85 which becomes an area in which, e.g., a thin film transistor is formed by using a photolithography technique, and an $SiO_2$ film having a film thickness of 20 nm to 100 nm is formed as a gate insulating film 86 on the surface by using the chemical vapor deposition method or the sputtering method. Additionally, as shown in FIG. 34D, a gate electrode 87 (e.g., silicide or MoW) is formed on the gate insulating film, and impurity ions 88 (phosphor in case of an N channel transistor, and boron in case of a P channel transistor) are implanted with the gate electrode 87 being used as a mask. Thereafter, annealing (e.g., for one hour at 450° C.) is performed in a nitrogen atmosphere so that the impurity is activated, and a source area 91 and a drain area 92 are formed in the island-shaped semiconductor film 85. Subsequently, as shown in FIG. 34E, an interlayer insulating film 89 is formed, contact holes are formed so that a source electrode 93 and a drain electrode 94 which are connected with the source area 91 and the drain area 92 which are coupled through a channel 90 are formed.

In the above-described processes, the channel 90 is formed in accordance with a position of a crystal with a large particle size in the polycrystal semiconductor film or the single-crystallized semiconductor film 84 generated in the processes shown in FIGS. 34A and 34B. With the above-described processes, a polycrystal transistor or a thin film transistor (TFT) in a single-crystallized semiconductor can be formed. The thus manufactured polycrystal transistor or single-crystallized transistor can be applied to a drive circuit for a liquid crystal display unit (a display) or an EL (electroluminescence) display, or an integrated circuit for a memory (SRAM or DRAM) or a CPU.

It is to be noted that, in the above description, the present invention is applied to the crystallization apparatus and the crystallization method which generate a crystallized semiconductor film by applying a light having a predetermined light intensity distribution to a polycrystal semiconductor film or an amorphous semiconductor film. However, the present invention is not restricted thereto, and the present invention can be generally applied to a light application apparatus which forms a predetermined light intensity distribution on a predetermined surface through an image formation optical system. Further, although the description has been given as to the example of the optical modulation element 1 having a phase difference of 60 degrees in the foregoing embodiments, any phase difference can be adopted as long as the phase difference is other than 180 degrees.

Eighth Embodiment

Figures 35A, 35B:
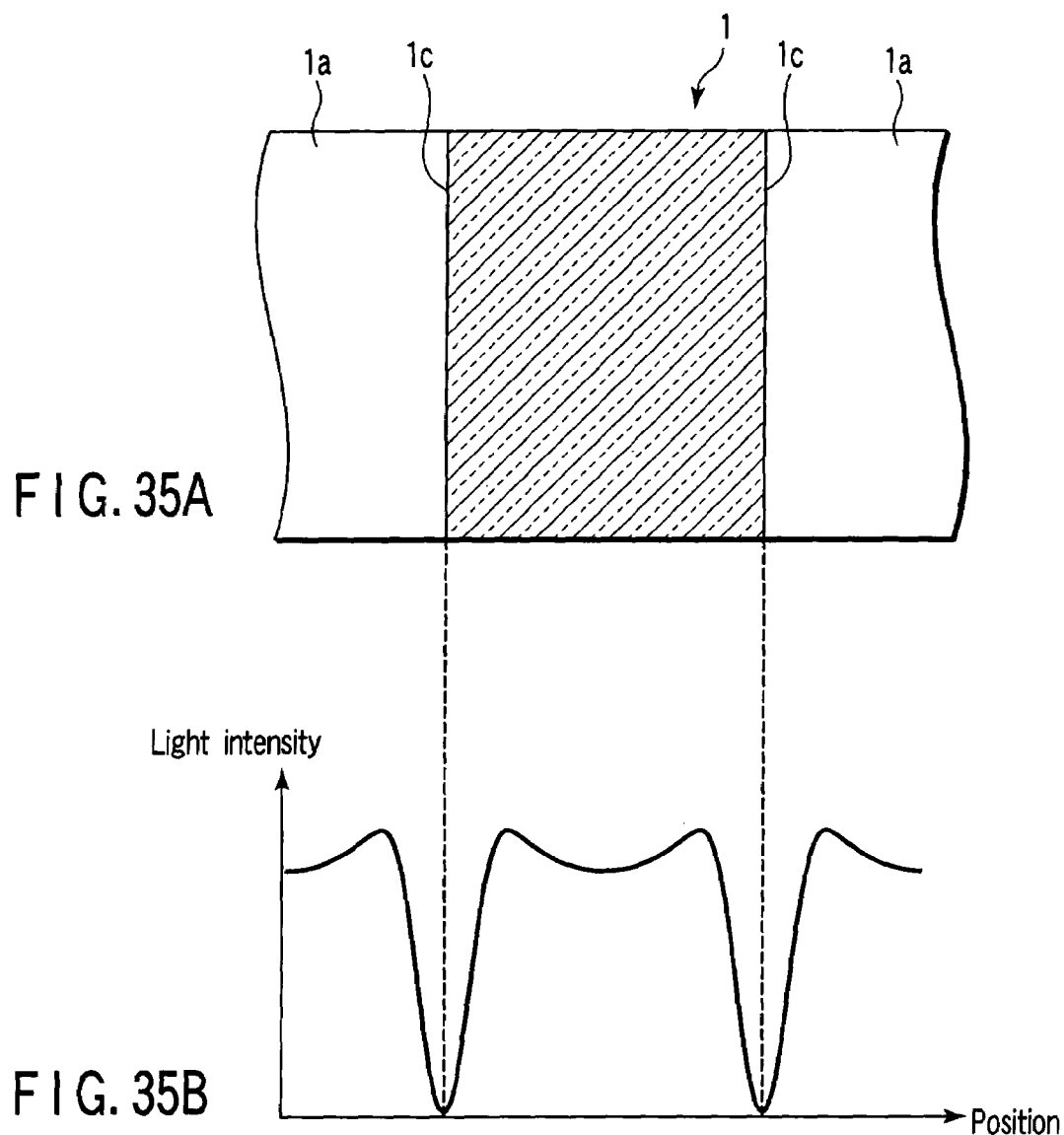
FIGS. 35A and 35B are views illustrating a structure and an effect of an optical modulation element in an eighth embodiment.

FIGS. 35A and 35B are views illustrating a structure and an effect of an optical modulation element 1 in this embodiment. As shown in FIG. 35A, the optical modulation element 1 according to this embodiment is a line type phase shifter in which a rectangular area 1a having a phase value of 0 degree and a rectangular area 1b having a phase value of 180 degrees as different from the first embodiment are alternately repeated along one direction, for example. In this manner, a phase difference line (a boundary of phases: a phase shift line) 1c is formed between the two rectangular areas 1a and 1b. Furthermore, one or a plurality of phase difference lines 1c are formed with a predetermined pitch in the entire optical modulation element 1.

Therefore, when the light beam division element 2 is not interposed, a light intensity distribution with an inverse peak shape in which a light intensity is substantially zero in a line area corresponding to the phase difference line 1c (a step portion) of the optical modulation element 1 and the light intensity suddenly increases toward the periphery is formed on the surface of the processed substrate 5 as shown in FIG. 35B. The optical modulation element 1 can be manufactured by forming a thickness distribution corresponding to a necessary phase difference on, e.g., a quartz glass substrate based on the above-described expression. A change in thickness of the quartz glass substrate can be formed by selective etching or FIB (Focused Ion beam) processing.

Figure 36A:
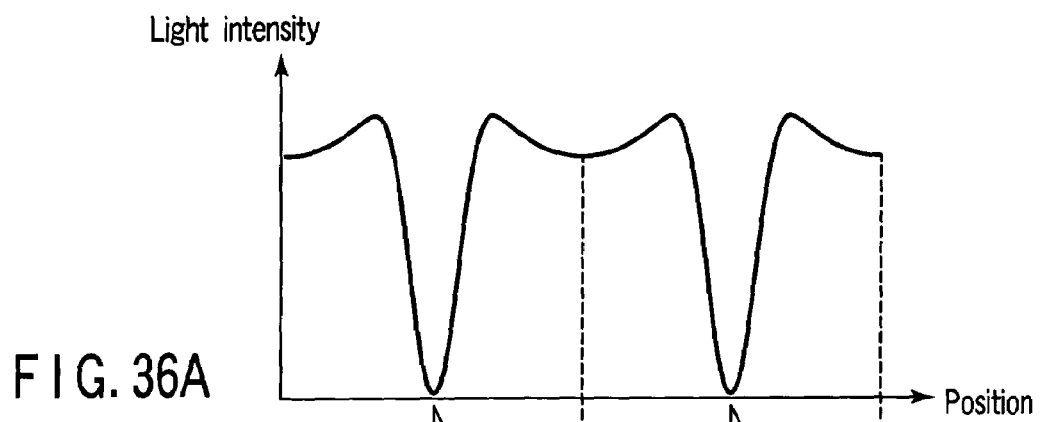
FIGS. 36A to 36C are views illustrating a cooperative effect of the optical modulation element and a light beam division element in the eighth embodiment.
Figure 36B:
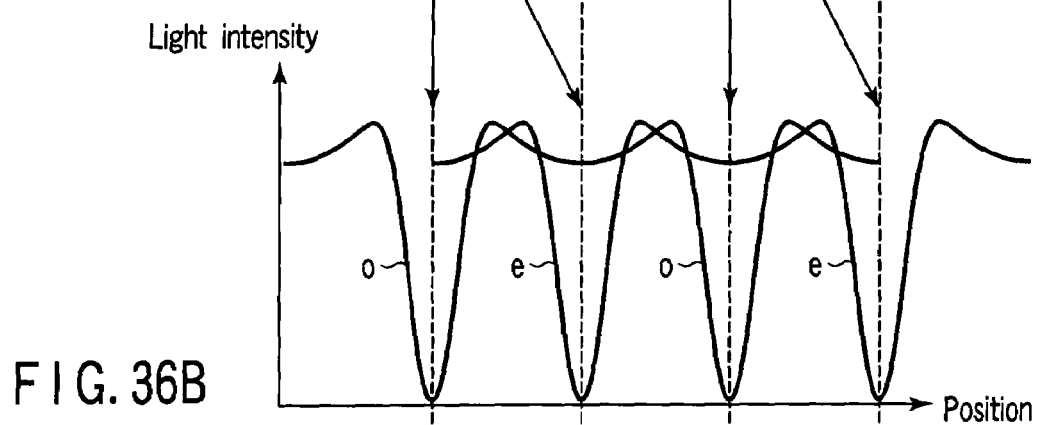
Figure 36C:
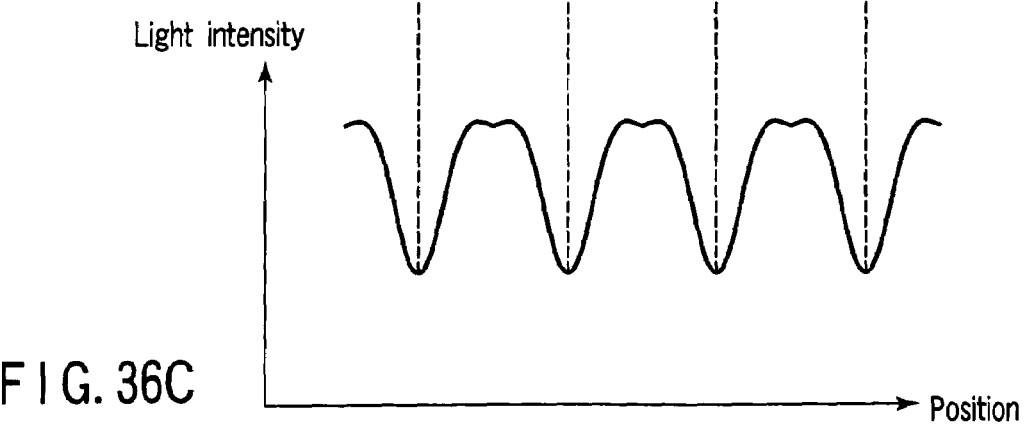

FIGS. 36A to 36C are views illustrating a cooperative effect of the optical modulation element 1 and the light beam division element 2 in this embodiment. When the birefringent element 2E described with reference to FIGS. 4A and 4B is not interposed, a light intensity distribution with an inverse peak shape in which a light intensity is substantially zero in a line area corresponding to the phase difference line 1c of the optical modulation element 1 and the light intensity suddenly increases toward the periphery is formed on the surface of the processed substrate 5 as shown in FIG. 36A. In this embodiment, since an incident light beam is divided into two non-interference light beams having polarization states through the birefringent element 2E, a predetermined light intensity corresponding to a combination of two light intensity distributions with an inverse peak shape separated from each other can be formed on the surface of the processed substrate 5.

In this example, if the light beam entering the birefringent element 2E is in the randomly-polarized state, the two light beams divided through the birefringent element 2E have substantially equal intensities. Additionally, when the two light beams divided through the birefringent element 2E are superimposed on the surface of the processed substrate 5, the two light beams are simply combined as a sum of light intensities because these light beams do not interfere with each other. Considering this fact, in this embodiment, a distance d1 between a light intensity distribution with an inverse peak shape formed on the surface of the processed substrate 5 by a normal light ray o and a light intensity distribution with an inverse peak shape formed on the surface of the processed substrate 5 by an abnormal light ray e is set to correspond to a ½ of a pitch (odd-fold of a half pitch in general) of the phase difference line 1c of the optical modulation element 1 as shown in FIG. 36B.

Therefore, an inverse peak portion in a light intensity distribution with an inverse peak shape formed by a normal light ray o is superimposed on a relatively flat portion in a light intensity distribution with an inverse peak shape formed by an abnormal light ray e, and an inverse peak portion in the light intensity distribution with the inverse peak shape formed by the abnormal light ray e is likewise superimposed on a relatively flat portion in the light intensity distribution with the inverse peak shape formed by the normal light ray o. As a result, in this embodiment, a light intensity distribution with an inverse peak shape in which a light intensity is minimum in line areas corresponding to the phase difference line 1c and an intermediate line between the phase difference lines 1c of the optical modulation element 1 and the light intensity suddenly increases toward the periphery is formed on the surface of the processed substrate 5 by the cooperative effect of the optical modulation element 1 and the birefringent element 2E as shown in FIG. 36C. That is, an intensity of another light beam is added to the minimum light display intensity, thereby obtaining a high light intensity. This light intensity can be selected in the vicinity of a fusing point of the non-single crystal film of the processed substrate 5.

In this example, the minimum light intensity at the inverse peak point is approximately ½ of the maximum light intensity in the light intensity distribution with the inverse peak shape formed on the surface of the processed substrate 5 through the optical modulation element 1 and the birefringent element 2E. Furthermore, the light intensity distribution with the inverse peak shape formed by using the phase shifter of 180 degrees is hardly affected by defocusing. Therefore, as shown in FIG. 36C, the light intensity distribution with the inverse peak shape formed on the surface of the processed substrate 5 through the optical modulation element 1 and the birefringent element 2E is likewise hardly affected by defocusing.

As described above, in this embodiment, the minimum light intensity at the inverse peak point is approximately ½ of the maximum light intensity in the light intensity distribution having the inverse peak shape formed on the surface of the processed substrate 5. Moreover, although a board thickness deviation which can be a factor of defocusing unavoidably exists in the processed substrate 5, the light intensity distribution with the inverse peak shape formed on the surface of the processed substrate 5 is hardly affected by defocusing. As a result, in this embodiment, a desired light intensity distribution with an inverse peak shape can be stably formed based on a deep focal depth, and a filling rate of a crystal grain formed on the semiconductor film of the processing substrate 5 can be increased.

In this embodiment, in order to minimize an aberration generated by the birefringent element 2E, it is desirable to set the birefringent element 2E to be appressed against the optical modulation element 1 or set the birefringent element 2E close to the optical modulation element 1 as much as possible like the foregoing embodiments. Since unevenness in intensity is produced due to interference when reflection repeatedly occurs between the surface of the birefringent element 2E and the surface of the optical modulation element 1, it is desirable to provide a refractive factor matching material between the two elements or provide a reflection free coat on the opposed surfaces of the two elements.

It is also possible to provide a step which is used to obtain a desired phase difference by subjecting the light incidence surface of the birefringent element 2E to surface treatment so that the function of the birefringent element 2E is integrated with the function of the optical modulation element 1. That is, the optical modulating means can be integrated with the light dividing means. Further, although the birefringent element 2E is placed on the exiting light side (the rear side) of the optical modulation element 1 so that the birefringent element 2E is arranged in close proximity to the optical modulation element 1, the present invention is not restricted thereto, and the birefringent element 2E may be arranged in the vicinity of or at a contact position with the optical modulation element 1, or at or in the vicinity of a conjugate position of the optical modulation element 1.

In the first and eighth embodiments, the line type phase shifter which includes a phase difference line other than 180 degrees and the line type phase shifter which includes a phase difference line of 180 degrees which are arranged in accordance with a predetermined cycle are used as the optical modulation element 1. However, the present invention is not restricted thereto, it is also possible to use any phase shifter having such a pattern as that three or more types of phase value areas come into contact with each other at one point. Specifically, as shown in FIG. 37A, it is possible to use an optical modulation element 10 having a conformation in which four types of rectangular areas 10a, 10b, 10c and 10d having different phase values are adjacent to each other at a predetermined point 10e.

In this example, the optical modulation element 10 including a phase difference line of 180 degrees (corresponding to the eighth embodiment) has the first rectangular area 10a having a phase value of 0 degree, the second rectangular area 10b having a phase value of 90 degrees, the third rectangular area 10c having a phase value of 180 degrees, and the fourth rectangular area 10d having a phase value of 270 degrees, for example. In case of an optical modulation element including no phase difference line of 180 degrees (corresponding to the first embodiment), it can be understood that the phase values are different from those described above. In any case, four straight lines which intersect crosswise at the point 10e are constituted to correspond to a boundary between the first rectangular area 10a and the second rectangular area 10b, a boundary between the second rectangular area 10b and the third rectangular area 10c, a boundary between the third rectangular area 10c and the fourth rectangular area 10d and a boundary between the fourth rectangular area 10d and the first rectangular area 10a.

Figure 37A:
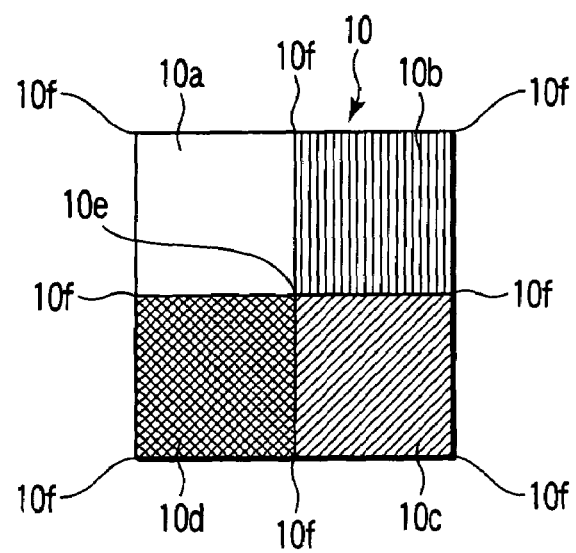
FIGS. 37A to 37C are views illustrating a modification using as the optical modulation element a phase shifter having such a pattern as that four types of phase value areas come into contact with each other at one point.
Figure 37B:
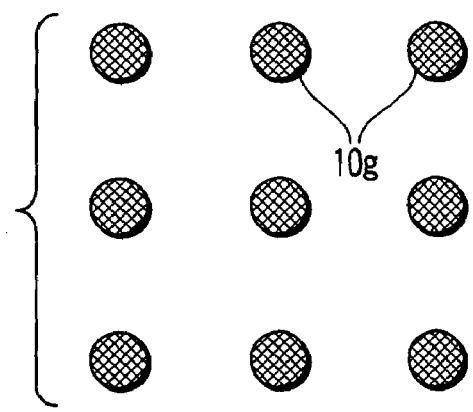
Figure 37C:
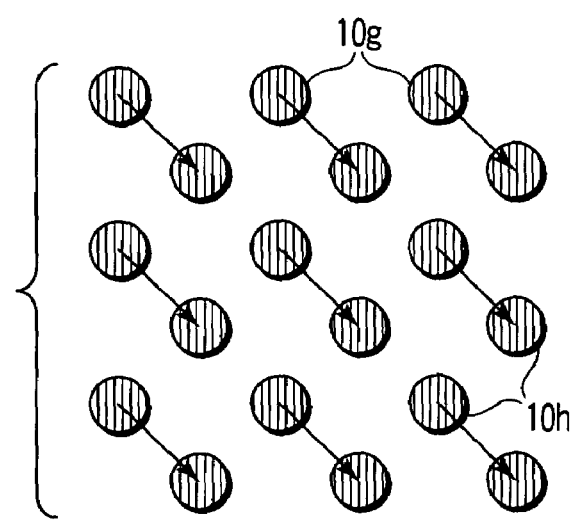

Although not shown, a phase pattern shown in FIG. 37A is two-dimensionally repeatedly formed to the optical modulation element 10. In this case, respective corner portions 10f of the rectangular areas as well as the point 10e constitute contact points of the four phase value areas 10a to 10d and thus constitute phase difference points (phase shift points). As a result, when the birefringent elements 2E or 20 to 22 are not interposed, as shown in FIG. 37B, a light intensity distribution with an inverse peak shape in which a light intensity is minimum in respective spot areas 10g corresponding to the phase difference points 10e and 10f of the optical modulation element 10 and the light intensity suddenly increases toward the periphery is formed on the surface of the processed substrate 5.

Since the birefringent elements 2E or 20 to 22 are actually interposed, two light intensity distributions having an inverse peak shape separated from each other are superimposed along the diagonal direction of the rectangular areas on the surface of the processed substrate 5, thereby forming a desired light intensity distribution with an inverse peak shape. In this example, a distance between the two light intensity distributions having the inverse peak shape separated from each other is set to correspond to a half of a pitch (generally odd-fold of a ½ pitch) of the four phase difference areas 10a to 10d in the optical modulation element 10 along the diagonal direction of the rectangular areas.

As described above, in case of the modification using the optical modulation element 10, there can be obtained a light intensity distribution with an inverse peak shape in which a light intensity is minimum in spot areas 10g corresponding to the phase difference points 10e and 10f and spot areas 10h placed at intermediate positions of the spot areas 10g and the light intensity suddenly increases toward all directions of the periphery as shown in FIG. 10C. As a result, a desired light intensity distribution with an inverse peak shape can be stably formed based on a deep focal depth, and a filling rate of a crystal grain formed on the semiconductor film of the processed substrate 5 can be increased. That is, a desired light intensity distribution with an inverse peak shape can be stably formed at a desired position, and a filling rate of a crystal grain formed on the semiconductor film can be increased.

Figure 38A:
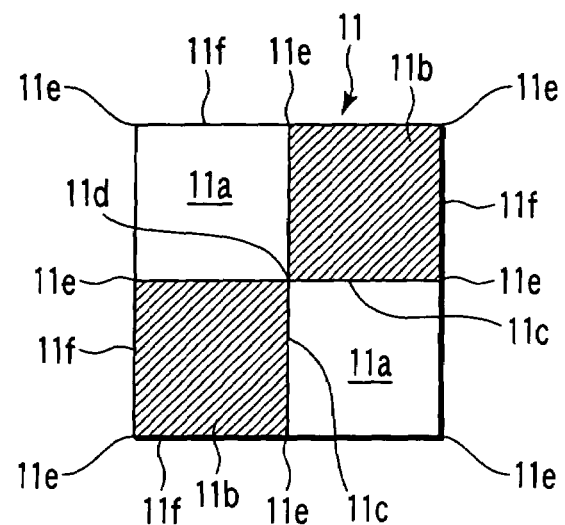
FIGS. 38A to 38C are views each illustrating a modification using as the optical modulation element a phase shifter having such a pattern as that four phase difference lines of 180 degrees cross each other at one point.

As a modification of the eighth embodiment, it is possible to use a phase shifter having a pattern in which three or more phase difference lines of approximately 180 degrees intersect at one point. Specifically, as shown in FIG. 38A, it is possible to use an optical modulation element 11 in which phase difference lines 11c of 180 degrees formed between first rectangular areas 11a having a phase value of 0 degree and second rectangular areas 11b having a phase value of 180 degrees are orthogonal to each other at a predetermined point 11d. In this optical modulation element 11, the first rectangular area 11a having a phase value of 0 degree and the second rectangular area 11b having a phase value of 180 degrees are alternately two-dimensionally formed.

Figure 38B:
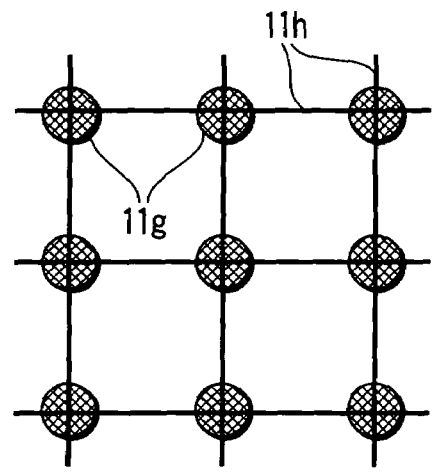
Figure 38C:
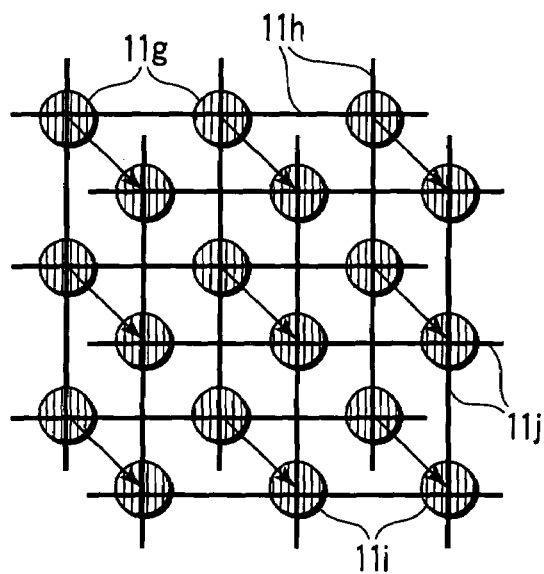

Although not shown, a plurality of phase patterns shown in FIG. 38A are two-dimensionally repeatedly formed on the practical optical modulation element 11. In this case, respective corner portions 11e of the rectangular areas as well as the central point 11d shown in FIG. 38A constitute phase difference points, respective sides 11f of the rectangular areas as well as the cruciform cross line 11c constitute phase difference lines. As a result, when the birefringent element 2E is not interposed, as shown in FIG. 38B, a light intensity distribution having an inverse peak shape in which a light intensity is minimum in spot areas 11g corresponding to phase difference points 11d and 11e of the optical modulation element 11 and line areas 11h corresponding to phase difference lines 11c and 11f of the optical modulation element 11 and the light intensity suddenly increases toward the periphery is obtained on the surface of the processed substrate 5.

Since the birefringent element 2E is actually interposed, two light intensity distributions having an inverse peak shape separated from each other are superimposed in respective phase patterns or adjacent phase patterns on the surface of the processed substrate, thereby forming a desired light intensity distribution having an inverse peak shape. In this example, a distance between peaks of the two light intensity distributions with the inverse peak shape is set to correspond to ½ of a pitch (generally odd-fold of a ½ pitch) of intersection points 11d and 11e of the phase difference lines 11c and 11f in the optical modulation element 11.

As described above, in case of the modification using the optical modulation element 11, a light intensity distribution having an inverse peak shape in which a light intensity is minimum in spot areas 11g corresponding to the phase difference points 11d and 11e, spot areas 11i placed at intermediate positions of the spot areas 11g, line areas 11h corresponding to the phase difference lines 11c and 11f and line areas 11j placed at intermediate positions of the line areas 11h and the light intensity suddenly increases toward the periphery is obtained on the surface of the processed substrate 5. As a result, a desired light intensity distribution with an inverse peak shape can be stably formed based on a deep focal depth, and a filling rate of a crystal grain formed on the semiconductor film of the processed substrate 5 can be increased. That is, a desired light intensity distribution with an inverse peak shape can be stably formed at a desired position, and a filling rate of a crystal grain formed on the semiconductor film can be increased.

Figure 39:
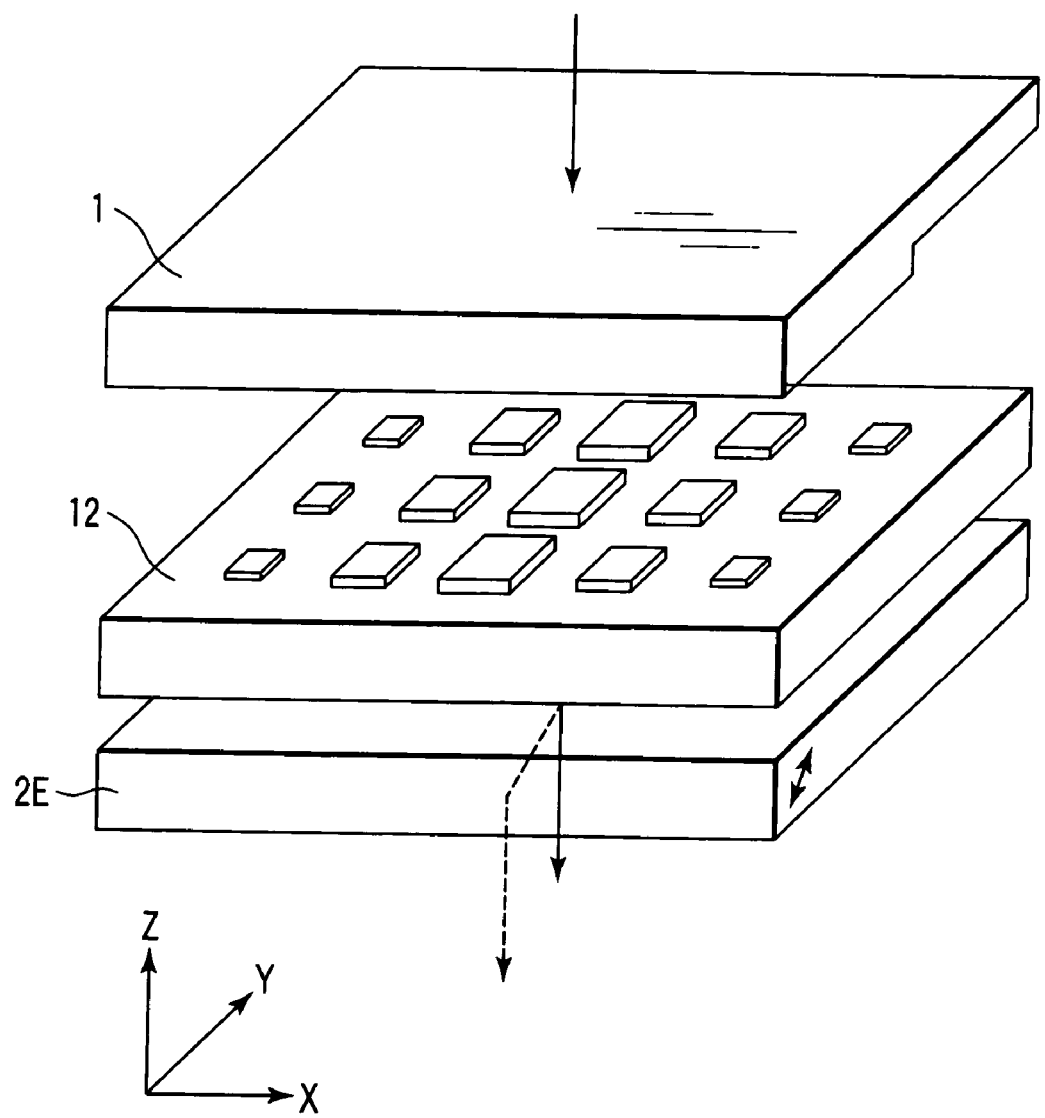
FIG. 39 is a view showing a modification in which a second optical modulation element having a pattern which forms a light intensity gradient distribution based on an incident light beam is additionally provided.

Furthermore, the foregoing embodiments use the optical modulation element 1 having a pattern which forms a light intensity distribution with an inverse peak shape based on an incident light beam. As shown in FIG. 39, however, it is possible to use a second optical modulation element 12 having a pattern which forms a light intensity gradient distribution based on an incident light beam as well as the optical modulation element 1 having a pattern which forms a light intensity distribution with an inverse peak shape. In FIG. 39, the second optical modulation element 12 is arranged in a light path between the optical modulation element 1 and the birefringent element 2E, and a phase pattern surface of the optical modulation element 1 faces a phase pattern surface of the second optical modulation element 12.

Figure 40A:
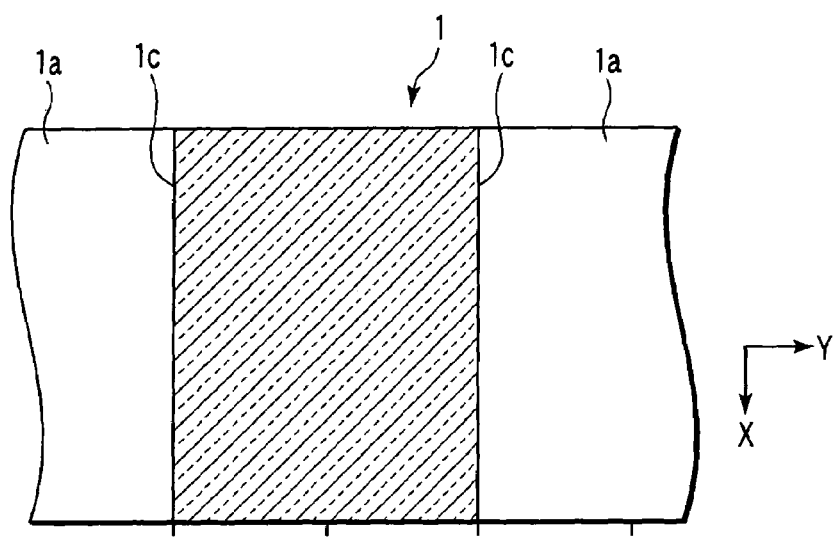
FIGS. 40A and 40B are views illustrating a light intensity distribution with an inverse peak shape formed by an effect of the optical modulation element and the birefringent element in the modification depicted in FIG. 39.
Figure 40B:
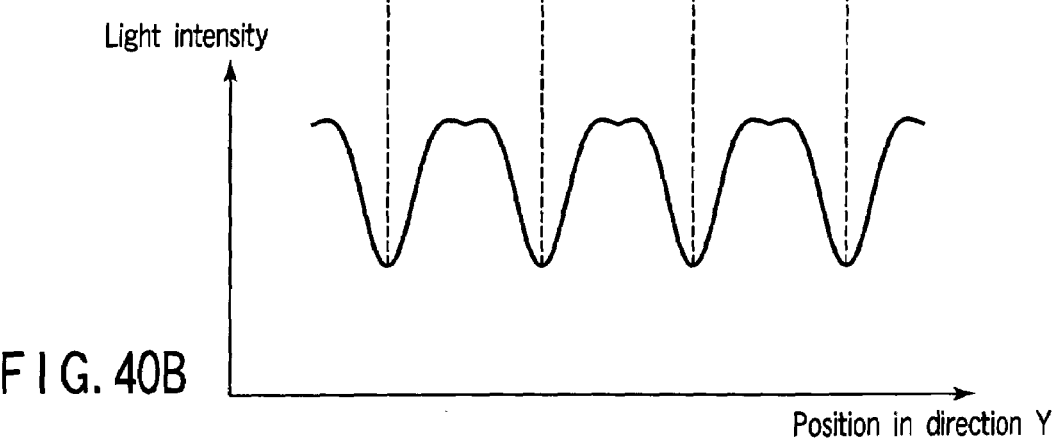

As shown in FIG. 40A, phase difference lines 1c of 180 degrees linearly extending in a direction X are formed at a predetermined pitch in a direction Y to the optical modulation element 1 according to the eighth embodiment. Moreover, the birefringent element 2E is set so that an incident light beam is divided into two light beams separated from each other in the direction Y. In this case, as described above, a desired light intensity distribution with an inverse peak shape shown in FIG. 40B is formed on the surface of the processed substrate 5 by the effect of the optical modulation element 1 having a phase pattern shown in FIG. 40A and the birefringent element 2E.

Figures 41A, 41B:
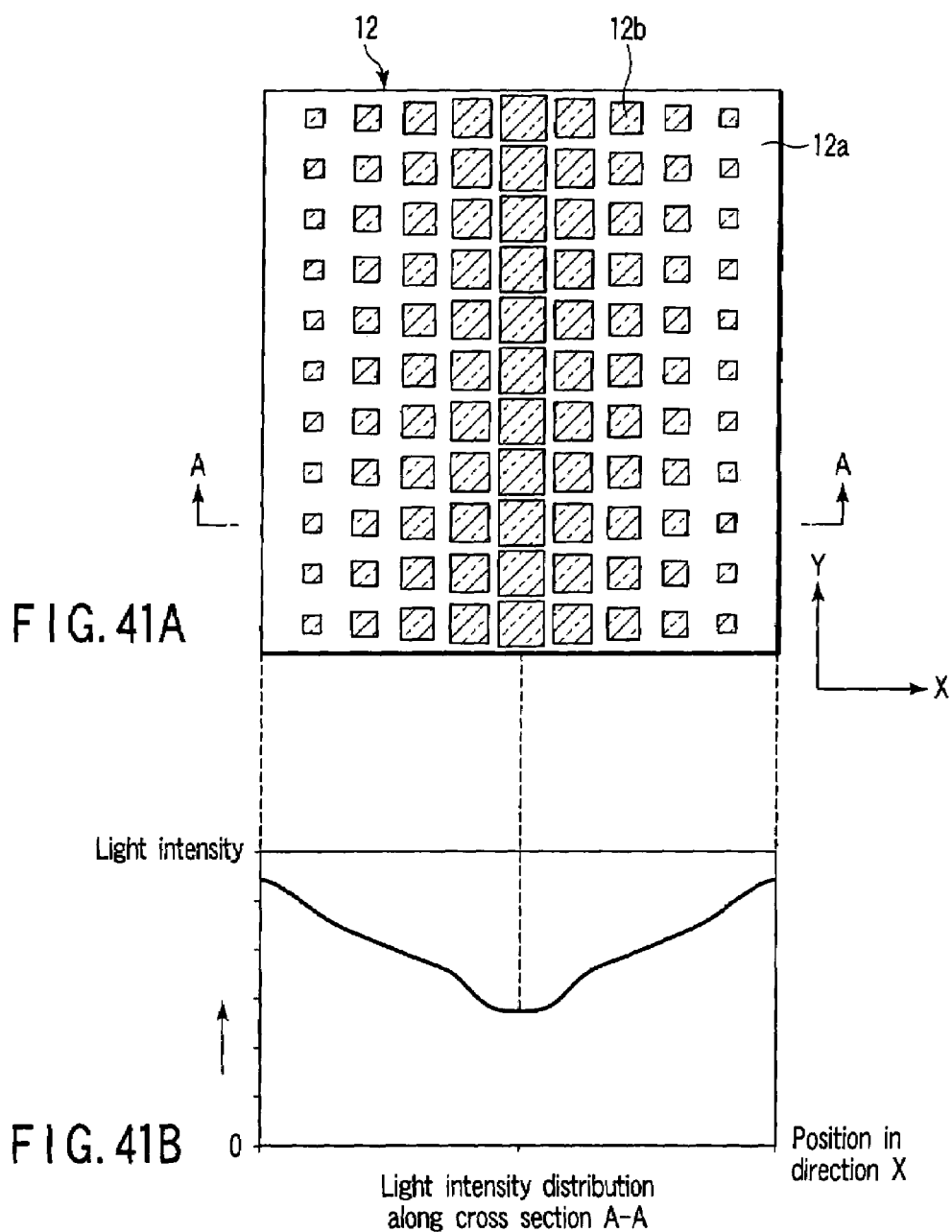
FIGS. 41A and 41B are views illustrating a pattern of the second optical modulation element in the modification depicted in FIG. 39.

FIG. 41A is a view showing a pattern of the second optical modulation element in the modification depicted in FIG. 39. Additionally, FIG. 42A is a view showing a basic pattern in the second optical modulation element depicted in FIG. 41A. The pattern of the second optical modulation element 12 shown in FIG. 41A includes a basic pattern depicted in FIG. 42A. Referring to FIG. 42A, the basic pattern of the second optical modulation element 12 has a plurality of cells (indicated by broken lines having a rectangular shape in the drawing) 12c whose size is optically smaller than a radius of a point spread function range of the image formation optical system 4.

A first area (indicated by a shaded portion in the drawing) 12b having a phase value of, e.g., −90 degrees and a second area (indicated by a blank portion in the drawing) 12a having a phase value of, e.g., 0 degree are formed in each cell 12c. As shown in FIG. 42A, area share ratios of the first area 12b and the second area 12a in each cell 12c vary in accordance with each cell. In other words, there is provided a phase distribution in which area share ratios of the first area 12b having a phase value of −90 degrees and the second area 12a having a phase value of 0 degree vary depending on each position in a direction X. More specifically, an area share ratio of the second area 12a in a cell is closest to 50% in a cell on the left side in the drawing, it is closest to 100% in a cell on the right side in the drawing, and it monotonously changes between the cells along the direction X.

As described above, the second optical modulation element 12 has a phase distribution based on a phase modulation unit (cell) 12c whose size is optically smaller than a radius of a point spread function range of the image formation optical system 4. Therefore, a light intensity distribution formed on the processed substrate 5 can be freely controlled in accordance with an analytic and simple calculation by appropriately changing the area share ratios of the first area 12b and the second area 12a in each phase modulation unit 12c, i.e., a sum of two phase vectors.

Specifically, as shown in FIG. 41B, there can be obtained a V-shaped light intensity gradient distribution which is one-dimensional (having a gradient in the direction X) in which the light intensity is maximum at positions of both sides where the area share ratio of the second area 12a is closest to 100% and the light intensity is minimum at a central position where the area share ratio of the second area 12a is closest to 50%. In this manner, a direction of dividing a light beam by the birefringent element 2E (the direction Y) is orthogonal to a gradient direction (the direction X) of the light intensity gradient distribution. The second optical modulation element 12 can be manufactured by forming a thickness distribution corresponding to a necessary phase step on, e.g., a quartz glass substrate. A change in thickness of the quartz glass substrate can be formed by selective etching or FIB (Focused Ion Beam) processing.

Figure 43:
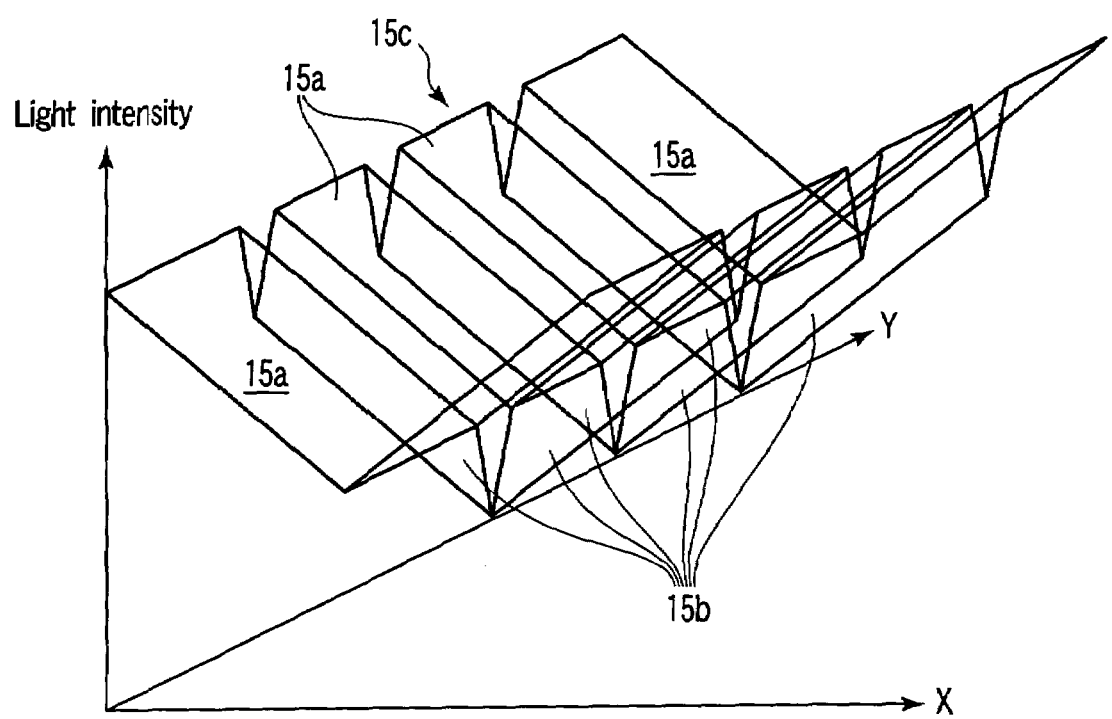
FIG. 43 is a perspective view showing a combined light intensity distribution of a V-shaped light intensity gradient distribution and a light intensity distribution with an inverse peak shape formed in the modification depicted in FIG. 39.
Figure 44A:
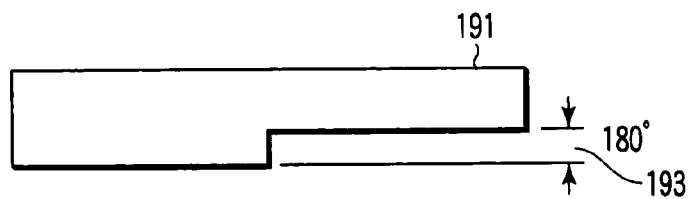
FIGS. 44A to 44D are views each schematically showing a light intensity distribution with an inverse peak shape formed through an image formation optical system when a phase shifter having a phase step whose phase quantity is 180 degrees is used.
Figure 44B:
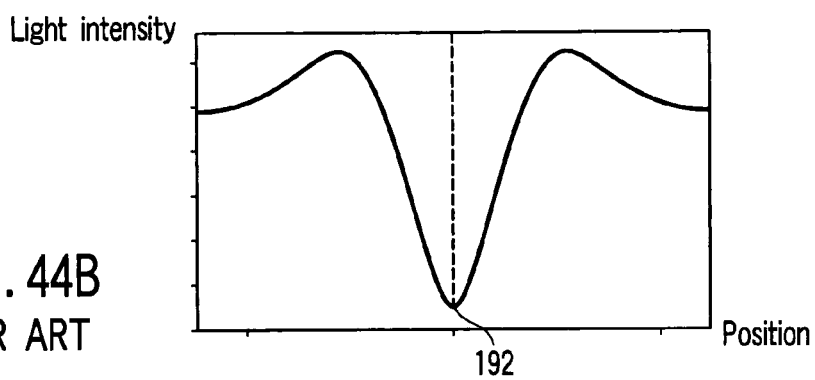
Figure 44C:
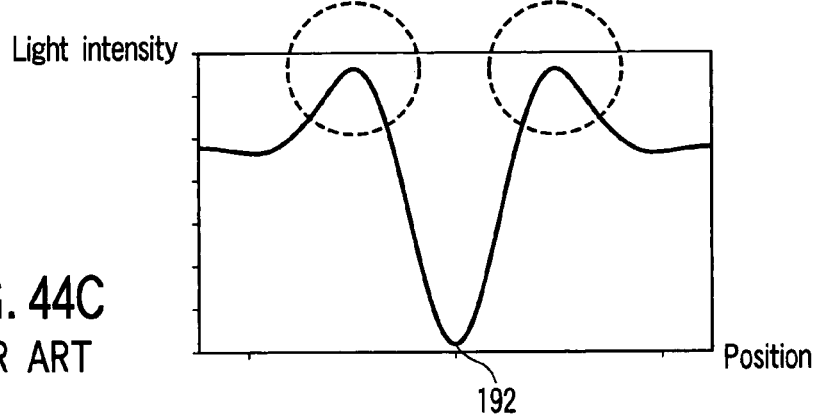
Figure 44D:
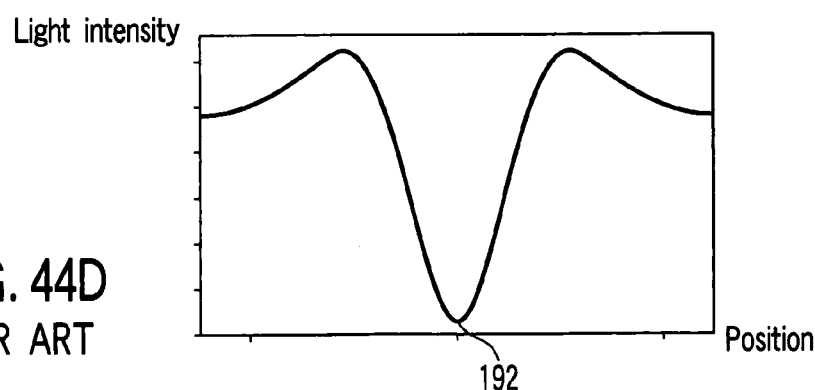
Figure 45A:
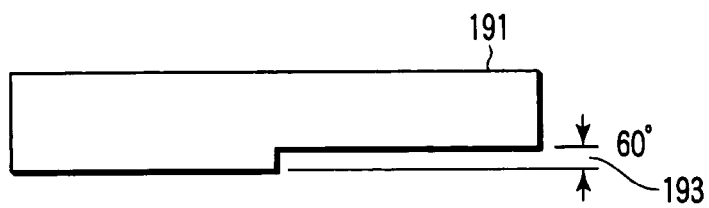
FIGS. 45A to 45D are views each schematically showing a light intensity distribution with an inverse peak shape formed through the image formation optical system when a phase shifter having a phase step whose phase quantity is 60 degrees is used.
Figure 45B:
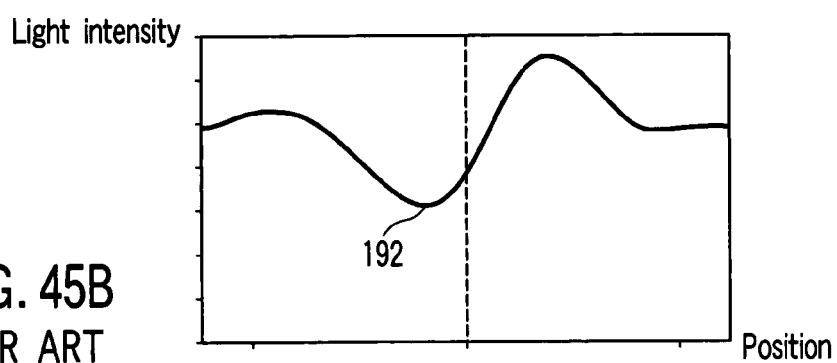
Figure 45C:
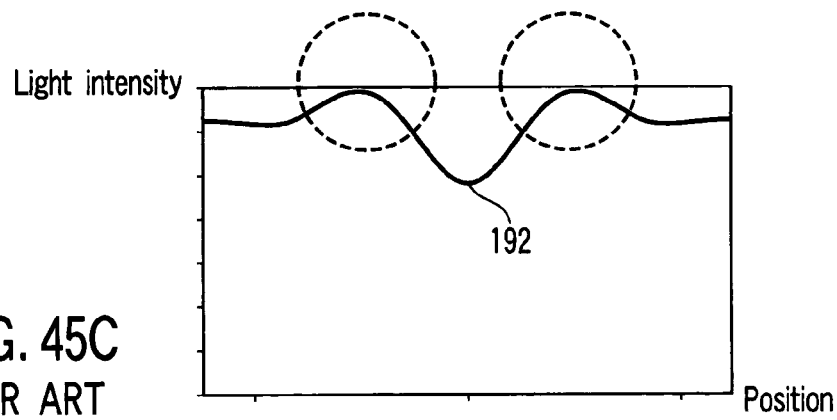
Figure 45D:
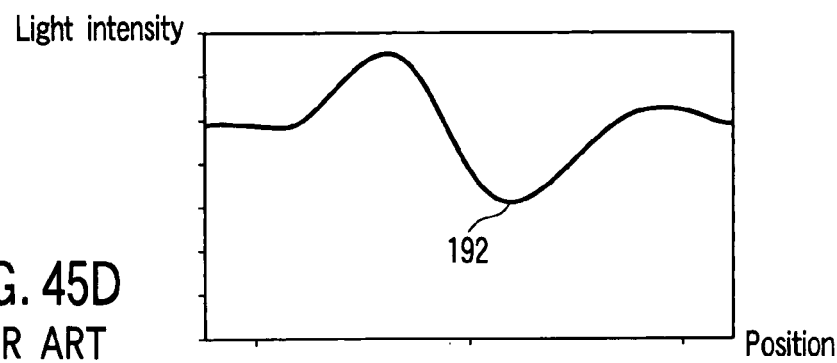

As a result, in the modification of FIG. 39, as shown in FIG. 43, a combined light intensity distribution of a one-dimensional V-shaped light intensity distribution 15a formed through the second optical modulation element 12 and a light intensity distribution with an inverse peak shape 15b formed through the optical modulation element 1 and the birefringent element 2E, i.e., a light intensity distribution with a V-shaped pattern+an inverse-peak-shaped pattern 15c is formed on the surface of the processed substrate 5. In this example, as described above, a light intensity at an inverse peak point in the light intensity distribution with the inverse peak shape 15b has a predetermined value which is substantially larger than zero, and the light intensity distribution with the inverse peak shape 15b is hardly affected by defocusing.

In this manner, in the modification shown in FIG. 39, the light intensity distribution with the V-shaped pattern+the inverse-peak-shaped pattern 15c can be stably formed based on a deep focal depth and a filling rate of a crystal grain formed on the semiconductor film of the processed substrate 5 can be increased like the foregoing embodiments. That is, a desired light intensity distribution with an inverse peak shape can be stably formed at a desired position, and a filling rate of a crystal grain formed on the semiconductor film can be increased. Additionally, in the light intensity distribution with the V-shaped pattern and the inverse-peak-shaped pattern 15c, a crystal nucleus formation position, i.e., a start point of the crystal growth can be set closer as much as possible to a position where the light intensity is minimum in the light intensity distribution with the inverse peak shape 15b. Further, the sufficient crystal growth in the lateral direction from the crystal nucleus can be realized along a gradient direction (the direction X) of the light intensity in the one-dimensional V-shaped light intensity gradient distribution 15a, thereby generating a crystallized semiconductor film with a large particle size.

In the modification shown in FIG. 39, in the light of focusing by the image formation optical system 4, it is desirable to arrange the optical modulation element 1 and the second optical modulation element 12 in such a manner that their phase pattern surfaces are in close proximity to each other as much as possible. Furthermore, although the second optical modulation element 12 is arranged on the rear side of the second optical modulation element 12, the present invention is not restricted thereto, and the optical modulation element 1 can be arranged on the rear side of the second optical modulation element 12. Moreover, although the optical modulation element 1 and the second optical modulation element 12 are separately used, the present invention is not restricted thereto, it is also possible to use one optical modulation element having a combined phase pattern obtained by adding a phase value of a phase pattern of the optical modulation element 1 and a phase value of a phase pattern of the second optical modulation element 2, for example.

In the modification shown in FIG. 39, the birefringent element comprising one plane-parallel plate is used as the light beam division element 2. However, the present invention is not restricted thereto, it is also possible to use the birefringent element 20 as a Savart plate, a birefringent element according to a modification of the Savart plate based on Francon or a birefringent element as a Wollaston prism like the foregoing embodiments.

In the modification shown in FIG. 39, the line type phase shifter including phase difference lines of 180 degrees arranged in accordance with a predetermined cycle is used as the optical modulation element having a pattern which forms a light intensity distribution with an inverse peak shape. However, the present invention is not restricted thereto, and it is also possible to use a phase shifter having a pattern in which three or more phase difference lines of 180 degrees intersect at one point or a phase shifter having a pattern in which a plurality of phase value areas come into contact with each other at one point like the foregoing embodiments.

It is self-apparent that such a semiconductor apparatus as described in conjunction with FIGS. 34A to 34E can be manufactured even if the apparatuses of the eighth embodiment and its modifications are used.

It is to be noted that the present invention is applied to the crystallization apparatus and the crystallization method which generate a crystallized semiconductor film by applying a light having a predetermined light intensity distribution to a polycrystal semiconductor film or an amorphous semiconductor film in the above description. However, the present invention is not restricted thereto, and the present invention can be generally applied to a light application apparatus which forms a predetermined light intensity distribution on a predetermined surface through an image formation optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A light application apparatus comprising:
an image formation optical modulation element provided with a plurality of phase steps, a light beam which is entered into the optical modulation element being phase-modulated by the phase steps and exits from the optical modulation element as a light beam forming a first light intensity distribution on a predetermined plane; and an optical system arranged between the optical modulation element and the predetermine plane, the optical system dividing the phase-modulated light beam into at least two non-interference light fluxes forming second and third light intensity distributions on the desired plane and different optical characteristics from each other, and projecting a light beam including the divided two light fluxes, the light intensity distributions of the projected light fluxes being combined with each other, so that the projected light beam forms a fourth light intensity distribution with an inverse peak shape on the predetermined plane, the first to fourth light intensity distributions being different from each other.

2. The light application apparatus according to claim 1, wherein the optical modulation element has a phase distribution area in which an area share ratio of an area which is optically smaller than a radius of a point spread function range of the image formation optical system and has a predetermined modulation phase value varies depending on each position, and a peripheral boundary of the phase distribution area forms the phase steps which are substantially different from the 180 degrees.

3. The light application apparatus according to claim 1, wherein the optical modulation element has at least two types of phase distribution areas in which an area share ratio of an area which is optically smaller than a radius of a point spread function range of the image formation optical system and has a predetermined modulation phase value varies depending on each position, modulation phase values of the two types of phase distribution areas have the same absolute value and different signs, and a boundary between the two types of phase distribution areas forms the phase steps which are substantially different from the 180 degrees.

4. The light application apparatus according to claim 1, wherein the optical modulation element has a light shielding area provided in the vicinity of the phase step in order to suppress a peak shape generated on both sides of an inverse peak in the light intensity distribution with the inverse peak shape.

5. The light application apparatus according to claim 4, wherein the light shielding area has a linear light shielding area extending in substantially parallel with the phase step, and a distance D on the predetermined plane corresponding to a distance between a central line of the linear light shielding area and the phase step satisfies the following conditions:

$$0.4 \times \lambda/NA < D < 0.7 \times \lambda/NA$$

where $\lambda$ is a wavelength the light beam which exits from the optical modulation element, and NA is an image side numerical aperture of the image formation optical system.

6. The light application apparatus according to claim 4, wherein the light shielding area has a plurality of isolated light shielding areas aligned in substantially parallel with the phase step, and a distance D on the radiation target object corresponding to a distance between a central line connecting centers of the plurality of isolated light shielding areas and the phase step satisfies the following conditions:

$$0.4 \times \lambda/NA < D < 0.7 \times \lambda/NA$$

where λ is a wavelength of the light beam which exits from the optical modulation element, and NA is an image side numerical aperture of the image formation optical system.

7. The light application apparatus according to claim 1, wherein the optical modulation element has a plurality phase modulation areas provided in the vicinity of the phase step in order to suppress a peak shape generated on both sides of the inverse peak in the light intensity distribution with the inverse peak.

8. The light application apparatus according to claim 7, wherein each of the phase modulation areas has a linear phase modulation area extending in substantially parallel with the phase step, and a distance D on the predetermined plane corresponding to a distance between a central line of the linear phase modulation area and the phase step satisfies the following conditions:

$$0.4 \times \lambda/NA < D < 0.7 \times \lambda/NA$$

where λ is a wavelength of the light beam which exits from the optical modulation element, and NA is an image side numerical aperture of the image formation optical system.

9. The light application apparatus according to claim 8, wherein each of the phase modulation areas has a plurality of isolated phase modulation areas aligned in substantially parallel with the phase step, and a distance D on the predetermined plane corresponding to a distance between a central line connecting centers of the plurality of isolated phase modulation areas and the phase step satisfies the following conditions:

$$0.4 \times \lambda/NA < D < 0.7 \times \lambda/NA$$

where λ is a wavelength of the light beam which exits from the optical modulation element, and NA is an image side numerical aperture of the image formation optical system.

10. The light application apparatus according to claim 7, wherein a phase modulation quantity of the phase modulation area provided on one side of the phase step and a phase modulation quantity of the phase modulation area provided on the other side of the phase step have substantially the same absolute values and different signs.

11. The light application apparatus according to claim 1, wherein phase areas formed between respective two adjacent phase steps have alternately different reference phase values, in each phase area is formed a phase distribution in which an area share ratio of a first area which has a dimension optically smaller than a radius of a point spread function range of the image formation optical system and a first phase value different from the reference phase value varies depending on each position, and phase modulation quantities of the first areas in the two adjacent phase areas have substantially the same absolute values and different signs.

12. The light application apparatus according to claim 1, wherein the light beam division element has a birefringent element which is arranged between the optical modulation element and the irradiation target.

13. The light application apparatus according to claim 12, wherein the birefringent element comprises at least one of a birefringent plane-parallel plate which is set in such a manner that a crystal optical axis forms a predetermined angle with respect to an optical axis, a Savart plate comprising a pair of birefringent plane-parallel plates each of which is set in such a manner that a crystal optical axis forms a predetermined angle with respect to an optical axis, a pair of birefringent plane-parallel plates each of which is set in such a manner that a crystal optical axis forms a predetermined angle with respect to an optical axis, a half wave plate provided between the pair of plane-parallel plates, and a Wollaston prism comprising a pair of birefringent deflection prisms each of which is set in such a manner that a crystal optical axis forms a predetermined angle with respect to an optical axis.

14. The light application apparatus according to claim 1, further comprising a control element which controls a polarization state of a light beam entering the light beam division element in such a manner that two light beams divided by the light beam division elements have substantially the same intensities.

15. The light application apparatus according to claim 14, wherein the control element includes a quarter wave plate arranged on an incidence side of the light beam division element.

16. A crystallization apparatus comprising:
the light application apparatus according to claim 1;
a light source which supplies a laser light as an incident light beam to the optical modulation element; and
a stage which positions a polycrystal semiconductor film or an amorphous semiconductor film in such a manner that the polycrystal semiconductor film or the amorphous semiconductor film is irradiated with a light beam having the combined light intensity distribution and crystallized.

* * * * *